US012472269B2

United States Patent
Roberts et al.

(10) Patent No.: US 12,472,269 B2
(45) Date of Patent: Nov. 18, 2025

(54) LIVER-SPECIFIC INDUCIBLE PROMOTERS AND METHODS OF USE THEREOF

(71) Applicant: ASKBIO INC., Research Triangle Park, NC (US)

(72) Inventors: Michael Roberts, Midlothian (GB);
Graham Whyteside, Midlothian (GB);
Anne Braae, Midlothian (GB)

(73) Assignee: ASKBIO INC.

( * ) Notice: Subject to any disclaimer, the term of this patent is extended or adjusted under 35 U.S.C. 154(b) by 861 days.

(21) Appl. No.: 17/423,693

(22) PCT Filed: Jan. 20, 2020

(86) PCT No.: PCT/GB2020/050107
§ 371 (c)(1),
(2) Date: Jul. 16, 2021

(87) PCT Pub. No.: WO2020/148555
PCT Pub. Date: Jul. 23, 2020

(65) Prior Publication Data
US 2022/0111078 A1     Apr. 14, 2022

(30) Foreign Application Priority Data
Jan. 18, 2019   (GB) ..................................... 1900741

(51) Int. Cl.
*A61K 48/00*     (2006.01)
*A61P 1/16*      (2006.01)
*C12N 15/86*     (2006.01)

(52) U.S. Cl.
CPC ............ *A61K 48/0058* (2013.01); *A61P 1/16* (2018.01); *C12N 15/86* (2013.01)

(58) Field of Classification Search
CPC ........ A61K 48/0058; A61P 1/16; C12N 15/86
See application file for complete search history.

(56) References Cited

U.S. PATENT DOCUMENTS

| 6,025,195 A | 2/2000 | Sandig et al. |
| 2003/0150004 A1 | 8/2003 | Moore et al. |
| 2004/0006775 A1 | 1/2004 | Moore et al. |
| 2013/0324440 A1 | 12/2013 | Roberts |
| 2017/0119906 A1 | 5/2017 | Riley |

FOREIGN PATENT DOCUMENTS

| CN | 102321732 A | 1/2012 |
| JP | H11509412 A | 8/1999 |
| JP | 2008521575 A | 6/2008 |
| JP | 2011517955 A | 6/2011 |
| WO | 1995011308 A1 | 4/1995 |

(Continued)

OTHER PUBLICATIONS

Honkakoski et al., Journal of Biological Chemistry (1996) p. 9746-268 (Year: 1996).*

(Continued)

*Primary Examiner* — Evelyn Y Pyla
*Assistant Examiner* — Katherine R Small
(74) *Attorney, Agent, or Firm* — NIXON PEABODY LLP; Ronald I. Eisenstein; Jeanne N. Jodoin

(57) ABSTRACT

The present invention relates to inducible regulatory elements, promoters and vectors, especially gene therapy vectors, and methods of their use.

13 Claims, 13 Drawing Sheets
Specification includes a Sequence Listing.

(56) References Cited

FOREIGN PATENT DOCUMENTS

| WO | 2006060641 A2 | 6/2006 |
| WO | 2008073303 A2 | 6/2008 |
| WO | 2009130208 A1 | 10/2009 |

OTHER PUBLICATIONS

Sueyoshi et al., The Journal of Biological Chemistry (1999) 274(10): 6043-6046 (Year: 1999).*

Addgene (https://www.addgene.org/212936; obtained from website Nov. 13, 2024) (Year: 2024).*

Ali, et al., FEBS Open Bio (2018) 8(6): 1043-1060 (Year: 2018).*

Nair, et al., Blood (2014) 123(20): 3195-3199 (Year: 2014).*

Honkakoski et al., "Characterization of a phenobarbital-responsive enhancer module in mouse P450 Cyp2b10 gene." Journal of Biological Chemistry 272.23 (1997): 14943-14949.

Inglesias et al. "A Novel Genomics-Based Platform for the Creation of Environmental-Responsive Gene Promoters." Molecular Therapy 26.5S1, 1 page (2018).

Liu, Cindy M., et al. "FungiQuant: a broad-coverage fungal quantitative real-time PCR assay." BMC microbiology 12.1 (2012): 1-11.

Honkakoski et al., The nuclear orphan receptor CAR-retinoid X receptor heterodimer activates the phenobarbital-responsive enhancer module of the CYP2B gene. Molecular and cellular biology, 18(10), pp. 5652-5658 (1998).

Rivera-Rivera et al., "Transcriptional analysis in vivo of the hepatic genes, Cyp2b9 and Cyp2b10, by intravenous administration of plasmid DNA in mice." Biochimica et Biophysica Acta (BBA)—General Subjects 1619.3: 254-262 (2003).

Chuah et al. "Liver-specific transcriptional modules identified by genome-wide in silico analysis enable efficient gene therapy in mice and non-human primates." Molecular Therapy 22(9): 1605-1613 (2014).

Honkakoski et al. "Characterization of Phenobarbital-inducible Mouse Cyp2b10 Gene Transcription in Primary Hepatocytes (?)." Journal of Biological Chemistry 271(16): 9746-9753 (1996).

Lemken et al. "Liver-directed gene expression employing synthetic transcriptional control units." World Journal of Gastroenterology 11(34): 5295-5302 (2005).

Muangmoonchai et al. "Xenobiotic induction of cytochrome P450 2B1 (CYP2B1) is mediated by the orphan nuclear receptor constitutive androstane receptor (CAR) and requires steroid co-activator 1 (SRC-1) and the transcription factor Sp1." Biochemical Journal 355(1): 71-78 (2001).

Tian et al. "Binding of drug-activated CAR/Nr1i3 alters metabolic regulation in the liver." Iscience 9: 209-228 (2018).

Whyteside et al. "Controlled gene expression in the liver; Design of constitutive, inducible and repressible synthetic promoters for use in gene medicine and their in vivo validation." Molecular Therapy, vol. 27. No. 4S1: 798 (2019).

* cited by examiner

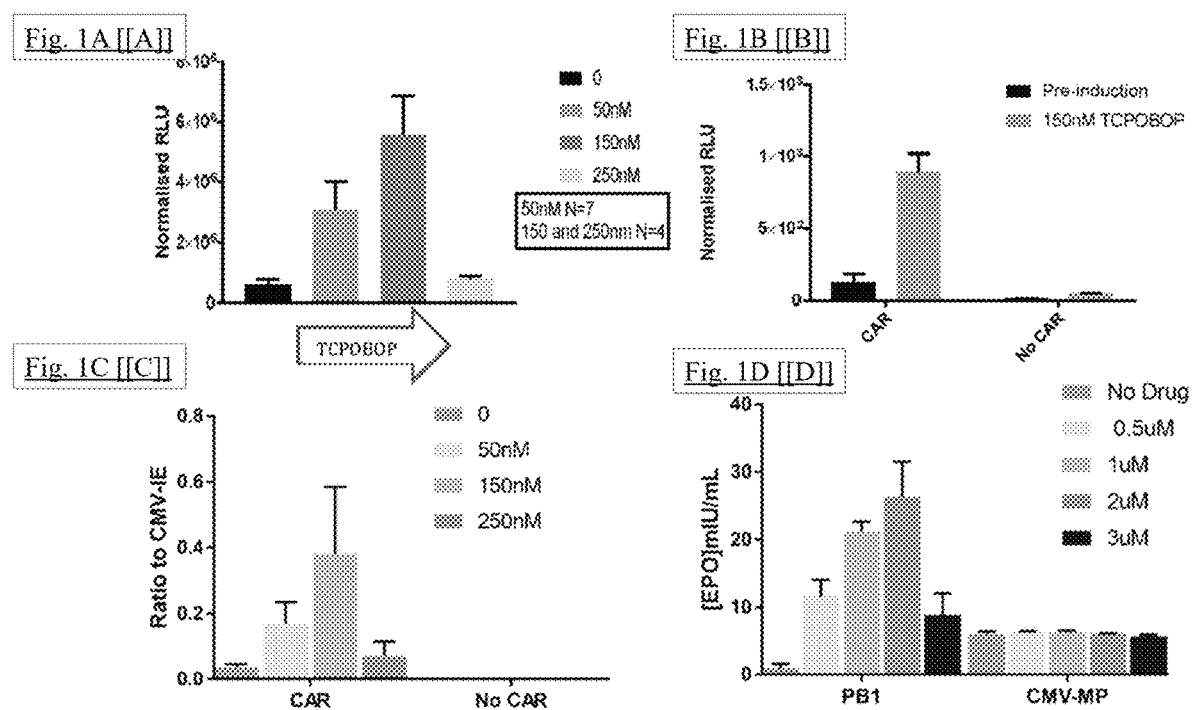

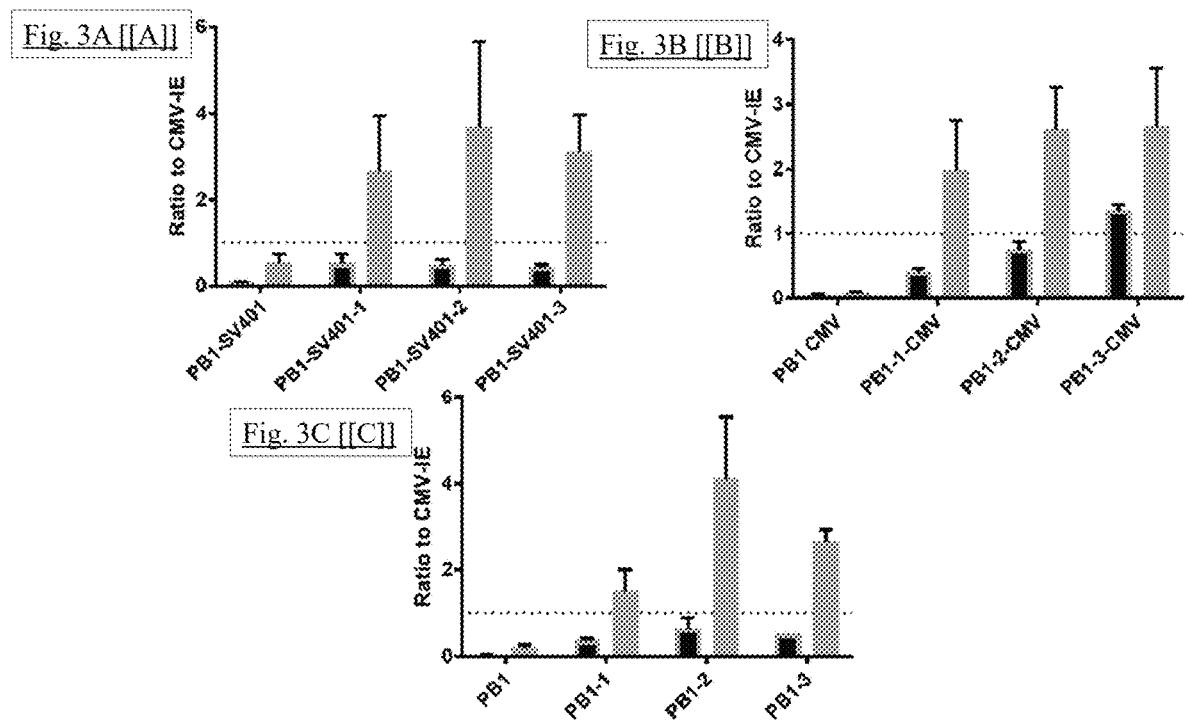

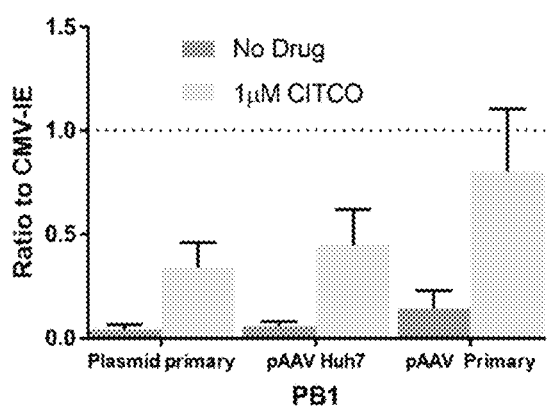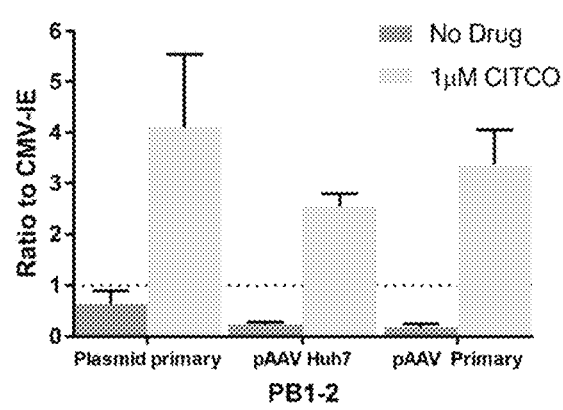

```
         NR1                  NFI                      NR2
TC  TGTACTTCCTGACCT     TGGCACAGTGCCA    CCA  TCAAGTTCCTGACAC  C
```

51BP ENHANCER FROM MOUSE CYP2B10

Fig. 6

LIVER-SPECIFIC INDUCIBLE PROMOTERS AND METHODS OF USE THEREOF

The present invention relates to liver-specific inducible promoters and vectors, especially gene therapy vectors comprising them, and methods of their use.

CROSS REFERENCE TO RELATED APPLICATIONS

This Application is a 35 U.S.C. § 371 National Phase Entry of International Patent Application No. PCT/GB2020/050107 filed Jan. 20, 2020, which designates the U.S. and claims benefit of foreign priority under 35 U.S.C. § 119(b) of GB Application Number 1900741.8 filed Jan. 18, 2019, the contents of which are incorporated herein in their entireties by reference.

SEQUENCE LISTING

The instant application contains a Sequence Listing which has been submitted electronically in ASCII format and is hereby incorporated by reference in its entirety. Said ASCII copy, created on Jul. 15, 2021, is named Sequence-Listing-046192-096160USPX.txt and is 84,750 bytes in size.

BACKGROUND OF THE INVENTION

The following discussion is provided to aid the reader in understanding the disclosure and does not constitute any admission as to the contents or relevance of the prior art.

Metabolism by the liver microsomal cytochrome P450 enzymes (CYPs) plays an important role in the detoxification of xenochemicals such as pharmaceutical drugs and environmental contaminants. Inducible gene transcription by exposure to xenochemicals is characteristic for CYPs, which increases the organism's defence capability against toxicity and carcinogenicity. Based on the discovery of PB induction of CYP2B genes, PB has served as a prototype for a large group of structurally and functionally diverse xenochemicals that induce CYP2B genes. A PB-responsive enhancer module (PBREM) was identified as a 51-bp element in mouse Cyp2b10 and rat CYP2B1, and a near identical DNA element was identified in rat CYP2B2. A PBREM sequence has also been identified in humans, where it is associated with CYP2B6. The nuclear receptor heterodimer CAR-RXR has been identified as the transactivator of PBREM. (see Negishi et al., "The Repressed Nuclear Receptor CAR Responds to Phenobarbital in Activating the Human CYP2B6 Gene"; J. Biol. Chem 1999, 274:6043-6046) In many areas, including gene therapy, it is desirable to provide regulatory nucleic acid sequences that are capable of driving expression of a gene to produce a protein or nucleic acid expression product within a desired cell, tissue or organ.

Expression in the liver is of particular interest as it is involved in a wide range of essential functions in the body, including the synthesis of many proteins involved in metabolism, haemostasis, and protection against infection. Given that many diseases are linked to disruption of gene expression in the liver, there is a significant interest in developing gene therapy strategies that allow expression of a transgene in the liver to produce a therapeutic expression product. Examples of diseases of the liver associated with abnormal expression of genes include haemophilia (including haemophilia A or B), familial hypercholesterolemia, ornithine transcarbamylase deficiency, α-antitrypsin deficiency, hepatitis virus infection, non-viral hepatitis, liver cancer, and various other liver diseases (such as non-alcoholic fatty liver disease (NAFLD), and alcohol-related liver disease (ARLD).

A significant challenge in using gene therapy to treat liver diseases is the ability to provide liver-specific (also known as hepato-specific) therapeutic gene expression. It is known to target of mammalian hepatocytes by injecting DNA or viral vectors into the liver parenchyma, hepatic artery or portal vein. Adenoviral vectors have also been reported to primarily target the liver in mice. However, they also infect other tissues, in particular lung and skeletal muscle, leading to "off-target" effects. Some forms of adeno-associated viral vectors (AAV) or lentiviral vectors preferentially transduce hepatocytes, but off-target effects do again arise.

It is therefore desirable to provide systems to regulate gene expression in a liver-specific manner. Ideally, such systems are highly-specific to the liver (thereby avoiding or minimising off-target expression in non-target tissues) and are also powerful, i.e. they drive high expression levels in the liver. The use of cis-acting regulatory elements has been proposed to provide both specificity and activity. Typically, this concerns cis-regulatory enhancer sequences, i.e. nucleic acid sequences that act in cis to increase the activity of a promoter. Enhancers are typically active regardless of their orientation, and they can act over distances of up to several kilobases away from the promoter in some cases, though they typically also act when much closer to the promoter.

There is also a desire to provide inducible systems of gene expression, such that gene expression can be induced as required. Inducibility means that expression of a therapeutic gene expression product can be induced when required. Furthermore, if induction is dose dependent, then expression levels of therapeutic gene expression product can be modulated by adjusting the amount of inducer administered.

There is a thus a need for regulatory sequences to control gene expression in many contexts, not least in therapeutic gene expression in gene therapy and the like. In particular, there is a need for regulatory sequences that provide for inducible gene expression. Regulatory sequences that provide for inducible gene expression in the liver are of particular interest.

SUMMARY OF THE INVENTION

In a first aspect, the present invention provides a gene therapy vector comprising an expression cassette, the expression cassette comprising a synthetic liver-specific inducible promoter operably linked to a gene, the synthetic liver-specific inducible promoter comprising a cis-regulatory element (CRE) that is capable of being bound and activated by a heterodimer of CAR and RXR.

Constitutive androstane receptor (CAR) is a member of the nuclear receptor superfamily, and it is a key regulator of xenobiotic and endobiotic metabolism. Unlike most nuclear receptors, CAR is constitutively active in the absence of ligand and is regulated by both agonists and inverse agonists. Activation results in translocation of CAR from the cytosol into the nucleus, where the protein can bind to specific DNA sites, called response elements. Binding occurs both as a monomer and together with the retinoid X receptor (RXR) resulting in activation or repression of target gene transcription.

Retinoid X receptor (RXR) is a member of the nuclear receptor superfamily that is activated by 9-cis retinoic acid and 9-cis-13,14-dihydro-retinoic acid.

When CAR is activated (by either direct or indirect activation), it translocates to the nucleus where CAR and RXR form a heterodimer (referred to herein as "CAR-RXR heterodimer" or "CAR-RXR") that can bind to an activate genes comprising an appropriate target sequence.

CAR-RXR binds to and induces target genes via the so-called PB-responsive enhancer module (PBREM), as discussed above. Accordingly, in some preferred embodiments of the invention the CRE that is capable of being bound and activated by a CAR-RXR heterodimer of comprises a PBREM element, or a functional variant thereof.

The mouse PBREM sequence is set out in SEQ ID NO: 1. The human PBREM sequence is set out in SEQ ID NO: 2. In some embodiments of the invention, the CRE that is capable of being bound and activated by a CAR-RXR heterodimer of comprises or consists of SEQ ID NO: 1 or SEQ ID NO: 2, or a functional variant of SEQ ID NO: 1 or SEQ ID NO: 2. Thus, in some embodiments the CRE that is capable of being bound and activated by a CAR-RXR heterodimer comprises or consists of a PBREM element or a functional variant thereof.

The sequences and alignment of the mouse and human PBREM elements are shown below, and the so-called NR1 motif is underlined, the NH1 motif is in italics, and the NR2 motif is in bold in each (SEQ ID NOs are shown in brackets):

```
TCTGTACTTTCCTGACCTTGGCACAGTGCCACCATCAACTTGCCTGACACC (1)
|||||||||||||||||| ||    ||| || |||  |||| ||||||   |
ACTGTACTTTCCTGACCCTGAAGAGGTGGCAGCATGGACTTTCCTGAACCA (2)
```

PBREM is a 51-bp DNA inducible enhancer consisting of two nuclear receptor DR4 motifs (NR1 and NR2) flanking a NF1 binding site. As can be seen from this alignment, there is a very high level of conservation of sequence in the NR1 motifs between mouse and human PBREM. The 16-bp NR1 motif of human PBREM differs by only 1 base from the mouse NR1 motif, making NR1 the most conserved sequence between human and mouse PBREM elements. It has been proposed in the literature that the NR1 sequence is the binding site for the CAR-RXR heterodimer, and the remaining sequences are partially or completely redundant. A triple repeat of NR1 (was shown to remain and inducible in Sueyoshi, et al. (J. BIOL. CHEM. Vol. 274, 10, pp. 6043-6046, 1999). However, it is believed that parts other than NR1 may play a role in making the PBREM element more specific and inducible (e.g. reducing background, constitutive expression and allowing from a greater magnitude of induction).

Accordingly, a CRE that is capable of being bound and activated by a CAR-RXR heterodimer suitably comprises at least one NR1 motif. Suitably the NR1 motif, comprises or consists of the sequence TGTACT-X-TGACC[C/T](SEQ ID NO: #), wherein X represents any sequence which is from 3 to 6 nucleotides in length (preferably 4-5 nucleotides in length, suitably 4 nucleotides in length). In some preferred embodiments, X comprises the sequence TTCC, and suitably comprises or consists of the sequence TTCC or TTTCC. Where nucleotides are shown within square brackets, it indicates that one of the indicated nucleotides within the square brackets is present at that location.

In some embodiments the NR1 motif comprises or consists of the sequence TGTACTTTCCTGACCN (SEQ ID NO: 20) (for example, TGTACTTTCCTGACCT (SEQ ID NO: 3) or TGTACTTTCCTGACCC (SEQ ID NO: 4)), or sequence that varies at no more than 2, preferably no more than 1 nucleotide position from the sequence TGTACTTTCCTGACCN (SEQ ID NO: 20). Preferably a functional variant of a PBREM element comprises the sequence CTGTACTTTCCTGACCN (SEQ ID NO: 21) (for example, CTGTACTTTCCTGACC[T/C](SEQ ID NO: 22), i.e. CTGTACTTTCCTGACCT (SEQ ID NO: 23) or CTGTACTTTCCTGACCC (SEQ ID NO: 24)), or sequence that varies at no more than 2, preferably no more than 1 nucleotide position from the sequence SEQ ID NO: 21; this sequence includes the conserved C positioned 5' of the NR1 sequence in both human and mouse PBREM, as represented above. Suitably a functional variant of a PBREM sequence comprises the sequence NCTGTACTTTCCTGACCNTG (SEQ ID NO: 25) (for example, [T/A]CTGTACTTTCCTGACC[C/T]TG (SEQ ID NO: 26), TCTGTACTTTCCTGACCTTG (SEQ ID NO: 27), or ACTGTACTTTCCTGACCCTG (SEQ ID NO: 28)), or sequence that varies at no more than 2, preferably no more than 1 nucleotide position from the sequence SEQ ID NO: 25; this sequence includes the two nucleotides located at each of the 5' and 3' of the NR1 sequence human and mouse PBREM, as represented above. Where N is present in a nucleic acid sequence herein, it represents any nucleotide. Where nucleotides are shown within square brackets, it indicates that one of the indicated nucleotides within the square brackets is present at that location.

In some embodiments the functional variant of a PBREM element suitably comprises two or more, suitably three or more, operably linked NR1 motif-containing sequences.

Thus, in some embodiments the CRE that is capable of being bound and activated by a CAR-RXR heterodimer suitably comprises two or more, suitably three or more, operably linked NR1 motifs. The NR1 motifs may in some embodiments be provided adjacent to one another (e.g. in tandem), and they may be immediately adjacent to one another or separated by a spacer. Accordingly, a CRE that is capable of being bound and activated by a CAR-RXR heterodimer suitably comprises the general structure NR1-S-NR1, wherein NR1 represents any NR1 motif as discussed herein, and S represents an optional spacer. When a spacer is present, it can be have any sequence and be of any suitable length, e.g. from 2 to 50, 3 to 40, 4 to 30, 5 to 20, 6 to 10, 7 to 9, or 8 nucleotides in length.

In some embodiments of the present invention the CRE that is capable of being bound and activated by a CAR-RXR heterodimer comprises or consists of a functional variant of a PBREM sequence which comprises one of the following sequences:

[TGTACTTTCCTGACCN-S-]$_n$ (SEQ ID NO: 29)

[CTGTACTTTCCTGACCN-S-]$_n$; (SEQ ID NO: 30)

[NCTGTACTTTCCTGACCNTG-S-]$_n$, (SEQ ID NO: 31)

wherein S is an optional spacer and n is from 1 to 5, optionally from 2 to 4, and suitably 3. Thus, the functional variant of a PBREM sequence can comprise a multimer of the NR1 motif-containing sequences. Various preferred NR1 motifs are discussed above, and they could of course be used in this embodiment. In some embodiments n is from 1 to 10, from 1 to 6, or from 2 to 4. In some embodiments of the invention n is 3.

In some preferred embodiments, a spacer is present between adjacent NR1 motif-containing sequences. When a spacer is present, it can be of any suitable length, e.g. from 2 to 50, 3 to 40, 4 to 30, 5 to 20, 6 to 10, 7 to 9, or 8 nucleotides in length.

In some embodiments of the present invention the CRE that is capable of being bound and activated by a CAR-RXR heterodimer comprises or consists of a functional variant of a PBREM sequence which comprises one of the following sequences:

```
                                        (SEQ ID NO: 32)
TGTACTTTCCTGACCN-S-TGTACTTTCCTGACCN;

(SEQ ID NO: 33)
TGTACTTTCCTGACCN-S-TGTACTTTCCTGACCN-S-
TGTACTTTCCTGACCN;

(SEQ ID NO: 34)
CTGTACTTTCCTGACCN-S-CTGTACTTTCCTGACCN;

(SEQ ID NO: 35)
CTGTACTTTCCTGACCN-S-CTGTACTTTCCTGACCN-S-
CTGTACTTTCCTGACCN;

(SEQ ID NO: 36)
NCTGTACTTTCCTGACCNTG-S-NCTGTACTTTCCTGACCNTG;
and (SEQ ID NO: 37)
NCTGTACTTTCCTGACCNTG-S-NCTGTACTTTCCTGACCNTG-S-
NCTGTACTTTCCTGACCNTG,
``` wherein S is an optional spacer. When a spacer is present, it can be of any suitable length, e.g. from 2 to 50, 3 to 40, 4 to 30, 5 to 20, 6 to 10, 7 to 9, or 8 nucleotides in length. Various preferred NR1 motifs are discussed above, and they could of course be used in this embodiment.

In some embodiments of the present invention the CRE that is capable of being bound and activated by a CAR-RXR heterodimer comprises or consists of a functional variant of a PBREM sequence which suitably comprises one of the following sequences:

```
                                        (SEQ ID NO: 38)
TCTGTACTTTCCTGACCTTG-S-TCTGTACTTTCCTGACCTTG-S-
TCTGTACTTTCCTGACCTTG;
or
                                        (SEQ ID NO: 39)
ACTGTACTTTCCTGACCCTG-S-ACTGTACTTTCCTGACCCTG-S-
ACTGTACTTTCCTGACCCTG,
``` wherein S is an optional spacer, as set out above.

In some cases, the spacer can have the sequence GATC-GATC (SEQ ID NO: 40), but any other suitable spacer sequence can be used.

In other embodiments of the present invention the CRE that is capable of being bound and activated by a CAR-RXR heterodimer comprises each of an NR1 element, an NF1 element and an NR2 element. Suitably these are present in the order NR1-NF1-NR2. The NR1 element suitably comprises or consists of a sequence as discussed above. The NF1 element suitably comprises or consists of the sequence TGGCACAGTGCCA (SEQ ID NO: 55) or TGAAGAGGTGGCA (SEQ ID NO: 56), or a sequence that varies by 7 or fewer nucleotides (e.g. 6, 5, 4, 3, 2, or 1 nucleotides) from SEQ ID NO: 55 or 56. The NR2 element suitably comprises or consists of the sequence TCAACTTGCCTGACAC (SEQ ID NO: 57) or TGGACTTTCCTGAACC (SEQ ID NO: 58), or a sequence that varies by 5 or fewer nucleotides (e.g. 4, 3, 2, or 1 nucleotides) from SEQ ID NO: 57 or 58.

In some embodiments of the present invention, the CRE that is capable of being bound and activated by a CAR-RXR heterodimer comprises or consists of a functional variant of a PBREM sequence which comprises a sequence that is at least 60% identical to either SEQ ID NO: 1 or SEQ ID NO: 2, preferably at least 60%, 65%, 70%, 75%, 80%, 85%, 90%, 95% or 99% identical to either SEQ ID NO: 1 or SEQ ID NO: 2. Mouse PBREM (SEQ ID NO: 1) and Human PBREM (SEQ ID NO: 2) are 71% identical along their entire length (i.e. 51 nucleotides). Mouse PBREM remains functional in human cells, and human function in PBREM remains functional in mouse cells. Thus, at least this level of overall sequence difference across the PBREM element can be tolerated.

However, as discussed above, there is a very high level of conservation in NR1 motif, and thus it is generally preferred that a functional variant of a PBREM sequence comprises a sequence that is at least 90% identical, preferably at least 95% identical, and more preferably perfectly identical to the sequence TCTGTACTTTCCTGACCTTG (SEQ ID NO: 27) or ACTGTACTTTCCTGACCCTG (SEQ ID NO: 28), and at least 50%, 55%, 60%, 65%, 70%, 75%, 80%, 85%, 90%, 95% or 99% identical across the remainder of SEQ ID NO: 1 or SEQ ID NO: 2. Preferably the overall sequence is at least 60%, 65%, 70%, 75%, 80%, 85%, 90%, 95% or 99% identical to either SEQ ID NO: 1 or SEQ ID NO: 2

Thus, in a preferred embodiment the CRE that is capable of being bound and activated by a CAR-RXR heterodimer comprises or consists of a functional variant of a PBREM sequence which comprises a sequence that is at least 90% identical, preferably at least 95% identical, and more preferably perfectly identical to SEQ ID NO: 1 or SEQ ID NO: 2 in the region spanning nucleotides 3 to 18 (preferably the region spanning nucleotides 1 to 20), and at least 50%, 55%, 60%, 70%, 75%, 80%, 85%, 90%, 95% or 99% identical across the remainder of SEQ ID NO: 1 or SEQ ID NO: 2 (i.e. nucleotides 1, 2, and 19 to 51, or nucleotides 21 to 51). Nucleotides are of course numbered with reference to SEQ ID NO: 1 or SEQ ID NO: 2. Preferably the overall sequence is at least 60%, 65%, 70%, 75%, 80%, 85%, 90%, 95% or 99% identical to either SEQ ID NO: 1 or SEQ ID NO: 2

In some preferred embodiments of the invention, the CRE that is capable of being bound and activated by a CAR-RXR heterodimer comprises or consists of the following sequence:
NCTGTACTTTCCTGACCNTGNNNNNNGTGNCAN-CATNNACTTNCCTGANNCN (SEQ ID NO: 41), or a sequence at least 90%, preferably 95%, more preferably 99% identical thereto. In this case, identity is calculated with respect to the specifically defined nucleotides rather than the undefined "Ns". Functional variants of a PBREM sequence where one or more nucleotides identified as N are deleted are specifically contemplated as part of such embodiments of the invention, for example where up to 7, 6, 5, 4, 3, 2, or 1 nucleotides marked N are deleted. Furthermore, functional variants of a PBREM sequence where one or more nucleotides are inserted are specifically contemplated as part of such embodiments of the invention, for example where up to 7, 6, 5, 4, 3, 2, or 1 nucleotides are inserted. As one specific example, the rat PBREM element from the CYP2B2 gene comprise a T inserted between the T and C at position 10-11, i.e. within NR1 of the PBREM element. Replacement, deletion or insertion of nucleotides in regions outside of the NR1 motif are likely to be well-tolerated.

Functional variants of a PBREM sequence that more closely resemble the wild type mouse or human PBREM elements (SEQ ID NO: 1 or SEQ ID NO: 2) are preferred in some cases, as it is believed that they may demonstrate particularly desirable properties of low background expression and high levels of inducibility. Such properties are generally desirable where background expression of a gene provided in a vector of the present invention is to be kept minimal, i.e. when induction of expression is not occurring.

In some embodiments of the invention the CRE that is capable of being bound and activated by a CAR-RXR heterodimer comprises or consists of a portion of the PBREM element from each of two or more different species, suitably from species in two or more different genera (e.g. two different mammals). Such elements can be referred to as "hybrid PBREM elements". A hybrid PBREM element typically comprises all of the motifs of a wild-type PBREM element (i.e. the NR1, NF1, and NR2 motifs), but these motifs are derived from two or more different species. In some embodiments a hybrid PBREM element comprises a portion (e.g. the NR1, NF1, and NR2 motifs) from a first species, and a corresponding portion from a second species (e.g. the corresponding NR1, NF1, and NR2 motifs). By way of non-limiting example, a hybrid PBREM element can comprise portions (e.g. the NR1, NF1, and NR2 motifs) of primate (e.g. human) and rodent (e.g. mouse) PBREM elements. For example, a hybrid PBREM element may comprise an NR1 motif from primate (e.g. human) and an NR2 motif from rodent (e.g. mouse), or an NR1 motif from rodent (e.g. mouse) and an NR2 motif from primate (e.g. human). Primate or rodent NR1 and NR2 motifs can also be combined with an NF1 motif from the corresponding species.

In some embodiments the hybrid PBREM element comprises one of the following combinations of PBREM motifs: hNR1-mNF1-hNR2; hNR1-mNF1-mNR2; mNR1-hNF1-mNR2; or mNR1-hNF1-hNR2 (wherein "h" indicates the human motif and m indicates the mouse motif). Exemplary hybrid PBREM element sequences are underlined in SEQ ID Nos: 61 to 64 in Table 3; functional variants of these sequences could of course be used, e.g. sequences having 60%, 65%, 70%, 75%, 80%, 85%, 90%, 95% or 99% identity to the hybrid PBREM element sequences underlined in SEQ ID Nos: 61 to 64, optionally with higher levels of identity in the NR1 motif, as discussed above.

As discussed above, and without wishing to be bound by theory, induction of gene expression via PBREM element, or variants thereof, is believed to be dependent upon binding thereto of the CAR-RXR heterodimer. The ability of any given CRE that is capable of being bound and activated by a CAR-RXR heterodimer, e.g. a variant of a PBREM element, to function as desired, i.e. to be inducible in the same way as the wild type mouse or human PBREM elements, though not necessarily to the same extent, can readily be determined experimentally. For example, the variant CRE can be inserted into the construct as set out in the examples below in place of SEQ ID NO: 1, and the ability of the construct to be induced compared when SEQ ID NO: 1 was included can be compared. For example, a variant CRE can be provided in place of SEQ ID NO: 1 in the PB1-MinTK construct and tested in liver cells, preferably primary hepatocytes, e.g. AXOL assay-ready expanded (ARE) hepatocytes (Axol, ax3701) with induction by 1 µM CITCO, as described in Example 2. Alternatively, a variant could be inserted into the pAAV-PB1-MinTk construct, as described in Example 4. Alternatively, the experimental approach used in Sueyoshi, et al. (J. BIOL. CHEM. Vol. 274, 10, pp. 6043-6046, 1999) can be used, i.e. the relevant putative PBREM variant sequences can be cloned in front of the tk promoter (BgIII site) in the pGL3-Basic vector containing the firefly luciferase reporter gene (Promega), resulting in PBREM VARIANT-tk-luciferase and reporter gene plasmids. Generally, a functional variant of a CRE should provide a level of inducibility that is at least 50%, preferably 75%, more preferably 80%, 85%, 90%, or 95% as inducible when compared to the equivalent construct comprising the wild type PBREM element, e.g. SEQ ID NO: 1 (measured in terms of fold increase in expression as a result of induction, i.e. a 2 fold increase in expression of a reported gene upon induction is considered to be 50% as inducible as a 4-fold increase). Generally, it is desired that the functional variant should provide at least 2-fold induction, more preferably 3-fold, 4-fold, 5-fold, 6-fold or 7-fold induction when provided in place of the mouse wild type PBREM in the PB1-MinTK construct described above and tested in liver cells, preferably primary hepatocytes, e.g. AXOL assay-ready expanded (ARE) hepatocytes (Axol, ax3701) with induction by 1 µM CITCO, as described in Example 2 below. A functional variant preferably results in a background expression level that is no more than three times as high, preferably no more than twice as high, and preferably no more than 1.5 times as high when compared to the equivalent construct comprising the wild-type mouse PBREM element (e.g. again in the PB1-MinTK construct and tested in ARE hepatocytes).

It will be noted that the PBREM element or functional variant thereof can be present in ether orientation. The reverse complement of the PBREM elements set out above thus form part of the present invention. It is noted that the human PBREM element is naturally present in the reverse orientation compared to the mouse PBREM element, and that the human PBREM element was shown to remain functional in the "reverse" orientation (i.e. the same orientation as mouse PBREM) in Sueyoshi, et al. (J. BIOL. CHEM. Vol. 274, 10, pp. 6043-6046, 1999).

In some embodiments of the invention, the synthetic liver-specific inducible promoter suitably comprises a plurality of CREs that are each capable of being bound and activated by a heterodimer of CAR and RXR. Thus, in some embodiments the invention provides a synthetic liver-specific inducible promoter comprising a multimer of CREs that are each capable of being bound and activated by a heterodimer of CAR and RXR. Viewed another way, the synthetic liver-specific inducible promoter suitably comprises a cis-regulatory module (CRM) that comprises a plurality of CREs that are each capable of being bound and activated by a heterodimer of CAR and RXR. The CREs that are capable of being bound and activated by a heterodimer of CAR and RXR can be identical or they may be different to one another.

In such embodiments the synthetic liver-specific inducible promoter suitably comprises from 2 to 10 CREs that are each capable of being bound and activated by a heterodimer of CAR and RXR. The inducible promoter suitably comprises from 2 to 7 CREs, from 2 to 5 CREs, from 2 to 4 CREs, optionally 2 or 3 CREs, and in some embodiments it is preferred that there are 3 CREs that are each capable of being bound and activated by a heterodimer of CAR and RXR.

As discussed above, the CREs that are capable of being bound and activated by a heterodimer of CAR and RXR are preferably PBREM elements or functional variants thereof. Thus, in a preferred embodiment synthetic liver-specific inducible promoter suitably comprises from 2 to 5, yet more preferably from 2 to 4, and yet more preferably 3 PBREM elements comprising SEQ ID NO: 1 or SEQ ID NO: 2, or functional variants thereof. Various PBREM elements and functional variants thereof are discussed in detail above.

In some preferred embodiments of the invention the synthetic liver-specific inducible promoter comprises from 2 to 4, optionally 2 or 3, operably linked copies of a CRE comprising SEQ ID NO: 1 or SEQ ID NO: 2, or a functional variant of SEQ ID NO: 1 or SEQ ID NO: 2.

The CREs that are capable of being bound and activated by a heterodimer of CAR and RXR can be separated by a spacer sequence. The spacer can have any suitable length, e.g. from 2 to 100 nucleotides, from 3 to 50 nucleotides, from 5 to 30 nucleotides, and from 10 to 25 nucleotides. In some embodiments it is referred that the spacer is a multiple of 5 in length. A spacer of approximately 20 nucleotides in length has been found to be suitable (e.g. from 18-22 nucleotides in length).

In some preferred embodiments of the invention the synthetic liver-specific inducible promoter comprises a CRM comprising or consisting of one of the following sequences:

```
                                                     (SEQ. ID NO: 42)
NCTGTACTTTCCTGACCNTGNNNNNNGTGNCANCATNNACTTNCCTGANNCN-S-
NCTGTACTTTCCTGACCNTGNNNNNNGTGNCANCATNNACTTNCCTGANNCN;
or
                                                     (SEQ ID NO: 43)
NCTGTACTTTCCTGACCNTGNNNNNNGTGNCANCATNNACTTNCCTGANNCN-S-
NCTGTACTTTCCTGACCNTGNNNNNNGTGNCANCATNNACTTNCCTGANNCN-S-
NCTGTACTTTCCTGACCNTGNNNNNNGTGNCANCATNNACTTNCCTGANNCN,
``` wherein S is an optional spacer. The spacer separates adjacent PBREM elements or functional variants thereof. Options for the spacer are set out above. In some embodiments the spacer is approximately 20 nucleotides in length. Variants that comprise a sequence that is at least 90%, preferably 95%, more preferably 99% identical to the PBREM element NCTGTACTTTCCTGACCNTGNNNNNGTGNCAN-CATNNACTTNCCTGANNCN (SEQ ID NO: 41) also form part of the invention. In this case, identity is calculated relative to the specifically defined nucleotides rather than the undefined "Ns". Functional variants of a PBREM sequence where one or more nucleotides identified as N are deleted are specifically contemplated as part of this embodiment of the invention, for example where up to 7, 6, 5, 4, 3, 2, or 1 nucleotides marked N are deleted. Furthermore, functional variants of a PBREM sequence where one or more nucleotides are inserted are specifically contemplated as part of such embodiments of the invention, for example where up to 7, 6, 5, 4, 3, 2, or 1 nucleotides are inserted. As one specific example, the rat PBREM element from the CYP2B2 gene comprise a T inserted between the T and C at position 10-11, i.e. within NR1 of the PBREM element. Replacement, deletion or insertion of nucleotides in regions outside of the NR1 motif are likely to be well-tolerated.

In some preferred embodiments of the invention the synthetic liver-specific inducible promoter comprises a CRM comprising or consisting of one of the following sequences:

```
                                                     (SEQ ID NO: 44)
TCTGTACTTTCCTGACCTTGGCACAGTGCCACCATCAACTTGCCTGACACC-S-
TCTGTACTTTCCTGACCTTGGCACAGTGCCACCATCAACTTGCCTGACACC;

(SEQ ID NO: 45)
TCTGTACTTTCCTGACCTTGGCACAGTGCCACCATCAACTTGCCTGACACC-S-
TCTGTACTTTCCTGACCTTGGCACAGTGCCACCATCAACTTGCCTGACACC-S-
TCTGTACTTTCCTGACCTTGGCACAGTGCCACCATCAACTTGCCTGACACC;

(SEQ ID NO: 46)
ACTGTACTTTCCTGACCCTGAAGAGGTGGCAGCATGGACTTTCCTGAACCA-S-
ACTGTACTTTCCTGACCCTGAAGAGGTGGCAGCATGGACTTTCCTGAACCA-S-
ACTGTACTTTCCTGACCCTGAAGAGGTGGCAGCATGGACTTTCCTGAACCA;
or
                                                     (SEQ ID NO: 47)
ACTGTACTTTCCTGACCCTGAAGAGGTGGCAGCATGGACTTTCCTGAACCA-S-
ACTGTACTTTCCTGACCCTGAAGAGGTGGCAGCATGGACTTTCCTGAACCA,
``` wherein S is an optional spacer. Options for the spacer are set out above. In some embodiments the spacer is approximately 20 nucleotides in length.

The synthetic liver-specific inducible promoters of the present invention suitably comprises no or only minimal nucleic acid sequences that would lead to constitutive expression or expression in non-liver cells (or, as the case may be, in cells which do not express CAR and RXR). Thus, background expression and expression in non-liver cells (or cells which do not express CAR and RXR) is minimised or avoided entirely.

The synthetic liver-specific inducible promoter typically comprises a CRE that is capable of being bound and activated by a heterodimer of CAR and RXR operably linked to a minimal promoter or proximal promoter, preferably a minimal promoter. Where a proximal promoter is used, it is preferably liver-specific. Generally, a minimal promoter is preferred, as a proximal promoter will tend to drive at least some degree of background expression. However, some amount of background expression may be desirable in some instances.

The minimal promoter can be any suitable minimal promoter. A wide range of minimal promoters are known in the art. Without limitation, suitable minimal promoters include HSV thymidine kinase minimal promoter (MinTK), CMV minimal promoter (CMVmp) and SV40 minimal promoter (SV40mp). The minimal promoter can be a synthetic minimal promoter.

In some preferred embodiments of the invention the synthetic liver-specific inducible promoter comprises a CRE that is capable of being bound and activated by a heterodimer of CAR and RXR operably linked to the MinTK minimal promoter. This combination has been shown to provide a desirable combination of low background expression and inducibility. Some particularly preferred embodiments comprise two or three CREs that are capable of being bound and activated by a heterodimer of CAR and RXR operably linked to MinTK; such promoters are particularly strong inducibility combined with low background.

In some preferred embodiments of the invention the synthetic liver-specific inducible promoter comprises a CRE that is capable of being bound and activated by a heterodimer of CAR and RXR operably linked to the SV40 minimal promoter. This combination has been shown to provide high levels of inducibility, albeit with some increase in background expression levels. Some particularly preferred embodiments comprise two or three CREs that are capable of being bound and activated by a heterodimer of CAR and RXR operably linked to minimal promoter; such promoters are particularly strong inducibility.

In some preferred embodiments the CRE that is capable of being bound and activated by a heterodimer of CAR and RXR is separated from the minimal promoter or proximal promoter by a spacer sequence. The spacer sequence can have any suitable length. For example, the spacer between the CRE that is capable of being bound and activated by a heterodimer of CAR and RXR (or, where a plurality of CREs are present, the most proximal CRE) and the minimal or proximal promoter can have a length of from 10 to 200 nucleotides. Spacers of various lengths (including 20, 46, 80, and 100 nucleotides, for example) were successfully employed in the examples set out below.

In some embodiments of the present invention the synthetic liver-specific inducible promoter comprises a sequence according any one of SEQ ID NOs: 7 to 18, or functional variant of any one thereof. The functional variant is suitably at least 60%, 65%, 70%, 75%, 80%, 85%, 90%, 95% or 99% identical to any one of SEQ ID NOs: 7 to 18. As mentioned above, a sequence identity of 90%, 95% or 99% or higher in regions corresponding to NR1 motifs is preferred.

In some preferred embodiments of the present invention the synthetic liver-specific inducible promoter comprises a sequence according to SEQ ID NO: 7, SEQ ID NO: 10, SEQ ID NO: 11 or SEQ ID NO: 12, or functional variant of any one thereof. The functional variant is suitably at least 60%, 65%, 70%, 75%, 80%, 85%, 90%, 95% or 99% identical to any one of SEQ ID NO: 7, SEQ ID NO: 10, SEQ ID NO: 11 or SEQ ID NO: 12. As mentioned above, a sequence identity of 90%, 95% or 99% or higher in regions corresponding to NR1 motifs is preferred. These promoters comprise 1, 2, 3 and 4, respectively, copies of mouse PBREM linked to a MinTK minimal promoter. SEQ ID NO: 10 and SEQ ID NO: 11, or functional variants thereof are particularly preferred embodiments of the invention in view of their especially desirably properties in terms of high inducibility combined with low background expression levels.

In some embodiments of the invention, the synthetic liver-specific inducible promoter comprises or consists of a sequence according to any one of SEQ ID NOs: 59 to 71, or a functional variant thereof. The functional variant is suitably at least 60%, 70%, 80%, 90%, 95% or 99% identical to any one of SEQ ID NOs: 59 to 71. As mentioned above, a sequence identity of 90%, 95% or 99% or higher in regions corresponding to NR1 motifs is preferred.

In some preferred embodiments of the present invention the synthetic liver-specific inducible promoter comprises a sequence according to any one of SEQ ID NO: 68, 69, 70 or 71, or functional variant of any one thereof. The functional variant is suitably at least 60%, 65%, 70%, 75%, 80%, 85%, 90%, 95% or 99% identical to any one of SEQ ID NO: 60 or 61. As mentioned above, a sequence identity of 90%, 95% or 99% or higher in regions corresponding to NR1 motifs is preferred. These promoters comprise 2×MHM or 3× human PBREM elements.

Suitably the expression cassette comprises sequences providing or coding for one or more of, and preferably all of, a ribosomal binding site, a start codon, a stop codon, and a transcription termination sequence. Suitably the expression cassette comprises a nucleic acid encoding a posttranscriptional regulatory element. Suitably the expression cassette comprises a nucleic acid encoding a polyA element.

A gene for use in the present invention typically encodes a desired gene expression product such as a polypeptide (protein) or RNA. The gene may be a full-length cDNA or genomic DNA sequence, or any fragment, subunit or mutant thereof that has at least some desired biological activity.

Where the gene encodes a protein, it can be essentially any type of protein. By way of non-limiting example, the protein can be an enzyme, an antibody or antibody fragment (e.g. a monoclonal antibody), a viral protein (e.g. REP, CAP, REV, VSV-G, or RD114), a therapeutic protein, or a toxic protein (e.g. Caspase 3, 8 or 9).

In some preferred embodiments of the present invention, the gene encodes a therapeutic expression product, preferably a therapeutic protein suitable for use in treating a disease or condition associated with the liver. Such genes may be referred to as "therapeutic genes". The therapeutic expression product can be a protein, e.g. a secretable protein such as, e.g., a clotting factor (e.g., factor IX or factor VIII), a cytokine, a growth factor, an antibody or nanobody, a chemokine, a plasma factor, insulin, erythropoietin, lipoprotein lipase, or a toxic protein. Alternatively, the therapeutic expression product may be RNA, such as an siRNA or miRNA. A non-exhaustive list of therapeutic expression products (and sequences encoding them) envisaged for use in the present invention includes: factor VIII, factor IX, factor VII, factor X, von Willebrand factor, erythropoietin (EPO), interferon-a, interferon-B, interferon-y, interleukin 1 (IL-1), interleukin 2 (IL-2), interleukin 3 (IL-3), interleukin 4 (IL-4), interleukin 5 (IL-5), interleukin 6 (IL-6), interleukin 7 (IL-7), interleukin 8 (IL-8), interleukin 9 (IL-9), interleukin 10 (IL-10), interleukin 11 (IL-11), interleukin 12 (IL-12), chemokine (C—X—C motif) ligand 5 (CXCL5), granulocyte-colony stimulating factor (G-CSF), granulocyte-macrophage colony stimulating factor (GM-CSF), macrophage colony stimulating factor (M-CSF), stem cell factor (SCF), keratinocyte growth factor (KGF), monocyte chemoattractant protein-1 (MCP-1), tumour necrosis factor (TNF), afamin (AFM), a1-antitrypsin, α-galactosidase A, α-L-iduronidase, ATP7b, ornithine transcarbamoylase, phenylalanine hydroxylase, lipoprotein lipase, aromatic amino acid decarboxylase (AADC), ATPase Sarcoplasmic/Endoplasmic Reticulum Ca2+ Transporting 2 (ATP2A2), cystic fibrosis transmembrane conductance regulator (CTFR), glutamic acid decarboxylase 65 kDa protein (GAD65), glutamic acid decarboxylase 67 kDa protein (GAD67), lipoprotein lipase (LPL), nerve growth factor (NGF), neurturin (NTN), porphobilinogen deaminase (PBGD), sarcoglycan alpha (SGCA), soluble fms-like tyrosine kinase-1 (sFLT-1), apoliproteins, low-density lipoprotein receptor (LDL-R), albumin, glucose-6-phosphatase, antibodies, nanobodies, aptamers, anti-viral dominant-negative proteins, and functional fragments, subunits or mutants thereof. Preferably the protein is a primate protein, more preferably a human protein.

Proteins or polypeptides of interest can be, for example, antibodies, enzymes or fragments thereof, viral proteins, cytokines, lymphokines, adhesion molecules, receptors and derivatives or fragments thereof, protein antibiotics, toxin fusion proteins, carbohydrate-protein conjugates, structural proteins, regulatory proteins, vaccines and vaccine like proteins or particles, process enzymes, growth factors, hormones, and any other polypeptides that can serve as agonists or antagonists and/or have therapeutic or diagnostic use. According to one preferred embodiment, the protein is an immunoglobulin, preferably an antibody or antibody fragment, most preferably a Fab or scFv antibody. According to another preferred embodiment the protein is a viral protein.

In some embodiments of the invention, the synthetic liver-specific expression cassette comprises a gene useful for gene editing, e.g. a gene encoding a site-specific nuclease, such as a meganuclease, zinc finger nuclease (ZFN), transcription activator-like effector-based nuclease (TALEN), or the clustered regularly interspaced short palindromic repeats system (CRISPR-Cas). Suitably the site-specific nuclease is adapted to edit a desired target genomic locus by making a cut (typically a site-specific double-strand break) which is then repaired via non-homologous end-joining (NHEJ) or homology dependent repair (HDR), resulting in a desired edit. The edit can be the partial or complete repair of a gene that is dysfunctional, or the knock-down or knock-out of a functional gene.

The product of interest may also be a nucleic acid, for example an RNA, for example an antisense RNA, microRNA, siRNA, tRNA, rRNAs, guide RNA or any other regulatory, therapeutic or otherwise useful RNA.

In some preferred embodiments of the invention, the gene therapy vector is a viral vector, such as a retroviral, lentiviral, adenoviral, or adeno-associated viral (AAV) vector, but other forms of gene therapy vector are also contemplated. In some preferred embodiments the vector is an AAV vector. In some preferred embodiments the AAV has a serotype suitable for liver transduction. In some embodiments, the AAV is selected from the group consisting of: AAV2, AAV5, AAV6, AAV7, AAV8, AAV9, or derivatives thereof. AAV vectors are suitably used as self-complementary, double-stranded AAV vectors (scAAV) in order to overcome one of the limiting steps in AAV transduction (i.e. single-stranded to double-stranded AAV conversion), although the use of single-stranded AAV vectors (ssAAV) is also encompassed herein. In some embodiments of the invention, the AAV vector is chimeric, meaning it comprises components from at least two AAV serotypes, such as the ITRs of an AAV2 and the capsid protein of an AAV5.

In some embodiments of the invention, the vector is a plasmid. Such a plasmid may include a variety of other functional nucleic acid sequences, such as one or more selectable markers, one or more origins of replication, polycloning sites and the like.

In another aspect, the present invention provides an expression cassette comprising a synthetic liver-specific inducible promoter operably linked to a gene, the synthetic liver-specific inducible promoter comprising a CRE that is capable of being bound and activated by a heterodimer of CAR and RXR. Various synthetic inducible promoters are discussed above in the context of a gene therapy vector, and they can be used in this aspect of the invention. Thus, the present invention also encompasses the synthetic liver-specific promoters as described with respect to the first aspect in an expression cassette both in a gene therapy vector (s described in detail above) and in other contexts.

In some embodiments of the invention, the expression cassette is present in an expression vector for expression in eukaryotic cells. Examples of eukaryotic expression vectors include, but are not limited to, pW-LNEO, pSV2CAT, pOG44, pXTI and pSG available from Stratagene; pSVK3, pBPV, pMSG and pSVL available from Amersham Pharmacia Biotech; and pCMVDsRed2-express, pIRES2-DsRed2, pDsRed2-Mito, pCMV-EGFP available from Clontech. Many other vectors are well-known and commercially available. For mammalian cells adenoviral vectors, the pSV and the pCMV series of vectors are particularly well-known non-limiting examples. There are many well-known yeast expression vectors including, without limitation, yeast integrative plasmids (YIp) and yeast replicative plasmids (YRp). For plants the Ti plasmid of *agrobacterium* is an exemplary expression vector, and plant viruses also provide suitable expression vectors, e.g. tobacco mosaic virus (TMV), potato virus X, and cowpea mosaic virus.

In embodiments of this aspect of the invention the gene is preferably not a reporter gene. Suitably the gene encodes a therapeutic expression product (e.g. as discussed above) or another expression product that is useful in industry or research. Thus, in some preferred embodiments of the invention the expression cassette is for the expression of a product which is not a reporter (such as a fluorescent protein, luminescent protein or a chromogenic protein), and preferably is for expression of a therapeutic expression product. Various suitable expression products are discussed above. Further useful expression product will be apparent to the skilled person.

In another aspect the present invention also provides a synthetic liver-specific inducible promoter comprising a CRE that is capable of being bound and activated by a heterodimer of CAR and RXR. The various synthetic inducible promoters discussed above in the context of a gene therapy vector are considered to be embodiments of this aspect of the present invention. In other words, various promoters described above are considered to be embodiments of this aspect of the invention independent of whether they are in the context of a gene therapy vector. In particular, there are disclosed various synthetic liver-specific inducible promoters that have beneficial properties and which are not disclosed in the art. These have utility in gene therapy, but also have broad utility in other contexts such as cell culture and bioprocessing, as discussed further below.

Particularly, but not exclusively, embodiments of this aspect of the invention include a synthetic liver-specific inducible promoter comprising a sequence according any one of SEQ ID NOs: 7 to 18, or functional variant of any one thereof. The functional variant is suitably at least 60%, 70%, 80%, 90%, 95% or 99% identical to any one of SEQ ID NOs: 7 to 18. As mentioned above, a sequence identity of 90%, 95% or 99% or higher in regions corresponding to NR1 motifs is preferred.

In some preferred embodiments the synthetic liver-specific inducible promoter comprises a sequence according to SEQ ID NO: 7, SEQ ID NO: 10, SEQ ID NO: 11 or SEQ ID NO: 12, or functional variant of any one thereof. The functional variant is suitably at least 60%, 70%, 80%, 90%, 95% or 99% identical to any one of SEQ ID NO: 7, SEQ ID NO: 10, SEQ ID NO: 11 or SEQ ID NO: 12. These promoters comprise 1, 2, 3 and 4, respectively, copies of mouse PBREM linked to a MinTK minimal promoter.

In some embodiments of the invention, the synthetic liver-specific inducible promoter comprises or consists of a sequence according to any one of SEQ ID NOs: 59 to 71, or a functional variant thereof. The functional variant is suitably at least 60%, 70%, 80%, 90%, 95% or 99% identical to any one of SEQ ID NOs: 59 to 71. As mentioned above, a sequence identity of 90%, 95% or 99% or higher in regions corresponding to NR1 motifs is preferred.

In some preferred embodiments of the present invention the synthetic liver-specific inducible promoter comprises a sequence according to any one of SEQ ID NO: 68, 69, 70 or 71, or functional variant of any one thereof. The functional variant is suitably at least 60%, 65%, 70%, 75%, 80%, 85%, 90%, 95% or 99% identical to any one of SEQ ID NO: 68, 69, 70 or 71. As mentioned above, a sequence identity of 90%, 95% or 99% or higher in regions corresponding to NR1 motifs is preferred. These promoters comprise 2×MHM or 3× human PBREM elements.

In a further aspect of the invention there is provided a CRE that is capable of being bound and activated by a CAR-RXR heterodimer which comprises or consists a functional variant of the PBREM element. Suitably the variant PBREM is a non-naturally occurring variant of PBREM, i.e. it comprises a sequence that does not occur in nature. For example, the variant does not comprise the sequence of human, mouse or rat PBREM elements (e.g. SEQ ID NO:1 or SEQ ID NO: 2). Various non-natural CREs capable of being bound and activated by a CAR-RXR heterodimer are described above in respect of the first aspect of the invention, and these provide exemplary embodiments of the present aspect.

In some embodiments the CRE of the invention comprises or consists of a hybrid PBREM element, as discussed above. By way of non-limiting example, a hybrid PBREM element can comprise portions of primate (e.g. human) and rodent (e.g. mouse) PBREM elements. For example, a hybrid PBREM element may comprise an NR1 motif from human and an NR2 motif from mouse, or an NR1 motif from mouse and an NR2 motif from human. Mouse or human NR1 and NR2 motifs can also be combined with an NR1 motif from the corresponding species. In some embodiments the hybrid PBREM element comprises one of the following combinations of PBREM motifs: hNR1-mNF1-hNR2; hNR1-mNF1-mNR2; mNR1-hNF1-mNR2; or mNR1-hNF1-hNR2 (wherein "h" indicates the human motif and m indicates the mouse motif). Exemplary hybrid PBREM element sequences are underlined in SEQ ID Nos: 61 to 64 in Table 3; functional variants of these sequences could of course be used, e.g. sequences having 60%, 70%, 75%, 80%, 85%, 90%, 95% or 99% identity to the hybrid PBREM element sequences underlined in SEQ ID Nos: 61 to 64.

In some embodiments the CRE that is capable of being bound and activated by a CAR-RXR heterodimer comprises or consists of one of the following sequences:

```
                              (SEQ ID NO: 71; human NR1x3)
ACTGTACTTTCCTGACCCTGAAGAGACTGTACTTTCCTGACCCTGAAGA
GACTGTACTTTCCTGACCCTGAAGAG;

(SEQ ID NO: 72; HMH hybrid)
ACTGTACTTTCCTGACCCTGGCACAGTGCCACCATGGACTTTCCT-
GAACCA;

(SEQ ID NO: 73; HMM hybrid)
ACTGTACTTTCCTGACCCTGGCACAGTGCCACCAT-
CAACTTGCCTGACACC;

(SEQ ID NO: 74; MHM hybrid)
TCTGTACTTTCCTGACCTTGAAGAGGTGGCACCAT-
CAACTTGCCTGACACC;
or (SEQ ID NO: 75; MHH hybrid)
TCTGTACTTTCCTGACCTTGAAGAGGTGGCAGCATGGACTTTCCT-
GAACCA,
``` or a functional variant thereof. The functional variant suitably comprises a sequence that is 80%, 85%, 90%, 95% or 99% identical to any of said sequences.

In a further aspect of the present invention there is provided a CRM that comprises a two or more CREs that are capable of being bound and activated by a CAR-RXR heterodimer which comprises or consists a functional variant of the PBREM element. Various CRMs comprising two or more CREs capable of being bound and activated by a CAR-RXR heterodimer are described above and also in respect of the first aspect of the invention, and these provide exemplary embodiments of the present aspect. In some embodiments the CRM comprises at least one non-natural CRE as discussed above, e.g. at least one hybrid CRE.

In some embodiments the CRM comprises one of the following sequences:

```
                                (SEQ ID NO: 76; 2x mouse PBREM CREs)
TCTGTACTTTCCTGACCTTGGCACAGTGCCACCATCAACTTGCCTGACACC-S-

CTGTACTTTCCTGACCTTGGCACAGTGCCACCATCAACTTGCCTGACACC;
```

-continued (SEQ ID NO: 77; 3x mouse PBREM CREs)
TCTGTACTTTCCTGACCTTGGCACAGTGCCACCATCAACTTGCCTGACACC-S-

TCTGTACTTTCCTGACCTTGGCACAGTGCCACCATCAACTTGCCTGACACC-S-

TCTGTACTTTCCTGACCTTGGCACAGTGCCACCATCAACTTGCCTGACACC-S-

TCTGTACTTTCCTGACCTTGGCACAGTGCCACCATCAACTTGCCTGACACC;

(SEQ ID NO: 78; 2x MHM hybrids CREs)
CTGTACTTTCCTGACCTTGAAGAGGTGGCACCATCAACTTGCCTGACACC-S-

TCTGTACTTTCCTGACCTTGAAGAGGTGGCACCATCAACTTGCCTGACACC;

(SEQ ID NO: 79; 2x human PBREM CREs)
ACTGTACTTTCCTGACCCTGAAGAGGTGGCAGCATGGACTTTCCTGAACCA-S-

ACTGTACTTTCCTGACCCTGAAGAGGTGGCAGCATGGACTTTCCTGAACCA;

(SEQ ID NO: 80; 3x human PBREM CREs)
ACTGTACTTTCCTGACCCTGAAGAGGTGGCAGCATGGACTTTCCTGAACCA-S-

ACTGTACTTTCCTGACCCTGAAGAGGTGGCAGCATGGACTTTCCTGAACCA-S-

ACTGTACTTTCCTGACCCTGAAGAGGTGGCAGCATGGACTTTCCTGAACCA, or a functional variant of any thereof. The functional variant suitably comprises a sequence that is 80%, 90%, 95% or 99% identical to any of said sequences, and wherein S is an optional spacer. When present, the spacer can have any suitable length, e.g. from 2 to 100 nucleotides, from 3 to 50 nucleotides, from 5 to 30 nucleotides, and from 10 to 25 nucleotides. In some embodiments it is referred that the spacer is a multiple of 5 in length. A spacer of approximately 20 nucleotides in length has been found to be suitable (e.g. from 18-22 nucleotides in length).

In some embodiments the CRM comprises one of the following sequences:

(SEQ ID NO: 81; 2x mouse PBREM CREs)
TCTGTACTTTCCTGACCTTGGCACAGTGCCACCATCAACTTGCCTGACA

CCCATTACTCGCATCCATTCTCTCTGTACTTTCCTGACCTTGGCACAGT

GCCACCATCAACTTGCCTGACACC;

(SEQ ID NO: 82; 3x mouse PBREM)
TCTGTACTTTCCTGACCTTGGCACAGTGCCACCATCAACTTGCCTGACA

CCCATTACTCGCATCCATTCTCTCTGTACTTTCCTGACCTTGGCACAGT

GCCACCATCAACTTGCCTGACACCGCACTGAAGGTCCTCAATCGTCTGT

ACTTTCCTGACCTTGGCACAGTGCCACCATCAACTTGCCTGACACCCTG

ACCTCCTGCCAGCAATATCTGTACTTTCCTGACCTTGGCACAGTGCCAC

CATCAACTTGCCTGACACC (SEQ ID NO: 83; 2x MHM hybrids)
CTGTACTTTCCTGACCTTGAAGAGGTGGCACCATCAACTTGCCTGACAC

CCATTACTCGCATCCATTCTCTCTGTACTTTCCTGACCTTGAAGAGGTG

GCACCATCAACTTGCCTGACACC;

(SEQ ID NO: 84; 2x human PBREM)
ACTGTACTTTCCTGACCCTGAAGAGGTGGCAGCATGGACTTTCCTGAAC

CACATTACTCGCATCCATTCTCACTGTACTTTCCTGACCCTGAAGAGGT

GGCAGCATGGACTTTCCTGAACCA;
or (SEQ ID NO: 85; 3x human PBREM)
ACTGTACTTTCCTGACCCTGAAGAGGTGGCAGCATGGACTTTCCTGAAC

CACATTACTCGCATCCATTCTCACTGTACTTTCCTGACCCTGAAGAGGT

GGCAGCATGGACTTTCCTGAACCAGCACTGAAGGTCCTCAATCGACTGT

ACTTTCCTGACCCTGAAGAGGTGGCAGCATGGACTTTCCTGAACCA, or a functional variant of any thereof. The functional variant suitably comprises a sequence that is 80%, 90%, 95% or 99% identical to any of said sequences.

In one embodiment, the cis-regulatory element, cis-regulatory module or promoter presented herein, or variants thereof, can enhance or drive expression of a gene in an non-liver or non-liver derived tissue (e.g. spleen, muscle, heart, lung, and brain). Gene expression in the non-liver tissue can be exclusive, or in addition to expression in a liver cell. When expression of the gene is driven in both the non-liver and liver tissue, the expression level in the non-liver tissue can be equal to, or greater than the expression level in the liver tissue. For example, a promoter presented herein, or variant thereof can drive equal expression of a gene in the liver and heart.

In a further aspect the present invention provides a recombinant virion (viral particle) comprising a gene therapy vector according to the present invention. The virion can be, for example an AAV particle, a retroviral particle, a lentiviral particle, or some another form of gene therapy viral particle.

The gene therapy vectors or virions of the present invention may be formulated in a pharmaceutical composition with a pharmaceutically acceptable excipient, i.e., one or more pharmaceutically acceptable carrier substances and/or additives, e.g., buffers, carriers, excipients, stabilisers, etc. The pharmaceutical composition may be provided in the form of a kit.

Accordingly, in a further aspect the present invention provides a pharmaceutical composition comprising a gene therapy vector or virion as set out above. The gene therapy vectors or virions of the present invention may be formulated in a pharmaceutical composition with a pharmaceutically acceptable excipient, i.e., one or more pharmaceutically acceptable carrier substances and/or additives, e.g., buffers, carriers, excipients, stabilisers, etc. The pharmaceutical composition may be provided in the form of a kit.

According to a further aspect of the present invention, there is provided a cell comprising a gene therapy vector, expression cassette, promoter, CRE, or CRM according to the various aspects of the invention.

Suitably the cell is a eukaryotic cell. The eukaryotic cell can suitably be a fungal cell (e.g. yeast cell), an animal (metazoan) cell (e.g. mammalian cells), or a plant cell. Alternatively, the cell may be a prokaryotic cell.

In some embodiments of the invention, the cell is ex vivo, e.g. in cell culture. In other embodiments of the invention the cell may be part of a tissue or multicellular organism.

In a preferred embodiment, the cell is a liver cell (hepatocyte), which may be ex vivo or in vivo. The liver cell may be a primary liver cell or a cell of a liver-derived cell line, e.g. an immortalised cell line. The cell may be present within a liver tissue environment (e.g. within a liver) or may be isolated from liver tissue, e.g. and it may be in cell culture. Suitably the cell is a human cell. Generally liver cells express both CAR and RXR. However, some liver-derived cell lines do not express CAR (e.g. the Huh7 cell line), and in such cases it is necessary to provide exogenous CAR. This can be achieved by providing to the cell a suitable expression construct comprising a nucleic acid encoding CAR operably linked to a promoter, e.g. a constitutively active promoter. Suitable approaches are known in the art and are described in the examples.

In some embodiments the cell has been modified to express CAR and/or RXR. Suitably in such embodiments the cell is a cell which does not normally express CAR, RXR or both CAR and RXR. Suitably the cell is not a liver cell. Accordingly, in some embodiments of the invention, the promoters, expression cassettes and vectors of the present invention are used in non-liver cells, which do not normally (i.e. in their natural state) express CAR and/or RXR; and thus promoters of the present invention would not normally be active in such cells. However, said cells have been modified such that it is able to express CAR and RXR and thus the promoter can be induced. By way of non-limiting example, the cell may be any type of animal primary cell or animal cell line.

The gene therapy vector, expression cassette, promoter, CRE, or CRM according to various aspects of the invention may be inserted into the genome of the cell, or it may be present in an episomal vector.

Suitable cells for the present invention include, but are not limited to, eukaryotic cells, such as yeast, plant, insect or mammalian cells. For example, the cells may any type of differentiated cells or may, be oocytes, embryonic stem cells, hematopoietic stem cells or other forms. In some embodiments the cells is an animal (metazoan) cell (e.g. mammalian cells). In some preferred embodiments the cells is a liver cell (e.g. a Huh7 cell, HepaRG cell, HEPG2 cell, etc.; a wide range of liver cells are available from ATCC, DSMZ and other sources). In some embodiments the cell is a mammalian cell. In some embodiments the mammalian cell is a human, simian, murine, rat, rabbit, hamster, goat, bovine, sheep or pig cell. Some preferred cells or "host cells" for the production of products of interest are human, mice, rat, monkey, or rodent cell lines. Hamster cells are preferred in some embodiments, e.g. BHK21, BHK TK⁻, CHO, CHO-K1, CHO-DUKX, CHO-DUKX B1, CHO-S and CHO-DG44 cells, or derivatives/progenies of any of such cell lines. In alternative embodiments, the cell could be a human cell. In some preferred embodiments the human cell could be a human embryonic kidney (HEK) cell, preferably a HEK 293 cell. In another preferred embodiment of the invention the cell may be a retinal cell, e.g. a retinal pigmented epithelium (RPE) cell, for example ARPE-19 (ATCC CRL-2302). Furthermore, murine myeloma cells, preferably NS0 and Sp2/0 cells or the derivatives/progenies of any of such cell lines are also well-known as production cell lines for biopharmaceutical proteins. Non-limiting examples of cell lines that can be used in the present invention and sources from which they can be obtained are summarised in Table 1. Suitable host cells are commercially available, for example, from culture collections such as the DSMZ (Deutsche Sammlung von Mikroorganismen and Zeilkuituren GmbH, Braunschweig, Germany) or the American Type Culture Collection (ATCC).

For bioprocessing applications, it may be preferred that cells are established, adapted, and completely cultivated under serum free conditions, and optionally in media which are free of any protein/peptide of animal origin. Commercially available media such as Ham's F12 (Sigma, Deisenhofen, Germany), RPMI-1640 (Sigma), Dulbecco's Modified Eagle's Medium (DMEM; Sigma), Minimal Essential Medium (MEM; Sigma), Iscove's Modified Dulbecco's Medium (IMDM; Sigma), CD-CHO (Invitrogen, Carlsbad, CA), CHO-S-SFMII (Invitrogen), serum-free CHO Medium (Sigma), protein-free CHO Medium (Sigma), EX-CELL Media (SAFC), CDM4CHO and SFM4CHO (HyClone) are exemplary appropriate nutrient solutions. Any of the media may be supplemented as necessary with a variety of compounds examples of which are hormones and/or other growth factors (such as insulin, transferrin, epidermal growth factor, insulin like growth factor), salts (such as sodium chloride, calcium, magnesium, phosphate), buffers (such as HEPES), nucleosides (such as adenosine, thymidine), glutamine, glucose or other equivalent energy sources, antibiotics, trace elements. Any other necessary supplements may also be included at appropriate concentrations that would be known to those skilled in the art. In the present invention the use of serum-free medium is preferred, but media supplemented with a suitable amount of serum can also be used for the cultivation of host cells. For the growth and selection of genetically modified cells expressing a selectable gene a suitable selection agent is added to the culture medium.

The cell may be a prokaryotic cell, e.g. a bacterial cell. In some embodiments of the invention the cell may be a prokaryotic cell; although prokaryotic cells do not possess the CAR/RXR systems associated with the present invention, prokaryotic cells may nonetheless be useful in production of a vector or other steps in handling, transportation or storage of a vector.

In some embodiments the cell is a packaging or producer cell for the production of a viral vector. For example, the cell can be a packaging or producer cell for the production of an AAV vector. Various a packaging or producer cell lines are known in the art. In a packaging or producer cell line, it may be preferred that the promoter of the present invention is operably linked to a viral protein, e.g. Rep or Cap or other viral structural or non-structural genes.

In a further aspect of the present invention, a promoter of the present invention can be operably associated with a gene encoding a viral protein or RNA. The viral protein can be a structural or non-structural protein. By way of non-limiting example, the viral protein can be an AAV protein, for example Rep or Cap protein, or it can be a viral helper protein such as E1A, E1B, E2A, or E4. In other embodiments, the viral protein can be REV, VSV-G, or RD114.

In a further aspect of the invention, there is provided a gene therapy vector, expression cassette, promoter, virion or pharmaceutical composition according to various aspects of the present invention for use in the treatment of a disease, preferably a disease associated with aberrant gene expression, optionally in the liver (e.g. a genetic liver disease).

Expression in the liver is of particular interest as it is involved in a wide range of essential functions in the body, including the synthesis of many proteins involved in metabolism, haemostasis, and protection against infection. Given that many diseases are linked to disruption of gene expression in the liver, there is a significant interest in developing gene therapy strategies that allow expression of a transgene in the liver to produce a therapeutic expression product. Diseases associated with aberrant gene expression include, but are not limited to, haemophilia (including haemophilia A or B), familial hypercholesterolemia, ornithine transcarbamylase deficiency, phenylketonuria, ornithine transcarbamylase deficiency, glycogen storage disease, α1-antitrypsin deficiency, hereditary hemochromatosis, tyrosinemia type 1, argininosuccinic aciduria, hepatitis virus infection, non-viral hepatitis, liver cancer, genetic cholestasis, Wilson's disease, and various other liver diseases (such as non-alcoholic fatty liver disease (NAFLD), and alcohol-related liver disease (ARLD). Use for the treatment of haemophilia A or B represent preferred embodiments of the various aspects of the invention.

In a further aspect, the present invention provides a method of producing an expression product, suitably a therapeutic expression product, in cells, suitably liver cells, the method comprising:

providing cells comprising an expression cassette comprising a synthetic liver-specific inducible promoter operably linked to a gene, the synthetic liver-specific inducible promoter comprising a cis-regulatory element (CRE) that is capable of being bound and activated by a heterodimer of CAR and RXR; and administering to said cells an inducer which is able to induce expression of the expression product from the gene operably linked to the inducible promoter in said expression cassette.

The method suitably comprises maintaining said cells under suitable conditions for expression of the expression product from the gene. In culture this may comprise incubating the cell, or tissue comprising the cell, under suitable culture conditions. The cell may of course be in vivo, e.g. in one or more cells in the liver of a subject. Thus, this aspect of the invention provides, inter alia, methods for producing a product of interest in a cell culture (e.g. in a bioprocessing application) or the expression of a therapeutic product (e.g. in a subject or ex vivo). Various cells suitable for use in this aspect are discussed above.

Suitably the method comprises the step of introducing the expression cassette into the liver. A wide range of methods of transfecting liver cells are well-known in the art. A preferred method of transfecting liver cells is transducing the cells with a viral vector comprising the synthetic liver-specific expression cassette, e.g. an AAV vector. Details of various vectors for use in the present invention are described below.

The method may include collecting or isolating the expression product. Suitable methods for collecting or isolating various expressions product (e.g. proteins or nucleic acids) are well known to the skilled person.

In some embodiments the cell is a liver cell. Generally liver cells express both CAR and RXR. However, some liver-derived cell lines do not express CAR (e.g. the Huh7 cell line), and in such cases it is necessary to provide exogenous CAR. This can be achieved by providing a suitable expression construct to express CAR in the cell, for example comprising a nucleic acid encoding CAR operably linked to a suitable promoter. Suitable expression vectors and other approaches for expressing CAR in any given cell are well known in the art.

Natural expression of CAR is generally limited to liver cells. Accordingly, where the cell does not express CAR (which is typical for non-liver cells), it will typically be necessary to provide exogenous CAR to the cell. As above, this can be achieved by providing a suitable expression construct to express CAR in the cell, for example comprising a nucleic acid encoding CAR operably linked to a suitable promoter. Suitable expression vectors and other approaches for expressing CAR in any given cell are well known in the art.

The inducer for use in the invention can be any agent which is suitable to induce activation of CAR and the formation of a CAR-RXR heterodimer. Such an inducer can induce expression from a PBREM element in a cell in which the expression cassette is present. There is a wide range of inducers of expression from the mouse and human PBREM elements known from the prior art (see, for example, HONKAKOSKI, et al., Molecular Pharmacology, 53:597-601 (1998), and Cherian et al. "Small-molecule modulators of the constitutive androstane receptor", *Expert Opin Drug Metab Toxicol.* 2015 July; 11(7): 1099-1114; Banerjee et al. "Targeting xenobiotic receptors PXR and CAR in human diseases", *Drug Discov. Today.* 2015 May; 20(5): 618-628; Omiecinski et al., "Multi-species Analyses of Direct Activators of the Constitutive Androstane Receptor" *Toxicological Sciences,* 123(2), 550-562 (2011)). Typically, these inducers are activating ligands for CAR. CAR is characterized by its broad specificity for various endogenous and exogenous ligands with varying chemical structures, which allows it to be a xenobiotic sensor. Table 1 of Cherian et al. lists various activators of activators of CAR in various species, which could be used as inducers in any aspect of the present invention.

For example, and without limitation, the inducer suitably comprises one or more agents selected from the following list:

phenobarbital (PB); a flavonoid compound, e.g. flavone, chrysin, baicalein, or galangin; 1,4-Bis[2-(3,5-dichloropyridyloxy)]benzene (TCPOBOP); 6-(4Chlorophenyl)imidazo[2,1-b][1,3]thiazole-5-carbaldehyde-O-(3,4-dichlorobenzyl)oxime (CITCO); Acetaminophen; Buprenorphine; Phenytoin; Carbamazepine; Valproic Acid; Artemisinin and derivatives; Chlorpromazine; Efavirenz; Nevirapine; Rilpivirine; Etravirine; Diazepam; Cyclophosphamid; Ifosfamide; Cerivastatin; Simvastatin; lovastatin; substituted sulphonamides; Thiazolidin-4-one; Estradiol; Estrone and analogues; 17α-ethinyl-3; 17ß-estradiol (EE2); Dehydroepiandrost erone (DHEA); 5ß-pregnane-3,20-dione; Diethylstilbestrol; Gingko biloba extract; Galangin; chrysin; baicalein; Diallyl sulphide; Ellagic acid; Resveratrol; Squalestatin-1; Bilobalide; Triclocarban; Triclosan; Dichlorodiphenyltrichloroethane (DDT); Dieldrin; Methoxychlor; Metofluthrin; Permethrin; Pyrethrins; Sulfoxaflor; Diethylhexyl phthalate (DEHP); Cyproconazole; Fluconazole; Propiconazole; FL81; Tri-p-methylphenyl phosphate (TMPP); UM104; and UM145.

In some preferred embodiments, the inducer is a drug (pharmaceutical agent), e.g. a drug that has regulatory approval in at least on country (preferably the US or a member of the EU) for use in humans or animals (preferably humans) to treat at least one medical condition. Alternatively, it can be preferred that the inducer has GRAS status in at least on country (preferably the US or a member of the EU). In some preferred embodiments the inducer comprises one or more agents selected from the following list:

phenobarbital (PB); flavonoid compounds, such as flavone, chrysin, baicalein, or galangin; Acetaminophen; Buprenorphine; Phenobarbital; Phenytoin; Carbamazepine; Valproic Acid; Artemisinin and derivatives; Chlorpromazine; Efavirenz; Nevirapine; Rilpivirine; Etravirine; Diazepam; Cyclophosphamid; Ifosfamide; Cerivastatin; Simvastatin; lovastatin; substituted sulphonamides; and Thiazolidin-4-one.

These compounds are all known drugs or are considered GRAS for use in humans, and thus can in general be used to induce expression in humans with a suitable degree of safety.

In some embodiments of the invention the inducer is phenobarbital. In some other embodiments the inducer is CITCO or TCPOBOP. In some other embodiments the inducer is a flavonoid, e.g. flavone.

The inducer can be administered to the cells in any suitable manner. For example, in cell culture the inducer can be added to the culture medium. When the cells are in in in vivo, e.g. the cells are in the liver of an animal, the inducer can be administered to the cells via systemic administration to the animal or through local administration to the target tissue (e.g. liver). A suitable dosage rate for any given inducer can be readily determined by the person skilled in the art. The person skilled in the art can thus readily determine for any inducer an appropriate way to deliver the inducer to the cells, and a suitable concentration to use. In the case of CITCO, administration of a concentration of from 0.5 µM to 3 µM, e.g. approximately 1 µM, to cells has been demonstrated in the examples below to be suitable to induce expression. In the case of TCPOBOP administration of a concentration of from 50 nM to 150 nM to cells has been demonstrated in the examples below to be suitable to induce expression. In the case of flavone, administration of a concentration of 30 µM to cells has been demonstrated in the examples below to be suitable to induce expression. However, other appropriate concentrations could be used, and the requisite dose to be administered to a patient can be determined by the skilled person. Accordingly, in some embodiments the present invention contemplates exposing the cells comprising the expression cassette to from 0.1 µM to 15 µM of CITCO in order to induce expression, e.g. from 0.25 µM to 6 µM, from 0.5 µM to 3 µM. In some embodiments the present invention contemplates exposing the cells comprising the expression cassette to from 10 nM or 750 nM of TCPOBOP in order to induce expression, e.g. from 25 nM to 300 nM, or from 50 nM to 150 nM. In some embodiments the present invention contemplates exposing the cells comprising the expression cassette to from 6 µM to 150 µM of flavone in order to induce expression, e.g. 15 to 150 µM, or 25 to 35 µM.

The method may suitably comprise ceasing to administer the inducer. Ceasing to administer the inducer will lead to at least a reduction of expression of the expression product. Typically, expression of the expression product will return to a baseline level over time.

The method may suitably comprise varying the concentration of the inducer administered to the cells over time. This can be used to modulate the level of expression of the expression product.

In some embodiments of the invention the concentration of the inducer administered to the cells over time is varied in order to modulate the dosage of a therapeutic gene product provided in a subject or to vary the production of an expression product in cell culture. In the case of therapy in a subject (discussed in more detail below), the concentration of the inducer can be varied in response to an alteration in the condition of a subject, the level of a biomarker in a subject, or any other reason.

In some embodiments the method involves administering an inhibitor to the cells. The inhibitor can be any agent which is suitable to inhibit or decrease activation of CAR and the formation of a CAR-RXR heterodimer. Addition of an inhibitor can be used to decrease or eliminate expression of the expression product (i.e. turn down or switch off expression). By way of non-limiting example, metformin is a known antagonist of CAR, which can be used as an inhibitor. Furthermore, androstenol and several isomers of androstanol, androstanes, are known to be endogenous antagonists of CAR, and these can be administered as inhibitors. Various inhibitors of CAR are discussed in Cherian et al. "Small-molecule modulators of the constitutive androstane receptor", *Expert Opin Drug Metab Toxicol.* 2015 July; 11(7): 1099-1114—see FIG. 1 which discloses various human, mouse and rat CAR inhibitors. Further CAR (or RXR) inhibitors which is suitable to inhibit or decrease formation of a CAR-RXR heterodimer that can be used in the present invention could of course be identified by the skilled person. A suitable dosage rate for any given inhibitor can be readily determined by the person skilled in the art.

In a further aspect, the present invention provides a method of expressing a therapeutic transgene in a liver cell, the method comprising introducing into the liver cell a gene therapy vector according to the present invention, and thereafter administering to the cell an inducer. Suitable inducers are discussed above. The liver cell can be in vivo or ex vivo. As mentioned above, the concentration of the inducer administered to the cell can be varied over time. Exemplary therapeutic genes for use in this aspect are discussed above.

It will be evident to the skilled person that a gene therapy vector, expression cassette, virion or pharmaceutical composition according to various aspects of the invention may be used for gene therapy. Accordingly, the use of the such gene therapy vectors, expression cassettes, virions or pharmaceutical compositions in gene therapy forms part of the present invention. An aspect of the invention thus provides a gene therapy vector, expression cassette, virion or pharmaceutical composition as set out herein for use in gene therapy, preferably gene therapy through liver-specific expression of a therapeutic gene, suitably for treatment of a disease involving aberrant gene expression in the liver.

In a further aspect the present invention provides a method of gene therapy of a subject, preferably a human, in need thereof, the method comprising:

introducing into the liver of the subject a gene therapy vector, expression cassette or virion of the present invention, which comprises a gene encoding a therapeutic product; and administering an inducer to the subject such that a therapeutically effective amount of the therapeutic product is expressed in the subject.

Suitable therapeutic genes are also discussed above. Conditions which can be treated are also discussed above, including but not limited to haemophilia (including haemophilia A or B), familial hypercholesterolemia, ornithine transcarbamylase deficiency, phenylketonuria, ornithine transcarbamylase deficiency, glycogen storage disease, a1-antitrypsin deficiency, hereditary hemochromatosis, tyrosinemia type 1, argininosuccinic aciduria, hepatitis virus infection, non-viral hepatitis, liver cancer, genetic cholestasis, Wilson's disease, and various other liver diseases (such as non-alcoholic fatty liver disease (NAFLD), alcohol-related liver disease (ARLD), and lysosomal storage disorders.

The method suitably comprises expressing a therapeutically effective amount of the therapeutic product from the gene in the liver of said subject. The therapeutic product may have a therapeutic effect in the liver or in another location in the subject. For example, the therapeutic product may be released into the blood stream.

Suitable inducers are set out above, as are methods of administration of the inducer. As discussed above, administration of the inducer may be ceased after a period of time, e.g. after a suitable therapeutic benefit has been achieved. Alternatively, the amount of the inducer administered to the subject may be varied over time. The amount of the inducer administered to the subject may be adjusted in order to obtain expression of a desired amount (dose) of the therapeutic product. Thus, where there is a clinical need for an increased amount of the therapeutic product (e.g. due to insufficient response in the subject), the amount of the inducer administered to the subject can be increased, and vice versa (e.g. due to an excessive response or undesirable side effects).

In some embodiments the method may comprise the steps of:
  determining the amount of the therapeutic product expressed in the subject or assessing the response of a subject to the therapeutic product, and:
  a) where a higher amount of the therapeutic product in the subject is desired, increasing the amount of inducer administered to the subject, or
  b) where a lower amount of the therapeutic product in the subject is desired, decreasing the amount of inducer administered to the subject.

Standard laboratory techniques can be used to determine the amount of the therapeutic product in the subject.

When considering that the amount of the inducer administered to the subject may be varied over time, it will of course be understood that the inducer will not typically be administered to the patient continuously, but rather will typically be administered at a given dosage level at a given time interval. The present invention thus contemplates varying the amount of inducer administered to the subject over time by adjusting the dose, adjusting the time period between doses, or both. Thus, for example, to increase the amount of inducer administered to a subject the dose can be increased while the time period between doses is kept constant, the dose can be kept constant while the time period between doses is reduced, or the dose can be increased and the time period between doses is reduced. To decrease the amount of inducer administered to a subject the dose can be decreased while the time period between doses is kept constant, the dose can be kept constant while the time period between doses is reduced, or the dose can be decreased and the time period between doses is increased.

Alternatively, or additionally, the method may comprise changing the inducer in order to alter the amount of the therapeutic product in the subject. For example, a weak inducer can be replaced with a stronger inducer, or vice versa.

The method may also comprise changing the inducer if, for example, the subject has an adverse reaction to an inducer, or the inducer is found to be ineffective in the subject.

The method may also comprise administering an inhibitor to the subject. Suitable inhibitors for use in the invention are discussed above. The inhibitor can be added to reduce or stop production of the therapeutic product in the subject. The amount of the inhibitor administered to the subject may be adjusted in order to obtain expression of a desired amount (dose) of the therapeutic product.

Genes encoding suitable therapeutic gene products are discussed above. However, specific mention may be made of therapeutic proteins, such as factor VIII and IX for the treatment of haemophilia.

The method suitably comprises administering a vector or virion according to the present invention to the subject. Suitably the vector is a viral gene therapy vector, preferably an AAV vector.

In some embodiments, the method comprises administering the viral gene therapy vector systemically. Systemic administration may be enteral (e.g. oral, sublingual, and rectal) or parenteral (e.g. injection). Preferred routes of injection include intravenous, intramuscular, subcutaneous, intra-arterial, intra-articular, intrathecal, and intradermal injections.

In some embodiments, the viral gene therapy vector may be administered concurrently or sequentially with one or more additional therapeutic agents or with one or more saturating agents designed to prevent clearance of the vectors by the reticular endothelial system.

Where the vector is an AAV vector, the dosage of the vector may be from $1\times10^{10}$ gc/kg to $1\times10^{15}$ gc/kg or more, suitably from $1\times10^{12}$ gc/kg to $1\times10^{14}$ gc/kg, suitably from $5\times10^{12}$ gc/kg to $5\times10^{13}$ gc/kg.

In general, the subject in need thereof will be a mammal, and preferably primate, more preferably a human. Typically, the subject in need thereof will display symptoms characteristic of a disease. The method typically comprises ameliorating the symptoms displayed by the subject in need thereof, by expressing the therapeutic amount of the therapeutic product.

Gene therapy protocols for therapeutic gene expression in target cells in vitro and in vivo, are well-known in the art and will not be discussed in detail here. Briefly, they include intramuscular injection, interstitial injection, instillation in airways, application to endothelium, intra-hepatic parenchyme, and intravenous or intra-arterial administration (e.g. intra-hepatic artery, intra-hepatic vein) of plasmid DNA vectors (naked or in liposomes) or viral vectors. Various devices have been developed for enhancing the availability of DNA to the target cell. While a simple approach is to contact the target cell physically with catheters or implantable materials containing the relevant vector, more complex approaches can use jet injection devices an suchlike. Gene transfer into mammalian liver cells has been performed using both ex vivo and in vivo procedures. The ex vivo approach typically requires harvesting of the liver cells, in vitro transduction with suitable expression vectors, followed by reintroduction of the transduced hepatocytes the liver. In vivo gene transfer has been achieved by injecting DNA or viral vectors into the liver parenchyma, hepatic artery, or portal vein.

In a further aspect of the invention, there is provided the use of a synthetic inducible promoter, synthetic expression cassette, vector or virion according to various aspects of the present invention for the manufacture of a pharmaceutical composition for treatment of any condition or disease mentioned herein.

In a further aspect, the present invention provides a method for producing an expression product, the method comprising the steps of:
  (a) providing a population of eukaryotic cells, preferably animal cells, more preferably mammalian cells, and more preferably liver cells, comprising an expression cassette comprising a synthetic liver-specific inducible promoter operably linked to a gene, the synthetic liver-specific inducible promoter comprising a cis-regulatory element (CRE) that is capable of being bound and activated by a heterodimer of CAR and RXR;

(b) culturing said population of cells; and (c) administering to said cells an inducer which is able to induce expression of the expression product from the gene operably linked to the inducible promoter in said expression cassette; and (d) recovering the expression product.

The method is preferably a method of bioprocessing, i.e. a process that uses living cells to obtain desired expression products. Preferred transgenes and products of interest that they encode are discussed above. The expression product may be useful for therapeutic, cosmetic, research or other industrial processes. Inducers and cells that are suitable for this aspect are discussed above.

Step (b) typically comprises maintaining said population of cells under suitable conditions for proliferation of the cells. The conditions typically prepare the cells for expression of the expression product from the transgene upon induction in step (c). The skilled person would be aware of suitable conditions for the various types of cells contemplated. The method thus suitably comprises incubating said population of cells under conditions suitable for growth of the cells prior to step (c) of treating said population of cells so as to induce expression.

The step of recovering the expression product typically comprises separating the expression product from said population of cells, and in some cases from other components of the cell culture medium. The method preferably comprises the step of purifying the expression product. Suitable methods of recovering and/or purifying an expression product are conventional in the art, and will depend on the specific nature of the expression product.

It will be apparent that the present invention allows for the production of the expression product to be delayed until a desired point in a cell culture process. This can, for example, permit the population of cells to be expanded until such time as a desired cell number or concentration is reached, or a desired growth phase is reached. This can be desirable for many reasons, e.g. to allow cells to grow under optimal conditions prior to expression of the transgene, which may inhibit growth. In the case of toxic proteins, for example, the production of a toxic expression product can be avoided until a cell culture system is at a desired stage. Once the toxic protein is expressed the cells will of course be adversely affected or killed. However, even for non-toxic expression products there may be considerable efficiency advantages in delaying expression of the transgene until a desired point.

The methods can be carried out in any suitable reactor including but not limited to stirred tank, airlift, fibre, microfibre, hollow fibre, ceramic matrix, fluidized bed, fixed bed, and/or spouted bed bioreactors. As used herein, "reactor" can include a fermenter or fermentation unit, or any other reaction vessel and the term "reactor" is used interchangeably with "fermenter". For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and $CO_2$ levels, maintenance of pH level, agitation (e.g., stirring), and/or cleaning/sterilizing. Example reactor units, such as a fermentation unit, may contain multiple reactors within the unit, for example the unit can have 1 to 10 or more bioreactors in each unit. In various embodiments, the bioreactor can be suitable for batch, semi fed-batch, fed-batch, perfusion, and/or a continuous fermentation process. In some embodiments, the bioreactor can have a volume of from about 100 ml to about 50,000 litres, preferably 10 litres or higher. Additionally, suitable reactors can be multi-use, single-use, disposable, or non-disposable and can be formed of any suitable material. U.S. Publication Nos. 2013/0280797, 2012/0077429, 2011/0280797, 2009/0305626, and U.S. Pat. Nos. 8,298,054, 7,629,167, and 5,656,491 (hereby incorporated by reference in their entirety) describe exemplary systems that may be used in the present invention.

In some preferred embodiments of the invention, the method is for the production of gene therapy viral vectors, e.g. rAAV viral particles. In this embodiment the cell is suitably a packaging cell or a producer cell, and one of the helper functions is under the control of the inducible promoter. By way of non-limiting example, the Rep, Cap, E1A, E1B, E2A, E4 and VA RNA genes can be placed under control of the inducible promoter. Due to its toxicity, controlling expression of Rep is of particular interest. Thus, in another aspect of the present invention, there is provided the use of a promoter as discussed herein to control expression of a viral protein in a method of producing a viral gene therapy product, preferably a viral helper protein, and more preferably the Rep gene.

In a further aspect, the invention provides a reactor vessel comprising a cell culture comprising cells the present invention and a medium sufficient to support growth of the cell. Various reactors suitable for the present invention are described above.

In a further aspect of the invention there is provided the use of bioprocessing vector or cell of the present invention in a bioprocessing method for the manufacture of a product of interest, e.g. a therapeutic product.

BRIEF DESCRIPTION OF THE FIGURES

FIG. 1A shows measurement of luciferase expression from the PB1-MinTK construct after transfection into Huh7 cells and treatment with DMSO, 50 nM, 150 nM and 250 nM TCPOBOP.

FIG. 1B shows measurement of luciferase expression from the PB1-MinTK construct after transfection into Huh7 cells, wherein the Huh7 cells were transfected with CAR or not transfected with CAR.

FIG. 1C shows the data from FIG. 1A represented as a ratio of the strong viral promoter CMV-IE. FIG. 1C also shows that in the absence of CAR, there is no luciferase expression. One PBREM element in combination with MinTK promoter drives expression to a maximum of 40% of the CMV-IE gene expression.

FIG. 1D shows measurement of EPO expression from the PB1-MinTK construct after transfection into Huh7 cells and treatment with DMSO, 0.5 µM, 1 µM, 2 µM and 3 µM CITCO. This figure also shows that addition of CITCO does not change the EPO expression from the promoter CMV-MP.

FIG. 3A shows luciferase expression from the PB1-SV40, PB1-1-SV40, PB1-2-SV40 and PB1-3-SV40 constructs which contain 1, 2, 3 and 4 PBREM elements respectively. The PBREM multimers in combination of SV40 promoter are inducible and increase the expression level but only up to 3 copies of the PBREM element.

FIG. 3B shows luciferase expression from the PB1-CMV, PB1-1-CMV, PB1-2-CMV and PB1-3-CMV constructs which contain 1, 2, 3 and 4 PBREM elements respectively. The PBREM multimers in combination of CMV promoter are inducible and increase the expression level but only up to 3 copies of the PBREM element.

FIG. 3C shows luciferase expression from the PB1-MinTK, PB1-1-MinTK, PB1-2-MinTK and PB1-3-MinTK constructs which contain 1, 2, 3 and 4 PBREM elements respectively. The PBREM multimers in combination of MinTK promoter are inducible and increase the expression level but only up to 3 copies of the PBREM element.

FIG. 4A shows luciferase expression from the PB1-MinTK construct in the pGL4.10 vector in AXOL ARE-hepatocytes, PB1-MinTK construct in pAAV vector in Huh7 cells and PB1-MinTK construct in pAAV vector in AXOL ARE-hepatocytes. The induction of luciferase expression from the PB1-MinTK construct is comparable across vectors and cell types.

FIG. 4B shows luciferase expression from PB1-2-MinTK construct in the pGL4.10 vector in AXOL ARE-hepatocytes, PB1-2-MinTK construct in pAAV vector in Huh7 cells and PB1-2-MinTK construct in pAAV vector in AXOL ARE-hepatocytes. The induction of luciferase expression from the PB1-2-MinTK construct is comparable across vectors and cell types.

FIG. 6 shows the mouse PBREM element. FIG. 6 discloses SEQ ID NO: 1.

DETAILED DESCRIPTION OF EMBODIMENTS OF THE INVENTION AND EXAMPLES

Figure 2A:
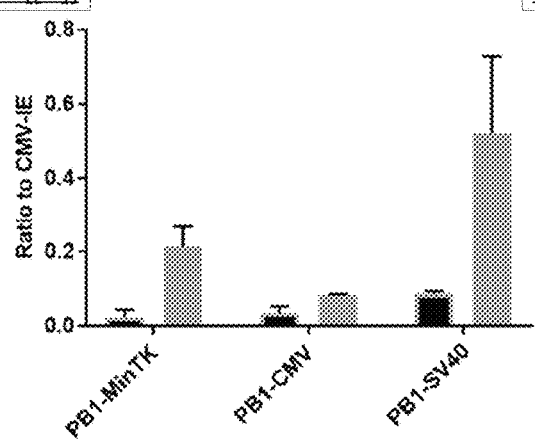
FIG. 2A shows measurement of luciferase expression from the PB1-MinTK, PB1-CMV-MP and PB1-SV40-MP constructs after transfection into AXOL ARE-hepatocytes and treatment with DMSO (left) or 1 µM CITCO (right).
Figure 2B:
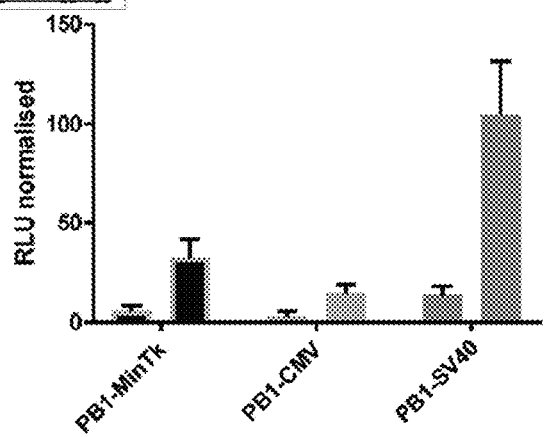
FIG. 2B shows the data from FIG. 2A represented as a ratio of the strong viral promoter CMV-IE.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The practice of the present invention will employ, unless otherwise indicated, conventional techniques of cell biology, cell culture, molecular biology, transgenic biology, microbiology, recombinant DNA, and immunology, which are within the skill of the art. Such techniques are explained fully in the literature. See, for example, Current Protocols in Molecular Biology (Ausubel, 2000, Wiley and son Inc, Library of Congress, USA); Molecular Cloning: A Laboratory Manual, Third Edition, (Sambrook et al, 2001, Cold Spring Harbor, New York: Cold Spring Harbor Laboratory Press); Oligonucleotide Synthesis (M. J. Gait ed., 1984); U.S. Pat. No. 4,683,195; Nucleic Acid Hybridization (Harries and Higgins eds. 1984); Transcription and Translation (Hames and Higgins eds. 1984); Culture of Animal Cells (Freshney, Alan R. Liss, Inc., 1987); Immobilized Cells and Enzymes (IRL Press, 1986); Perbal, A Practical Guide to Molecular Cloning (1984); the series, Methods in Enzymology (Abelson and Simon, eds.-in-chief, Academic Press, Inc., New York), specifically, Vols. 154 and 155 (Wu et al. eds.) and Vol. 185, "Gene Expression Technology" (Goeddel, ed.); Gene Transfer Vectors For Mammalian Cells (Miller and Calos eds., 1987, Cold Spring Harbor Laboratory); Immunochemical Methods in Cell and Molecular Biology (Mayer and Walker, eds., Academic Press, London, 1987); Handbook of Experimental Immunology, Vols. I-IV (Weir and Blackwell, eds., 1986); and Manipulating the Mouse Embryo, (Cold Spring Harbor Laboratory Press, Cold Spring Harbor, N.Y., 1986).

The discussion of the background to the invention herein is included to explain the context of the invention. This is not to be taken as an admission that any of the material referred to was published, known, or part of the common general knowledge in any country as of the priority date of any of the claims.

Throughout this disclosure, various publications, patents and published patent specifications are referenced by an identifying citation. All documents cited in the present specification are hereby incorporated by reference in their entirety. In particular, the teachings or sections of such documents herein specifically referred to are incorporated by reference.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "cis-regulatory element" or "CRE", is a term well-known to the skilled person, and means a nucleic acid sequence such as an enhancer, promoter, insulator, or silencer, that can regulate or modulate the transcription of a neighbouring gene (i.e. in cis). CREs are found in the vicinity of the genes that they regulate. CREs typically regulate gene transcription by binding to TFs, i.e. they include TFBS. A single TF may bind to many CREs, and hence control the expression of many genes (pleiotropy). CREs are usually, but not always, located upstream of the transcription start site (TSS) of the gene that they regulate. "Enhancers" are CREs that enhance (i.e. upregulate) the transcription of genes that they are operably associated with, and can be found upstream, downstream, and even within the introns of the gene that they regulate. Multiple enhancers can act in a coordinated fashion to regulate transcription of one gene. "Silencers" in this context relates to CREs that bind TFs called repressors, which act to prevent or down-regulate transcription of a gene. The term "silencer" can also refer to a region in the 3' untranslated region of messenger RNA, that bind proteins which suppress translation of that mRNA molecule, but this usage is distinct from its use in describing a CRE. Generally, the CREs of the present invention are liver-specific inducible enhancers. In the present context, it is preferred that the CRE is located 1500 nucleotides or less from the transcription start site (TSS), more preferably 1000 nucleotides or less from the TSS, more preferably 500 nucleotides or less from the TSS, and suitably 250, 200, 150, or 100 nucleotides or less from the TSS. CREs of the present invention are preferably comparatively short in length, preferably 100 nucleotides or less in length, for example they may be 90, 80, 70, 60 nucleotides or less in length.

The term "cis-regulatory module" or "CRM" means a functional module made up of two or more CREs; in the present invention the CREs are typically liver-specific inducible enhancers. Thus, in the present application a CRM typically comprises a plurality of liver-specific inducible CREs. Typically, the multiple CREs within the CRM act together (e.g. additively or synergistically) to enhance the transcription of a gene that the CRM is operably associated with. There is conservable scope to shuffle (i.e. reorder), invert (i.e. reverse orientation), and alter spacing in CREs within a CRM. Accordingly, functional variants of CRMs of the present invention include variants of the referenced CRMs wherein CREs within them have been shuffled and/or inverted, and/or the spacing between CREs has been altered.

As used herein, the term "promoter" refers to a region of DNA that generally is located upstream of a nucleic acid sequence to be transcribed that is needed for transcription to occur, i.e. which initiates transcription. Promoters permit the proper activation or repression of transcription of a coding sequence under their control. A promoter typically contains specific sequences that are recognized and bound by plurality of TFs. TFs bind to the promoter sequences and result in the recruitment of RNA polymerase, an enzyme that synthesizes RNA from the coding region of the gene. A great many promoters are known in the art. The inducible promoters of the present invention typically drive a low level of expression prior to being induced, and upon induction they drive a significantly higher level of expression (e.g. a 2, 3, 4, 5, 6, 7, 8, 9, or even 10 fold increase in expression after induction.

The promoters of the present invention are synthetic promoters. The term "synthetic promoter" as used herein relates to a promoter that does not occur in nature. In the present context it typically comprises a synthetic CRE and/or CRM of the present invention operably linked to a minimal (or core) promoter or liver-specific proximal promoter. The CREs and/or CRMs of the present invention serve to provide inducible liver-specific transcription of a gene operably linked to the promoter. Parts of the synthetic promoter may be naturally occurring (e.g. the minimal promoter or one or more CREs in the promoter), but the synthetic promoter as a complete entity is not naturally occurring.

As used herein, "minimal promoter" (also known as the "core promoter") refers to a short DNA segment which is inactive or largely inactive by itself, but can mediate transcription when combined with other transcription regulatory elements. Minimum promoter sequence can be derived from various different sources, including prokaryotic and eukaryotic genes. Examples of minimal promoters are discussed above, and include the dopamine beta-hydroxylase gene minimum promoter, cytomegalovirus (CMV) immediate early gene minimum promoter (CMV-MP), SV40 minimal promoter (SV40-MP), and the herpes thymidine kinase minimal promoter (MinTK). However, the proximal promoter can be synthetic. A minimal promoter typically comprises the transcription start site (TSS) and elements directly upstream, a binding site for RNA polymerase II, and general transcription factor binding sites (often a TATA box).

As used herein, "proximal promoter" relates to the minimal promoter plus the proximal sequence upstream of the gene that tends to contain primary regulatory elements. It often extends approximately 250 base pairs upstream of the TSS, and includes specific TFBS. In the present case, the proximal promoter is suitably a naturally occurring liver-specific proximal promoter that can be combined with one or more CREs or CRMs of the present invention. However, the proximal promoter can be synthetic.

A "functional variant" of an cis-regulatory element, cis-regulatory module, promoter or other nucleic acid sequence in the context of the present invention is a variant of a reference sequence that retains the ability to function in the same way as the reference sequence, e.g. as an inducible liver-specific cis-regulatory enhancer element, inducible liver-specific cis-regulatory module or inducible liver-specific promoter. Alternative terms for such functional variants include "biological equivalents" or "equivalents".

It will be appreciated that, as discussed above, the ability of a given cis-regulatory element to function as an inducible liver-specific enhancer is determined principally by the ability of the sequence to be bound by the CAR-RXR heterodimer such the expression is induced. Accordingly, in most cases, a functional variant of a cis-regulatory element will contain a suitable binding site for the CAR-RXR heterodimer. The CAR-RXR heterodimer is believed to bind to the NR1 motif in the wild type PBREM element, and thus a sequence which can function as an NR1 motif is desired. There is a very high degree of sequence conservation between mouse and human PBREM in the NR1 motif, and thus it is typically desired that a high level of identity to the NR1 motif is preserved in any functional variant. Additional sequences in the in the wild type PBREM element may contribute to minimising background expression and providing high levels of inducibility, and thus it is generally preferred that a functional variant contains at least some degree of sequence identity in these other areas. Levels of sequence identity between a functional variant and a reference sequence can thus be an indicator or retained functionality. High levels of sequence identity in the NR1 motif of the cis-regulatory element is of generally higher importance than sequence identity in other regions (e.g. NF1 and NR2, where there is considerably less need, if any, for any conservation of sequence).

The ability of CAR-RXR heterodimer to bind to a given CRE can determined by any relevant means known in the art, including, but not limited to, electromobility shift assays (EMSA), binding assays, chromatin immunoprecipitation (ChIP), and ChIP-sequencing (ChIP-seq). In a preferred embodiment the ability of the CAR-RXR heterodimer to bind a given functional variant is determined by EMSA. Methods of performing EMSA are well-known in the art. Suitable approaches are described in Sambrook et al. cited above. Many relevant articles describing this procedure are available, e.g. Hellman and Fried, Nat Protoc. 2007; 2(8): 1849-1861.

"Liver-specific" or "liver-specific expression" refers to the ability of a cis-regulatory element, cis-regulatory module or promoter to enhance or drive expression of a gene in the liver (or in liver-derived cells) in a preferential or predominant manner as compared to other tissues (e.g. spleen, muscle, heart, lung, and brain). In the case of the present invention that expression should be inducible, i.e. expression of the gene only occurs, or increases significantly, when a suitable inducer is administered (inducers for use in all aspects of the present invention are discussed above). Expression of the gene can be in the form of mRNA or protein. In preferred embodiments, liver-specific expression is such that there is negligible expression in other (i.e. non-liver) tissues or cells, i.e. expression is highly liver-specific.

The ability of a promoter to function as an liver-specific inducible promoter can be readily assessed by the skilled person. The skilled person can thus easily determine whether any variant of the specific promoters exemplified herein remains functional (i.e. it is a functional variant as defined above). For example, any given CRE to be assessed can be operably linked to a minimal promoter (e.g. positioned upstream of MinTK) and the ability of the cis-regulatory element to provide inducible liver-specific expression of a gene (typically a reporter gene) is measured. Alternatively, a variant of a CRE can be substituted into an inducible liver-specific promoter in place of a reference CRE, and the effects on inducible liver-specific expression driven by said modified promoter can be determined and compared to the unmodified form. Similarly, the ability of a promoter to induce liver-specific expression can be readily assessed by the skilled person (e.g. as described in the examples below). Expression levels and inducibility of a gene driven by a variant of a reference promoter can be compared to the expression levels and inducibility by the reference sequence, and suitable approaches are discussed above.

Liver-specificity can be identified wherein the expression of a gene (e.g. a therapeutic or reporter gene) when induced occurs preferentially or predominantly in liver-derived cells. Preferential or predominant expression can be defined, for example, where the level of expression when induced is significantly greater in liver-derived cells than in other types of cells (i.e. non-liver-derived cells). For example, expression in liver-derived cells when induced is suitably at least 5-fold higher than non-liver cells, preferably at least 10-fold higher than non-liver cells, and it may be 50-fold higher or more in some cases. For convenience, liver-specific expression can suitably be demonstrated via a comparison of expression levels in a hepatic cell line (e.g. liver-derived cell line such as Huh7 and/or HepG2 cells) or liver primary cells, compared with expression levels in a kidney-derived cell line (e.g. HEK-293), a cervical tissue-derived cell line (e.g. HeLa) and/or a lung-derived cell line (e.g. A549).

The liver-specific inducible promoters of the present invention preferably have a reduced expression at a level of at least 4-fold less than the CMV-IE promoter in non-liver-derived cells, suitably in HEK-293, HeLa, and/or A549 cells when induced.

The liver-specific inducible promoters of the present invention are preferably suitable for promoting expression in the liver of a subject, e.g. driving liver-specific expression of a transgene, preferably a therapeutic transgene.

It should also be noted that the liver-specific promoters of the present invention can, in some cases, be used in non-liver cells. Generally non-liver cells do not express CAR, and thus the promoters of the invention do not function in such cells. However, where non-liver cells are engineered to express CAR (and RXR if they do not naturally express RXR) such non-liver cells can inducible express genes linked to the promoters of the present invention. In other word, the liver-specific promoters of the present invention can also function in non-liver cells that have been modified to have a liver-like phenotype in terms of CAR and RXR expression. The term "liver-specific" should be construed accordingly. Where liver cells do not express CAR (e.g. the Huh-7 cell line) or the RXR, they can likewise be modified to express the relevant protein.

The term "nucleic acid" as used herein typically refers to an oligomer or polymer (preferably a linear polymer) of any length composed essentially of nucleotides. A nucleotide unit commonly includes a heterocyclic base, a sugar group, and at least one, e.g. one, two, or three, phosphate groups, including modified or substituted phosphate groups. Heterocyclic bases may include inter alia purine and pyrimidine bases such as adenine (A), guanine (G), cytosine (C), thymine (T) and uracil (U) which are widespread in naturally-occurring nucleic acids, other naturally-occurring bases (e.g., xanthine, inosine, hypoxanthine) as well as chemically or biochemically modified (e.g., methylated), non-natural or derivatised bases. Sugar groups may include inter alia pentose (pentofuranose) groups such as preferably ribose and/or 2-deoxyribose common in naturally-occurring nucleic acids, or arabinose, 2-deoxyarabinose, threose or hexose sugar groups, as well as modified or substituted sugar groups. Nucleic acids as intended herein may include naturally occurring nucleotides, modified nucleotides or mixtures thereof. A modified nucleotide may include a modified heterocyclic base, a modified sugar moiety, a modified phosphate group or a combination thereof. Modifications of phosphate groups or sugars may be introduced to improve stability, resistance to enzymatic degradation, or some other useful property. The term "nucleic acid" further preferably encompasses DNA, RNA and DNA RNA hybrid molecules, specifically including hnRNA, pre-mRNA, mRNA, cDNA, genomic DNA, amplification products, oligonucleotides, and synthetic (e.g., chemically synthesised) DNA, RNA or DNA RNA hybrids. A nucleic acid can be naturally occurring, e.g., present in or isolated from nature; or can be non-naturally occurring, e.g., recombinant, i.e., produced by recombinant DNA technology, and/or partly or entirely, chemically or biochemically synthesised. A "nucleic acid" can be double-stranded, partly double stranded, or single-stranded. Where single-stranded, the nucleic acid can be the sense strand or the antisense strand. In addition, nucleic acid can be circular or linear.

The terms "identity" and "identical" and the like refer to the sequence similarity between two polymeric molecules, e.g., between two nucleic acid molecules, such as between two DNA molecules. Sequence alignments and determination of sequence identity can be done, e.g., using the Basic Local Alignment Search Tool (BLAST) originally described by Altschul et al. 1990 (J Mol Biol 215: 403-10), such as the "Blast 2 sequences" algorithm described by Tatusova and Madden 1999 (FEMS Microbiol Lett 174: 247-250).

Methods for aligning sequences for comparison are well-known in the art. Various programs and alignment algorithms are described in, for example: Smith and Waterman (1981) Adv. Appl. Math. 2:482; Needleman and Wunsch (1970) J. Mol. Biol. 48:443; Pearson and Lipman (1988) Proc. Natl. Acad. Sci. U.S.A. 85:2444; Higgins and Sharp (1988) Gene 73:237-44; Higgins and Sharp (1989) CABIOS 5:151-3; Corpet et al. (1988) Nucleic Acids Res. 16:10881-90; Huang et al. (1992) Comp. Appl. Biosci. 8:155-65; Pearson et al. (1994) Methods Mol. Biol. 24:307-31; Tatiana et al. (1999) FEMS Microbiol. Lett. 174:247-50. A detailed consideration of sequence alignment methods and homology calculations can be found in, e.g., Altschul et al. (1990) J. Mol. Biol. 215:403-10.

The National Center for Biotechnology Information (NCBI) Basic Local Alignment Search Tool (BLAST™; Altschul et al. (1990)) is available from several sources, including the National Center for Biotechnology Information (Bethesda, MD), and on the internet, for use in connection with several sequence analysis programs. A description of how to determine sequence identity using this program is available on the internet under the "help" section for BLAST™. For comparisons of nucleic acid sequences, the "Blast 2 sequences" function of the BLAST™ (Blastn) program may be employed using the default parameters. Nucleic acid sequences with even greater similarity to the reference sequences will show increasing percentage identity when assessed by this method. Typically, the percentage sequence identity is calculated over the entire length of the sequence.

For example, a global optimal alignment is suitably found by the Needleman-Wunsch algorithm with the following scoring parameters: Match score: +2, Mismatch score: −3; Gap penalties: gap open 5, gap extension 2. The percentage identity of the resulting optimal global alignment is suitably calculated by the ratio of the number of aligned bases to the total length of the alignment, where the alignment length includes both matches and mismatches, multiplied by 100.

Synthetic" in the present application means a nucleic acid molecule that does not occur in nature. Synthetic nucleic acid expression constructs of the present invention are produced artificially, typically by recombinant technologies. Such synthetic nucleic acids may contain naturally occurring sequences (e.g. promoter, enhancer, intron, and other such regulatory sequences), but these are present in a non-naturally occurring context. For example, a synthetic gene (or portion of a gene) typically contains one or more nucleic acid sequences that are not contiguous in nature (chimeric sequences), and/or may encompass substitutions, insertions, and deletions and combinations thereof.

"Complementary" or "complementarity", as used herein, refers to the Watson-Crick base-pairing of two nucleic acid sequences. For example, for the sequence 5'-AGT-3' binds to the complementary sequence 3'-TCA-5'. Complementarity between two nucleic acid sequences may be "partial", in which only some of the bases bind to their complement, or it may be complete as when every base in the sequence binds to its complementary base. The degree of complementarity between nucleic acid strands has significant effects on the efficiency and strength of hybridisation between nucleic acid strands.

"Transfection" in the present application refers broadly to any process of deliberately introducing nucleic acids into cells, and covers introduction of viral and non-viral vectors, and includes transformation, transduction and like terms and processes. Examples include, but are not limited to: transfection with viral vectors; transformation with plasmid vectors; electroporation (Fromm et al. (1986) Nature 319:791-3); lipofection (Feigner et al. (1987) Proc. Natl. Acad. Sci. USA 84:7413-7); microinjection (Mueller et al. (1978) Cell 15:579-85); *Agrobacterium*-mediated transfer (Fraley et al. (1983) Proc. Natl. Acad. Sci. USA 80:4803-7); direct DNA uptake; whiskers-mediated transformation; and microprojectile bombardment (Klein et al. (1987) Nature 327:70).

As used herein, the phrase "transgene" refers to an exogenous nucleic acid sequence. In one example, a transgene is a gene encoding an industrially or pharmaceutically useful compound, or a gene encoding a desirable trait. In yet another example, the transgene encodes an antisense nucleic acid sequence, wherein expression of the antisense nucleic acid sequence inhibits expression of a target nucleic acid sequence.

The term "vector" is well known in the art, and as used herein refers to a nucleic acid molecule, e.g. double-stranded DNA, which may have inserted into it a nucleic acid sequence according to the present invention. A vector is suitably used to transport an inserted nucleic acid molecule into a suitable host cell. A vector typically contains all of the necessary elements that permit transcribing the insert nucleic acid molecule, and, preferably, translating the transcript into a polypeptide. A vector typically contains all of the necessary elements such that, once the vector is in a host cell, the vector can replicate independently of, or coincidental with, the host chromosomal DNA; several copies of the vector and its inserted nucleic acid molecule may be generated. Vectors of the present invention can be episomal vectors (i.e., that do not integrate into the genome of a host cell), or can be vectors that integrate into the host cell genome. This definition includes both non-viral and viral vectors. Non-viral vectors include but are not limited to plasmid vectors (e.g. pMA-RQ, pUC vectors, bluescript vectors (pBS) and pBR322 or derivatives thereof that are devoid of bacterial sequences (minicircles)) transposons-based vectors (e.g. PiggyBac (PB) vectors or Sleeping Beauty (SB) vectors), etc. Larger vectors such as artificial chromosomes (bacteria (BAC), yeast (YAC), or human (HAC)) may be used to accommodate larger inserts. Viral vectors are derived from viruses and include but are not limited to retroviral, lentiviral, adeno-associated viral, adenoviral, herpes viral, hepatitis viral vectors or the like. Typically, but not necessarily, viral vectors are replication-deficient as they have lost the ability to propagate in a given cell since viral genes essential for replication have been eliminated from the viral vector. However, some viral vectors can also be adapted to replicate specifically in a given cell, such as e.g. a cancer cell, and are typically used to trigger the (cancer) cell-specific (onco)lysis. Virosomes are a non-limiting example of a vector that comprises both viral and non-viral elements, in particular they combine liposomes with an inactivated HIV or influenza virus (Yamada et al., 2003). Another example encompasses viral vectors mixed with cationic lipids.

The term "operably linked", "operably connected" or equivalent expressions as used herein refer to the arrangement of various nucleic acid elements relative to each such that the elements are functionally connected and are able to interact with each other in the manner intended. Such elements may include, without limitation, a promoter, an enhancer and/or a regulatory element, a polyadenylation sequence, one or more introns and/or exons, and a coding sequence of a gene of interest to be expressed. The nucleic acid sequence elements, when properly oriented or operably linked, act together to modulate the activity of one another, and ultimately may affect the level of expression of an expression product. By modulate is meant increasing, decreasing, or maintaining the level of activity of a particular element. The position of each element relative to other elements may be expressed in terms of the 5' terminus and the 3' terminus of each element, and the distance between any particular elements may be referenced by the number of intervening nucleotides, or base pairs, between the elements.

As understood by the skilled person, operably linked implies functional activity, and is not necessarily related to a natural positional link. Indeed, when used in nucleic acid expression cassettes, cis-regulatory elements will typically be located immediately upstream of the promoter (although this is generally the case, it should definitely not be interpreted as a limitation or exclusion of positions within the nucleic acid expression cassette), but this needs not be the case in vivo, e.g., a regulatory element sequence naturally occurring downstream of a gene whose transcription it affects is able to function in the same way when located upstream of the promoter. Hence, according to a specific embodiment, the regulatory or enhancing effect of the regulatory element is position-independent.

A "spacer sequence" or "spacer" as used herein is a nucleic acid sequence that separates two functional nucleic acid sequences (e.g. TFBS, CREs, CRMs, minimal promoters, etc.). It can have essentially any sequence, provided it does not prevent the functional nucleic acid sequence (e.g. cis-regulatory element) from functioning as desired (e.g. this could happen if it includes a silencer sequence, prevents binding of the desired transcription factor, or suchlike). Typically, it is non-functional, as in it is present only to space adjacent functional nucleic acid sequences from one another.

The term "pharmaceutically acceptable" as used herein is consistent with the art and means compatible with the other ingredients of the pharmaceutical composition and not deleterious to the recipient thereof.

"Therapeutically effective amount" and like phrases mean a dose or plasma concentration in a subject that provides the desired specific pharmacological effect, e.g. to express a therapeutic gene in the liver. It is emphasized that a therapeutically effective amount may not always be effective in treating the conditions described herein, even though such dosage is deemed to be a therapeutically effective amount by those of skill in the art. The therapeutically effective amount may vary based on the route of administration and dosage form, the age and weight of the subject, and/or the disease or condition being treated.

The terms "treatment" or "treating" refer to reducing, ameliorating or eliminating one or more signs, symptoms, or effects of a disease or condition.

The terms "individual," "subject," and "patient" are used interchangeably, and refer to any individual subject with a disease or condition in need of treatment. For the purposes of the present disclosure, the subject may be a primate, preferably a human, or another mammal, such as a dog, cat, horse, pig, goat, or bovine, and the like.

Technical Introduction

Nuclear Receptors

Nuclear receptors play vital roles in converting chemical changes in the cellular environment into transcriptional and therefore biological changes. This function is essential in maintaining the homeostasis of not just cells but whole organisms. Nuclear receptors are only found in metazoans with a vast difference in the number across species, e.g. Humans have 48 and *C. elegans* have 270.

Since their discovery the importance and number of nuclear receptors has grown substantially, and these proteins are now recognised as a protein superfamily. This family includes receptors that bind to and respond to steroids, thyroid hormones, nutrients and xenobiotic chemicals. Once bound by a ligand the receptors undergo a conformational change and bind to DNA thereby initiating or repressing gene expression. This ability to bind genomic DNA is key to the receptors function and its importance in cellular fate, body development and metabolism. The number of ligands that have been shown to bind nuclear receptors is constantly expanding and belies the function of the cognate receptor. Ligands range from endogenous hormones to vitamins and xenobiotics highlighting their importance to cell metabolism and homeostasis. Due to the profound effect that these receptors can have on the transcriptome they are excellent targets for drug treatment and it is estimated that ~13% of FDA approved drugs target nuclear receptors.

Structure

Nuclear receptors have a mass between 50-100 kDa and the mature polypeptides are organised into 5 domains:

A/B: Highly variable between receptors. Contains the activation function 1 (AF-1) which acts as a weak transcriptional activator in absence of ligand but a strong activator when ligand is bound. This is due to interaction with the AF-2 in the E domain.

C: Highly conserved domain that contains 2 zinc fingers that binds to the DNA response element.

D: Flexible domain that connects and allows interaction between the LBD and the DBD. Important in cellular trafficking and subcellular distribution E: Highly conserved in structure but only moderate conservation in sequence. Contains the ligand binding cavity and confers ligand specificity on the receptor. Contributes to the dimerisation interface along with the DBD, also binds coactivators and repressors. Contains activation factor 2 (AF2) whose action is dependent on ligand binding.

F: Highly variable C-terminal domain.

Mechanism of Action

Nuclear receptors can be classed into 4 types based on their mechanism of action. Below is a summary of each of the types:

Type I: These receptors are found in the cytoplasm of the cell in and inactivated state. Binding of ligand causes dissociation of heat shock proteins (HSP), homo-dimerisation, translocation to the nucleus and binding to the receptor's DNA response motif. These receptor's bind to a DNA motif that consists of 2% sites separated by a variable length of DNA (direct repeats 1-5 (DR1-5)) with the second % site being an inverted repeat of the $1^{st}$. Some of this class of receptors bind to direct repeats and can bind as either monomers/dimers or in the case of the constitutive androstane receptor as heterodimer with RXR.

Type II: These receptors, whether inactive or active, reside in the nucleus. They usually bind to DNA as a heterodimer with RXR. In the absence of ligand these receptors are often complexed with corepressor proteins.

Type III: Similar to type I receptors but bind to exclusively to direct repeats of DNA sequences.

Type IV: These can bind as monomers of dimers but only single DNA binding domain binds to a single half-site on the DNA.

The Constitutive Androstane Receptor (CAR)

Constitutive androstane receptor (CAR)—or nuclear receptor subfamily 1, group I, member 3—is a member of the nuclear receptor superfamily that is almost exclusively expressed in liver cells. It is here that, CAR in tandem with another nuclear receptor, pregnane X receptor (PXR) acts a sensor of endobiotic and xenobiotic chemicals. Once bound by activating substances these receptors modulate the activity of numerous genes, including the cytochrome p450s, and are therefore responsible for the metabolism and excretion of these compounds. It is through this binding and gene activation activity that CAR and PXR perform a major role in the detoxification of foreign chemicals in the body.

Function:

As indicated above CAR functions as key regulator of xenobiotic and endobiotic metabolism. It has a predicted 24 transcripts in the liver. It has been shown that some of these transcripts are responsible for low level constitutive activity of this receptor whereas other transcripts are inducible. Constitutive activity is believed to be modulated by interactions with transcriptional coactivators such as steroid receptor coactivator 1 (SRC1). This activity can be repressed by binding of inverse agonists such as androstane.

Ligand Activation:

Inactive CAR is phosphorylated and resides in the cytoplasm of the cell. Here it forms a complex with heat shock protein 90 (hsp90) and the cytoplasmic CAR retention protein (CCRP), this association is what keeps CAR in the cytoplasm and therefore inactive. This inactive CAR can be activated in 2 ways 1) direct ligand binding such as by TCPOBOP a mouse CAR ligand or 2) by indirect activation via phenobarbital. Both pathways lead to the dissociation of CAR from the multiprotein complex and allow its translocation to the nucleus. In the nucleus CAR can either act as monomer or form a heterodimer with retinoid X receptor (RXR). Nuclear CAR binds DNA at the phenobarbital response element (PBREM) through which it activates CAR regulated genes e.g. CYP2B, CYP2C and CYP3A subfamilies.

Direct Activation:

TCPOBOP is a thought to bind directly to mouse CAR and induce its translocation to the nucleus. However, this chemical does not bind to the human CAR therefore for human studies CITCO is an equivalent compound.

Indirect Activation:

Indirect activation of CAR by phenobarbital (PB), a anticonvulsant, is a widely recognised model for indirect CAR activation. PB causes the dephosphorylation of CAR through activation of the phosphatase PP2A. The exact mechanism of PP2A activation is unknown however, PB activates AMP-activated protein kinase which may activate PP2A which is then recruited by the multiprotein complex.

Another theory is that PB competes with epidermal growth factor (EGF) for its receptor, epidermal growth factor receptor (EGFR). The disassociation of EGF and EGFR inactivates SRC1 which leads to dephosphorylation of the receptor for activated C kinase 1 (RACK 1) leading to stimulation of PP2A.

PBREM Element:

The DNA binding site for the mouse CAR homolog was identified by Honkakoski et al. (MOLECULAR PHARMACOLOGY, 53:597-601 (1998)). In this study they found that a RXR and CAR heterodimer bind to a site in the phenobarbital-responsive enhancer module (PBREM) of the cytochrome P-450 Cyp2b10 gene in response to phenobarbital induction. Expression of RXR and CAR in mammalian cell lines activated PBREM, indicating that a CAR-RXR heterodimer is a trans-acting factor for the Cyp2b10 gene. It was also shown that this heterodimer bound to 2 imperfect direct repeat-4 motifs and that this motif was conserved in humans. The PBREM element is shown in FIG. 6 with NR1 and NR2 being the nuclear receptor binding sites with the imperfect direct repeats in bold. NFI binding site is indicated. It appears that CAR-RXR heterodimer binds to the NR1 site.

The human PBREM element has also been identified, Sueyoshi, et al. (J. BIOL. CHEM. Vol. 274, 10, pp. 6043-6046, 1999).

The sequences and alignment of the mouse and human PBREM elements are shown below, and the so-called NR1 motif is underlined in each (SEQ ID NO shown in brackets):

```
TCTGTACTTTCCTGACCTTGGCACAGTGCCACCATCAACTTGCCTGACACC (1)
|||||||||||||||| ||    ||| || |||  |||| |||||   |
ACTGTACTTTCCTGACCCTGAAGAGGTGGCAGCATGGACTTTCCTGAACCA (2)
```

It can be seen that there is a very high level of conservation in the NR1 motif and much lower levels of identity in other areas.

The present invention is based upon the surprising finding that the PBREM element, and functional variants thereof, can be used to provide inducible expression, for example, when provided in a gene therapy vector. The present invention allows for useful levels of inducibility and low levels of background (constitutive expression).

Example 1

The PBREM enhancer was used together with the MinTK promoter to drive the expression of luciferase and EPO.

Materials

Huh7 cells which are a human liver cell line
DPBS: without $CaCl_2$, without $MgCl_2$ (Gibco, 14190-094)
DMEM (Sigma, D6546)
FBS (Sigma, F9665)
Pen-Strep (Sigma, P4333)
Promega Fugene-HD (E2311)
TCPOBOP (Sigma, T2320)
CITCO (Cayman Chemicals Company, 16027)
pcDNA6 plasmid which contains the β-galactosidase gene used as internal control for transfection efficiency (Thermofisher, V22020)
mouse CAR expression plasmid from Jouan et al, 2016 (BioCat GmbH, EX-Z4288-M51-10-GC). This was used as Huh7 is CAR deficient.
β-galactosidase substrate solution (Thermofisher, 75707/75710)
Pierce BCA kit (23225)
LARII (Dual Luciferase Reporter 1000 assay system, Promega, E1980)
EPO ELISA kit (Abcam, ab119522)

Method:

Day 1
Cells were seeded onto a 48 well plate at a density of 25,000 cells/300 μl Day 2
On the day of transfection, DNA to be transfected (CAR plasmid/PB1-MinTK operably linked with luciferase or EPO/pcDNA6 plasmid for internal control) was diluted to a 100 ng/μl stock solution.

Per 48 Well Transfection:
45 ng of DNA (15 ng of each plasmid, pcDNA6, CAR and test plasmid) was mixed with 4.1 μl of Optimem medium.

0.5 µl of Fusion HD was mixed with 4 µl of Optimem medium.

These 2 solutions were mixed and incubated at room temperature for 15 minutes.

The final solution was then added to the well drop wise.

3 hrs after transfection, the inducer TCPOBOP was added to the appropriate wells at the indicated concentration.

Day 3

24 hrs after induction the media was removed from the cells.

The cells were washed once in 300 µl of DPBS

Cells were lysed using 100 µl of passive lysis buffer and incubation with rocking for 15 minutes The cell debris was pelleted by centrifugation of the plate at max speed in a benchtop centrifuge for 1 min For luciferase, 10 µl sample was transferred into white 96-well plate and luminescence measured by injection of 50 µl of LARII substrate.

β-galactosidase activity was measured as per manufacturer's instructions (Mammalian β-Galactosidase Assay Kit, 75707/75710, Thermo Scientific) using 25 µl of lysate. 25 µl of lysate was transferred into a microplate well and mixed with 25 µl of β-galactosidase Assay Reagent, equilibrated to room temperature. The mixture was incubated at 37° C. for 30 min and absorbance measured at 405 nm.

Protein concentration was measured as per manufacturer's instructions (Pierce™ BCA Protein Assay Kit, 23225/23227, Thermo Scientific) using 25 µl of lysate. 25 µl of lysate was transferred into a microplate well and mixed with 200 µl of working solution. The mixture was incubated at 37° C. for 30 min, cooled to room temperature and then absorbance measured around 562 nm. The protein concentration was calculated with respect to protein standard curve prepared from assaying standards with known protein concentration.

Luciferase readouts were normalised to both β-galactosidase and protein concentration in the lysate to produce normalised relative luminometer units (RLUs).

To compare across experiments the strength of the promoters was compared to CMV-IE promoter which was driving the same gene as the PBREM-containing constructs, which is included in every experiment.

Transfections with PB1-MinTk-EPO were performed as described above with the exception that EPO is secreted into the medium. Therefore, medium was collected, and EPO concentration measured as per manufacturer's instructions (ab119522 Erythropoietin (EPO) Human ELISA Kit, Abcam) using an ELISA assay. 50 µl of medium was transferred to a pre-washed microplate wells and mixed with 50 µl of 1× Biotin Conjugated Antibody. The mixture was incubated at room temperature for 1 hour. The wells were washed, 100 µl of Streptavadin-HRP was added and the plate was incubated at room temperature for 15 minutes. The wells were washed and then 100 µl of TMB Substrate Solution. The mixture was incubated at room temperature for 10 minutes. The enzyme reaction was stopped by addition of 100 µl of Stop Solution and absorbance was read at 450 nm. The EPO concentration was calculated with respect to EPO standard curve prepared from assaying standards with known EPO concentration.

The PB1-MinTK construct was cloned into the vector pGL4.10 using the KpnI and NcoI restriction sites. This places the promoters directly upstream of the firefly luciferase reporter gene. The PB1-MinTK construct contains the 51 bp enhancer and the MinTK minimal promoter from Herpes Thymidine kinase gene.

Results:

Luciferase expression from the PB1-MinTK construct in FIG. 1A showed that there was very little measurable luciferase activity from the promoter when the cells were treated with vehicle (DMSO). This activity corresponds to leaky expression from the promoter. Addition of 50 nM or 150 nM TCPOBOP lead to strong induction of the promoter, with up to 6-fold induction measured. Addition of 250 nM of TCPOBOP did not illicit a response from this promoter suggesting that homeostatic control mechanisms may have been activated to prevent overburdening the cell. Therefore, the PB1-MinTK construct is induced by addition of TCPOBOP in Huh7 cells. The induction is tuneable, depending on the concentration of TCPOBOP but declines at higher concentrations.

In FIG. 1B, luciferase expression from the PB1-MinTK construct in the presence of CAR and 150 nM TCPOBOP is high as previously seen in FIG. 1A. However, when the cells are transfected with PB1-MinTK and but no CAR, there is no measurable activity when 150 nM TCPOBOP is added. This can be explained by the absence of a receptor for TCPOBOP to bind to, when no CAR is present. Therefore, the induction is CAR dependent and indicates a highly liver specific process.

Taken together these results show that the PB1-MinTk construct is inducible by addition of TCPOBOP in Huh7 cells, the induction is tuneable, the induction is CAR dependent and that the expression from a single element is enough to drive 40% of CMV-IE gene expression.

The experimental data shown in FIG. 1A is represented in FIG. 1C as a ratio of the luciferase expression of strong viral promoter CMV-IE. This shows that the luciferase expression from one PBREM element linked with MinTK promoter is enough to drive 40% of the luciferase expression the CMV-IE promoter. FIG. 1C also shows that there is no luciferase expression from the PB1-MInTK construct in the absence of CAR.

The PB1-MinkTK promoter was then used to drive expression of the protein EPO, which is of therapeutic interest. The expression was driven in Huh7 cells transfected with PB1-MinTK promoter operably linked to the EPO protein and a CAR-containing plasmid. Transfections were performed as previously described but the EPO expression was induced by human CAR inducer CITCO.

CITCO, a human CAR inducer, was used instead of TCPOBOP, a mouse inducer, because TCPOBOP does not activate human CAR. This means that TCPOBOP cannot be used in human cells which are the ultimate target in which this invention is to be used. This was also done to ensure that the mouse PBREM element can be activated by a human CAR which is induced with the human CAR inducer, CITCO.

EPO expression from the PB1-MinTK construct after transfection into Huh7 cells and treatment with DMSO, 0.5 µM, 1 µM, 2 µM and 3 µM CITCO is shown in FIG. 1D. This figure shows that there is very little expression of EPO with no addition of the drug but upon addition of up to 2 µM of CITCO there is a marked increase in the production of EPO. This again returns towards baseline activity at the highest concentration. This figure also shows that addition of CITCO does not change the EPO expression from the promoter CMV-MP. The overall EPO expression level of PB1-MinTK in this example is around 22% of the EPO expression of CMV-IE (data not shown). This is different to the previously observed 40% with respect to CMV-IE in FIG. 1C because CITCO is a weaker inducer of CAR activity than TCPOBOP.

PB1-MInTK was used to successfully drive tuneable expression of luciferase and EPO.

Example 2

The PBREM element was then used in combination with two other minimal promoters to test for inducibility and expression. PBREM was cloned in front of CMV minimal promoter, the MinTK promoter and the SV40 minimal promoter and was introduced in AXOL ARE-hepatocytes.

Axol Assay-Ready Expanded (ARE) Hepatocytes are primary human hepatocytes that have been expanded in vitro. Large batch sizes (up to 2000 vials) are available, ensuring a reliable, ready-to-use and consistent source of primary hepatocytes. ARE Hepatocytes express CYP enzymes, are metabolically functional, are polarized and can be infected by the Hepatitis C virus. AXOL ARE-hepatocytes express CAR negating the need to transfect with a CAR-expressing plasmid.

Materials:
- AXOL assay-ready expanded (ARE) hepatocytes (Axol, ax3701)
- ARE hepatocyte thawing medium (Axol, ax3705)
- ARE maintenance medium (Axol, ax3710)
- Virimer red transfection reagent (Lipocalyx, VR04-02-15)
- CITCO, luciferase, β-galactosidase and BCA kits as described above Methods ARE hepatocytes were cultured and transfected as described in the manufacturer's manual. 200,000 cells were seeded in 2 ml culture medium in collagen-coated 6 well plate. The cells were incubated for 4 h at 37° C. and 5% $CO_2$ for sufficient adhesion. 200 µl of transfection mixture containing the DNA to be transfected (PB1-MinTK/PB1-CMV/PB1-SV40 operably linked with luciferase and β-galactosidase containing promoter) was added and the cells were incubated on an orbital shaker at 100 rpm for three hours at 37° C. and 5% $CO_2$. 3 hrs after transfection CITCO was added to the appropriate wells. Cells were incubated under static conditions at 37° C. and 5% $CO_2$ overnight and in the morning the medium was replaced with fresh ARE Hepatocyte Maintenance Medium. Readout was 24 hrs after induction.

Results

Luciferase expression from the PB1-MinTK, PB1-CMV-MP and PB1-SV40-MP constructs in FIG. 2A indicates that each of the minimal promoters supports expression from the PBREM element upon addition of 1 µM CITCO. The induction was around 7-fold for SV40 and MinTK and 2-fold for CMV-IE promoter. The expression levels for each of the constructs are 20%, 10% and 55% for PB1-MinTK, PB1-CMV and PB1-SV40 respectively, compared to CMV-IE. SV40 can drive the highest expression, but it comes at the price of a higher background level. The CMV minimal promoter shows little to no expression. From this data it appears that the original MinTk construct may provide the best compromise between expression level, inducibility and tightness of control (i.e. minimising background expression).

PBREM can be used to drive inducible expression in combination with a variety of minimal promoters.

Example 3

This experiment was performed to examine whether multimerising the NR binding sites would subsequently increase the activity of the promoter. We therefore cloned 2, 3 and 4 repeats of the PBREM element in front of the MinTk, CMV and SV40 minimal promoters. An important consideration here was the spacing between the elements, here we followed the general rule of 5, whereby elements spaced at intervals at 5 bp apart do not sterically hinder each other. Using in-house knowledge, from previous inducible promoter design, we cloned the elements 20 bp apart. These multimers were cloned into the pGL4.10 plasmid previously described. These constructs were then tested in the AXOL ARE hepatocytes as previously described.

MinTK Promoter:

PB1-MinTK, PB1-1-MinTK, PB1-2-MinTK and PB1-3-MinTK contain 1, 2, 3 and 4 PBREM elements respectively in combination of the MinTK minimal promoter. Luciferase expression from the PB1-1-MinTK, PB1-2-MinTK and PB1-3-MinTK constructs upon induction with 1 µl CITCO in FIG. 3C shows that the multimers are induced and increase the expression level. However, this increase in expression level is only observed up to 3 copies of the PBREM element (PB1-2) as addition of another element appears to have a detrimental effect on induction and expression level. Each multimer is induced to 1.5, 4.1 and 2.66 of CMV-IE respectively. However, the level of induction is similar to the initial PB1-MinTK construct depicted here as PB1. This is due to an increase in the background activity of the promoters. The results are expressed as a ratio to CMV-IE. Results are mean of 3 biological replicates.

SV40 Minimal Promoter:

PB1-SV40, PB1-1-SV40, PB1-2-SV40 and PB1-3-SV40 contain 1, 2, 3 and 4 PBREM elements respectively in combination of the SV40 minimal promoter. Luciferase expression from the PB1-1-SV40, PB1-2-SV40 and PB1-3-SV40 constructs upon induction with 1 µl CITCO in FIG. 3A shows that the multimers are induced and indeed increase the expression level. However, as before this increase in expression level is only observed up to 3 copies of the PBREM element as addition of another element appears to have a detrimental effect on induction and expression level. Each multimer is induced to 2.6, 3.6 and 2.57 of CMV-IE respectively. The level of induction is higher than the 6-fold increase seen with the MinTk minimal promoter with up to 9-fold induction. Again, there is an increase in the background level of expression but this much less than seen with the CMV-MP promoters as described below. The results are expressed as a ratio to CMV-IE. Results are mean of 3 biological replicates.

CMV Promoter:

PB1-CMV, PB1-1-CMV, PB1-2-CMV and PB1-3-CMV contain 1, 2, 3 and 4 PBREM elements respectively in combination of the CMV minimal promoter. Luciferase expression from the PB1-1-CMV, PB1-2-CMV and PB1-3-CMV constructs upon induction with 1 µl CITCO in FIG. 3B shows that the multimers are induced and indeed increase the expression level. However, as before this increase in expression level is only observed up to 3 copies of the PBREM element as addition of another element appears to no effect on induction and expression level. Each multimer is induced to 1.9, 2.67 and 2.67 of CMV-IE respectively. The level of induction is lower than observed with either the MinTk or SV40 minimal promoter, maximum 5-fold. Using the CMV minimal promoter seems to increase the background level of expression to very high levels and as such it may be the poorest candidate assessed.

Increasing the number of PBREM elements increases the level of expression up to 3 PBREM elements. Further increasing PBREM number to 4 results in a lower luciferase expression.

Example 4

Following from Example 3, it was decided to take PB1-MinTK and PB1-2-MinTk forward for in vivo studies. To facilitate this the two aforementioned constructs were cloned into pAAV vector (Takara, Clontech) to allow for the preparation of AAV viruses. The inserts where cloned using restriction digest of the pAAV plasmid and PCR amplification of the original pGL4.10 constructs.

We investigated the effect of the Inverted Terminal Repeats (ITRs) on the activity of the promoters. This was done as we have observed interference from the AAV ITRs in other projects. To this end, the pAAV-PB1-MinTk and pAAV-PB1-2-MinTk were transfected into Huh7 and ARE primary cells as previously described and their activity assessed.

The results of these experiments can be seen in FIG. 4A and FIG. 4B. These graphs represent the mean of 3 biological replicates and show that the ITRs do not affect the performance of the promoters. The induction of luciferase expression from the PB1-MinTK and PB1-2-MinTK construct is comparable across vectors and cell types. These constructs are remarkably robust, and the plasmid backbone appears to have no effect on activity.

Example 5

Figure 5:
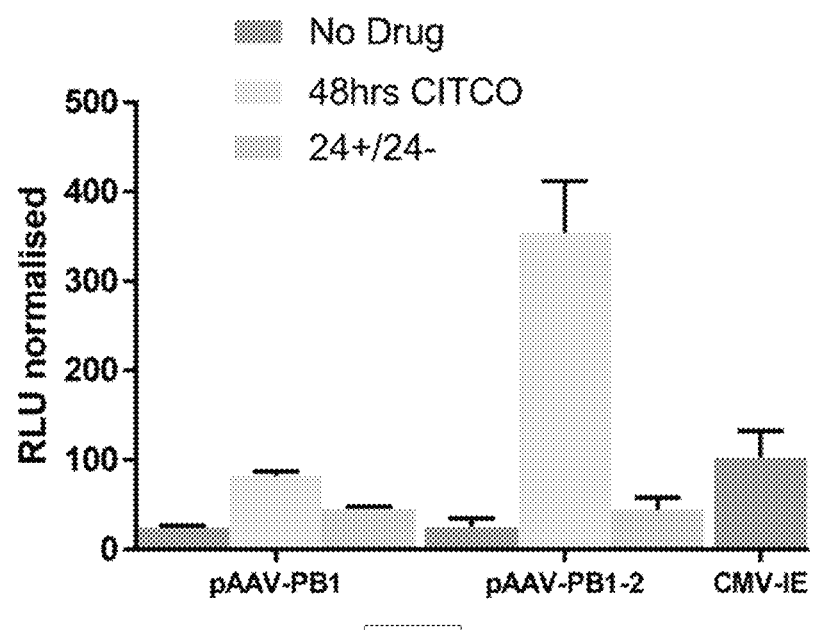
FIG. 5 shows luciferase expression from PB1-MinTK and PB1-2-MinTK constructs in the pAAV vector in AXOL ARE-hepatocytes without CITCO, with CITCO (1 µM) induction and after CITCO withdrawal.
Figure 7:
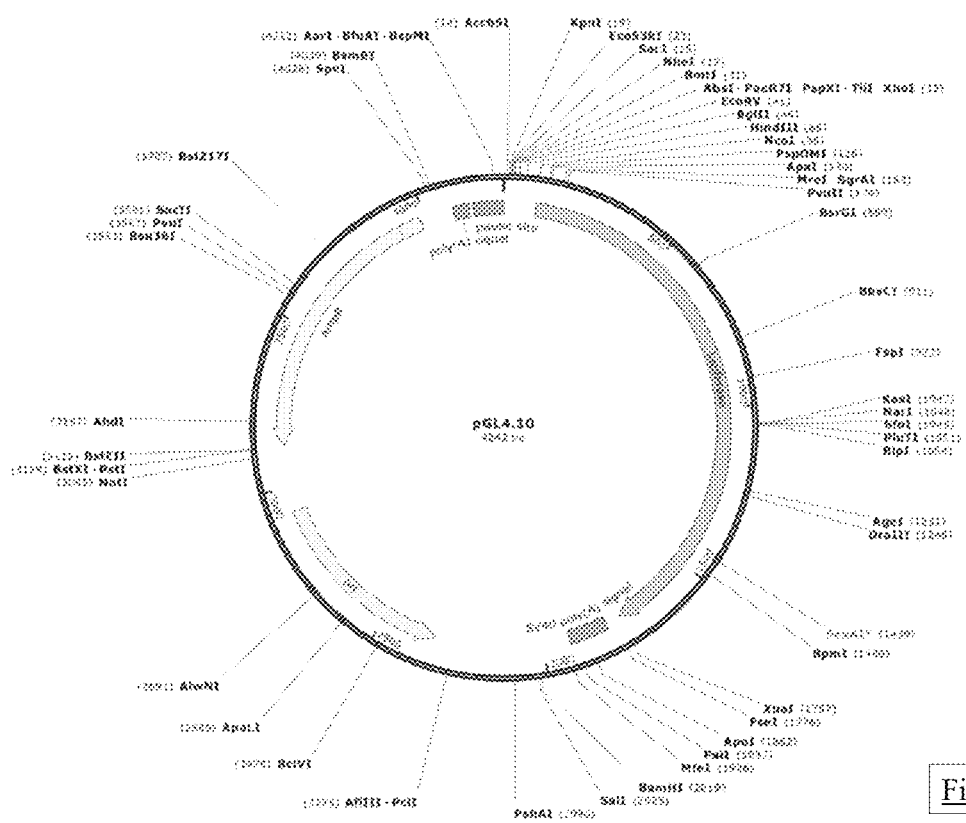
FIG. 7 shows a plasmid map of the pGL4.10 vector.

Luciferase expression from the PB1-MinTK and PB1-2-MinTK constructs in the pAAV vector in AXOL ARE hepatocytes is inducible by CITCO (1 µM) but reduces after removing CITCO as shown in FIG. 5. This shows that removal of the drug reduces the activity of the promoter to almost baseline levels.

Example 6—In Vivo Experiments Using AAV Comprising PB1 and PB1-2 Induction

From the previous application the constructs PB1 (single mouse PBREM element and Min-TK promoter) and PB1-2 (3×PBREM and min-TK promoter) were selected for testing in vivo in mice. This was performed as follows.

The PB1 and PB1-2 AAV constructs from the previous application, sequences below (SEQ ID NO 49 and 50, Table 3), were used to make AAV virus.
AAV production
Day 1:
  Seed HEK 293-AAV cells in 15 cm plates. To be 70-80% confluent on the day of transfection
  Final volume on each plate: 15 ml
Day 2: Prepare Transfection Mix:
  DNA mix/plate: pDG9 (Packaging plasmid for AAV9): 10.5 µg/pHGTI (Ad. Helper plasmid): 31.5 µg/Vector plasmid: 10.5 µg/Prepare in serum free DMEM/Optimem
  Transfer mix/plate: PEI: 125 µl/Prepare in serum free DMEM/Optimem
  Add DNA mix into transfection mix. Mix and leave at room temperature for 15-20 mins.
  Add 3 ml of transfection mix to each plate drop-wise and gently distribute. Incubate for 24 h.
Day 3:
  Replace media with 15 ml DMEM supplemented with P/S and 2% FCS. Leave for 48 h.
Day 5:
  Collect supernatant and pool in 50 ml tubes, 25 ml each tube. Store at −20° C.
  Collect cells: Add 5 ml of PBS to each plate→scrape and collect in 50 ml tubes.
  To wash plates, add another 1 ml of PBS and collect.
  Spin at 1500 rpm for 5 mins.
  Remove supernatant and resuspend pelleted cells in 1 ml/plate TD lysis buffer→pool
  Store at −80'C.
Endonuclease Treatment
Cells:
  Freeze and thaw pellets 5 times→~20 mins at 37° C. then ~20 mins in dry ice (or −80° C.).
  Add 25 µl/ml cells of 20% Deoxycholate (or 50 µl/ml of 10% Deoxycholate).
  Add 8 µl/ml cells of benzonase.
  Incubate at 37° C. for 30 mins.
  Spin at 4 Krpm for 30 mins.
  Filter supernatant using 0.45 µM filters.
  Store at 4° C. for up to 24 h.
Supernatant:
  Add 2.5 µl/25 ml supernatant of benzonase.
  Add 50 µl/25 ml supernatant of MgSO4.
  Incubate at 37° C. for 30 mins.
  Spin at 4 Krpm for 30 mins.
  Filter supernatant using 0.45 µM filters.
  Store at 4'C for up to 24 h.
Hplc Purification
  Place both lines in 20% ETOH→template→system wash
  Put line A in PBS and line B in Glycine→template→system wash
  Place the column in the machine→manual run→flowrate: 5 ml/min→Run for 25 ml or until the UV line is flat.
  Prepare FACS tubes (10 for cells and more for supernatant): add 30 µl/tube Tris→put in the machine to collect vectors.
  Place the waste lines in a separate tube to be able to run them again through the column.
  Run samples (flowrate low, depending on how fast the system and how concentrated the sample is; for cells it is slower, for supernatant it is higher).
  After running the waste through the column, wash with PBS→flowrate: 5 ml/min until the UV line is flat.
  Set→fraction size: 1 ml; Flowrate: 1 ml/min; concentration % B: 100%→run.
  Start collecting: Look for the peak. The peak indicates vector purification. Mark the tubes containing these vectors.
  Save programme before exiting.
  Wash with PBS→75 ml, 5 ml/min
  Wash with Na3PO4 (to store the column in)→75 ml, 5 ml/min
  Remove column and store at 4° C.
  Wash the machine with PBS→template→system wash
  Wash the machine with 20% ETOH→template→system wash
  Put both lines in 20% ETOH and shut down
  Add 2 L of PBS into a big bucket and put the Dialysis cassette (Side-A-Lyzer; Thermo scientific) to prime.
  Collect the vectors from the marked FACS tubes using a syringe and needle and add into the dialysis cassette→remove excess air from the membrane, carefully place the rubber on top of the cassette and let it float in the PBS-containing bucket→leave over night at room temperature on a slow rotating rotor.
Next Day:
 Prime membrane by adding 5 ml PBS onto a centrifugal filter (Amico Ultra 15; MERCK)→spin for 5 mins at 4 Krpm
 Remove excess PBS from inside the membrane.
 Take vectors out from the cassette and load onto the membrane→spin for 5 mins at 4 Krpm
 Wash the membrane with the vectors inside few times, then collect into 2 ml centrifuge tube filter 0.22 µM (Spin-X; COSTAR)
 Spin for 3 mins at 13 Krpm.
 Remove filter and aliquot: 1×100 µl (for injection), the rest in 10-2 µl aliquots.
 Store in −80° C.
 Virus quantification was performed using qRT-PCR with primers and probes for the luciferase gene.
Mice Experiment
 The AAV serotype chosen was AAV9 as this has a tropism for most tissues and organs and would therefore give an idea of the specificity of our promoters (avoiding issues of AAV tropism). Output form the experiment was luciferase activity measured visually with the 1$^{st}$ reading at 5 days post injection. The mice were then monitored weekly and after 35 days, once control vector AAV9 with CMV-IE had shown consistent steady results a baseline for induction profiling was established. At this point the inducer was added with measurements taken before and after induction. See below for more details.
Mice:
 Adult (8 weeks of age) CD1 male mice were injected with an AAV9 vector via tail vein.
 A total of 5×10$^{11}$ vector genomic copy number/ml was administered per mouse.
 Mice were imaged 5 days post injection. They were first anesthetized and received an intraperitoneal injection of luciferin (300 µl of luciferin stock 15 mg/ml). After 5 minutes the mice were placed in the IVIS machine and images were acquired.
Imaging:
 The exposure time used for images were 1 and 10 seconds.
 Images were taken once a week
 Additionally, before administering an inducer or repressor, mice were imaged daily over four days.

Induction:
 Inducer (Phenobarbital) was at a concentration of 5 mg/ml. The mice received 10 µl intraperitoneally, i.e. 50 micrograms per mouse (each mouse weighing approx. 30 g).

Results

Figure 8A:
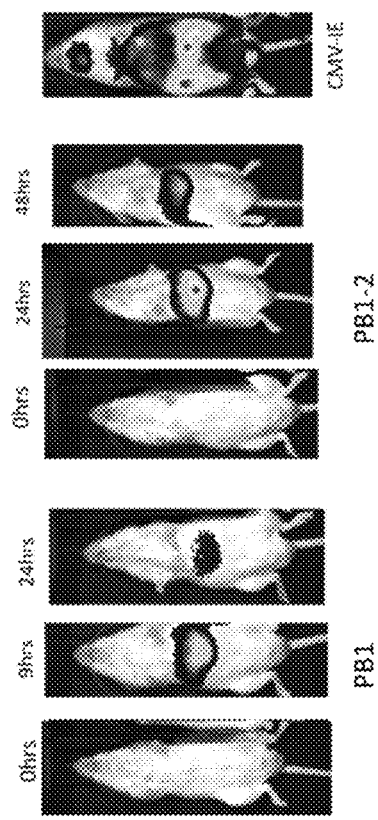
FIG. 8 shows in vivo results from the PB1 and PB1-2 constructs. A) Bioluminescent imaging of representative mice from 0 to 48 hrs after induction, B) Bioluminescence plotted to show the different kinetics of induction, C) Fold induction observed for each construct (n=5).
Figure 8B:
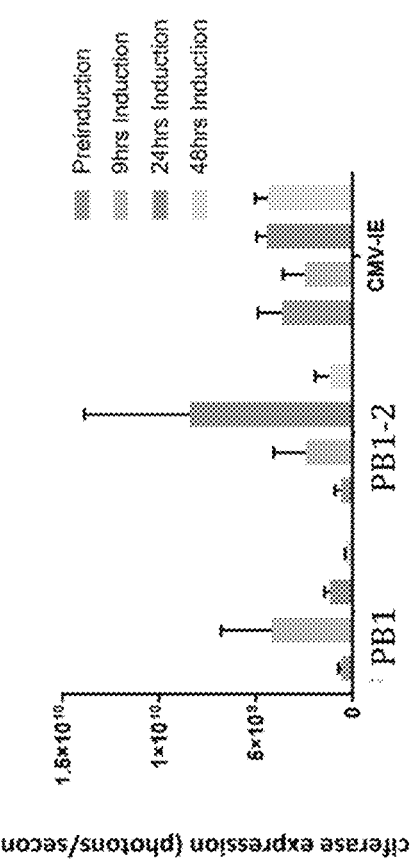
Figure 8C:
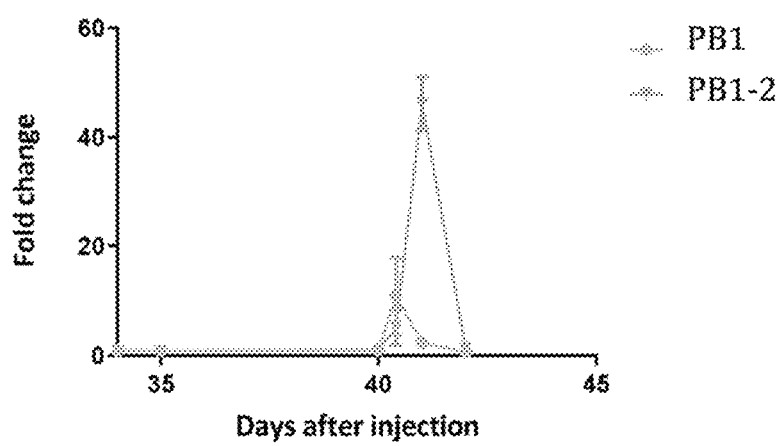

The results of the experiment can be seen in FIG. 8. FIG. 8A shows representative mice from each construct tested. It can be seen here that both the PB1 and PB1-2 expression is confined to the liver whereas the CMV-IE promoter is expressing in almost all tissues of the mouse. Furthermore, at 0 hrs the PB1 and PB1-2 mice show no expression of the luciferase gene, suggesting tightly controlled expression. However, when the inducer phenobarbital is added we can see that expression from both PB1 and PB1-2 increases. There is some variation in the magnitudes and duration of induction. For example, PB1 induced ~10-fold with maximal activity seen at 9 hrs and induction is complete at 24 hrs, whereas PB1-2 has ~50-fold increase with a maximal activity at 24 hrs, with the induction not being completed until 48 hrs after injection (FIGS. 8 B and C). These data corroborate the findings observed in the model cell lines, and further demonstrate the potential for this inducible system for use in vivo. The system has a low background and good inducibility, even when the inducer is given at 10-fold less than the recommended dosage for humans.

Example 7—Variants of PBREM Elements

As discussed above, the nuclear receptor CAR binds to DNA sequences in both human and mice. As can be seen from the sequence alignment there is some sequence divergence between the species. The 51 bp modular PBREM element can itself be broken down into 3 distinct parts (see table below). 1) The NR1 region (containing the NR1 element) which is thought to be responsible for most of the inducible activity, 2) the NF1 region (containing the NF1 element) which binds other nuclear receptors and may be responsible for lowering the background level in the absence of activated CAR and 3) NR2 region (containing the NR2 element) which is again implicated in the inducible activity of CAR.

The alignment and the delineation of the component parts that make up the PBREM element is shown below:

```
Mouse    TCTGTACTTTCCTGACCTTGGCACAGTGCCACCATCAACTTGCCTGACACC  51
Human    ACTGTACTTTCCTGACCCTGAAGAGGTGGCAGCATGGACTTTCCTGAACCA  51
         *************** **    *** ** ***  **** *****  *
(Mouse = SEQ ID NO: 1, Human = SEQ ID NO: 2)
```

TABLE 4

Mouse and Human PBREM Sequences:

Mouse PBREM (SEQ ID Nos in parenthesis)

| NR1 region | NF1 region | NR2 region |
|---|---|---|
| TCTGTACTTTCCTGACCT (86) | TGGCACAGTGCCACCA (88) | TCAACTTGCCTGACACC (90) |

Human PBREM (SEQ ID Nos in parenthesis)

| NR1 region | NF1 region | NR2 region |
|---|---|---|
| ACTGTACTTTCCTGACCC (87) | TGAAGAGGTGGCAGCA (89) | TGGACTTTCCTGAACCA (91) |

In the earlier examples, variants of the promoters used contained a mouse PBREM element. To confirm our expectation that the human PBREM element could also be used, we also assessed the inducibility of the human PBREM; this is potentially relevant because one aim of this project is to provide inducible promoters for use in human gene therapy, and the human sequence may have some advantages. In addition, we also assessed human and mouse hybrids of the PBREM element to determine if we could modulate or improve the inducibility and background level of the promoters. Such new combinations would not be found in nature in any context, and would likely to have novel traits, e.g. background and induction level. The constructs were tested in the PGL4.10 backbone as previously described, and are listed below in Table 2. These were: Human NR1×3-Min TK (3× human NR1 region with MinTK minimal promoter); Human PBREM-minTK (human PBREM with MinTK minimal promoter); hNR1-mNF1-hNR2-Min TK (Human Mouse Human hybrid with MinTK minimal promoter); hNR1-mNFI mNR2-Min TK (Human Mouse Mouse hybrid with MinTK minimal promoter); mNR1-hNF1-mNR2-Min TK (Mouse Human Mouse hybrid with MinTK minimal promoter); mNR1-hNF1-hNR2-Min TK (Mouse Human Human hybrid with MinTK minimal promoter); hPB-SV40 (human PBREM with SV40 minimal promoter); and MHM-SV40 (Mouse Human Mouse hybrid with SV40 minimal promoter)—SEQ ID NOs: 59 to 66, respectively.

These constructs were tested in the Huh7 stable cell line and primary hepatocytes as previously described. In addition, to testing the constructs with the traditional human CAR activator CITCO we also tested the natural compound flavone. This is a GRAS (generally regarded as safe) product that has previously been reported to activate human CAR and could be a useful drug for use in gene therapy applications due to its non-toxic nature and few side effects. CITCO has been predicted to be relatively unstable in vivo, and there is no data available for its safety of use in humans, and is therefore preferred for use only in tissue culture. Furthermore, the in vivo results presented above used phenobarbital as the inducer. In some contexts the use of phenobarbital may be undesirable, even if at 10× less than the recommended dose (which appears to be possible in view of the data above). Therefore, flavone may be a more desirable inducer that mitigates any safety or regulatory issues.

Figure 9:
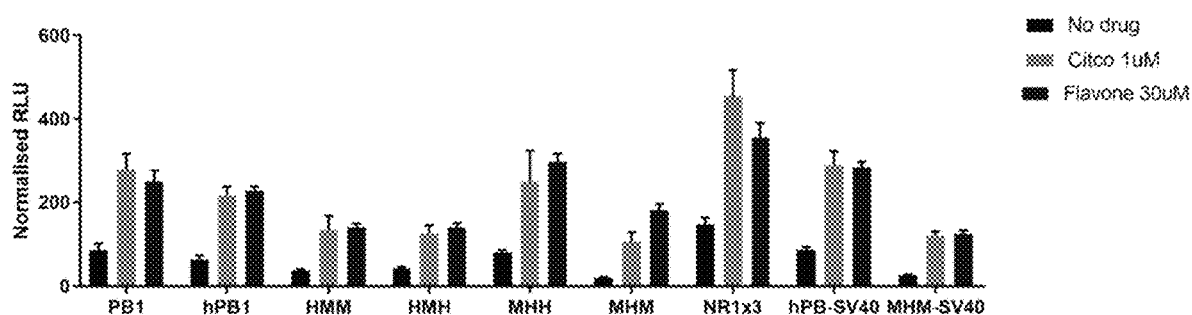
FIG. 9 shows the effect of CITCO and Flavone on the induction of the PBREM hybrids in a HUH7 cell line stably expressing human CAR.
Figure 10:
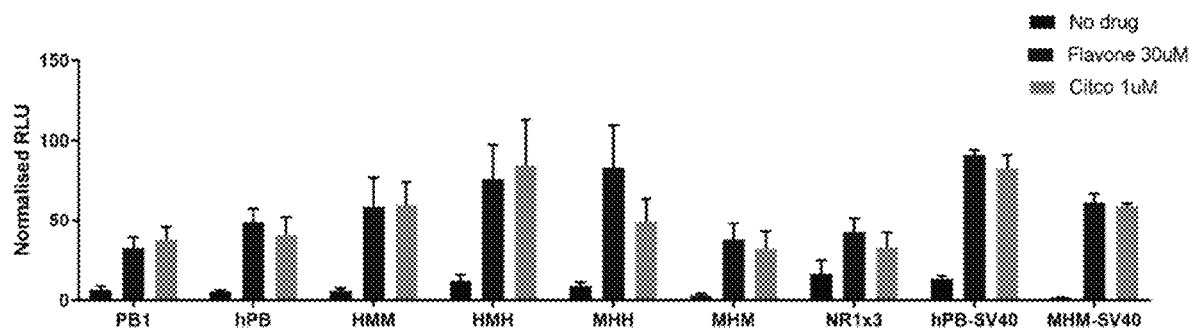
FIG. 10 shows the effect of CITCO and Flavone on the induction of the PBREM hybrids in primary hepatocytes.

The results of these experiments can be seen in FIGS. 9 and 10. These figures show a comparison to PB1 which was tested in vivo. In both the stable CAR expressing Huh7 cell line (FIG. 9) and primary cells (FIG. 10), human PBREM (hPB) performs in an almost identical manner to the mouse PBREM (PB1), suggesting they are interchangeable both with the Min-TK and SV40 minimal promoters. Of the hybrids tested, all were inducible to similar level with a similar background as PB1 except for the MHM hybrid. This has a lower background and lower overall activity but has good induction, suggesting it may have tighter expression control than the PB1 construct; this was independent of the minimal promoter context as this hybrid with either Min-Tk and SV40 showed similar results. All constructs where induced by flavone to a similar level to CITCO, showing that this compound is indeed a useful inducer of the PBREM constructs. A slight outlier in these experiments was the construct composed of 3×NR1 from human PBREM. It has a relatively high background, and was only induced in the stable cell line and less so in the primary cells.

From these experiments a similar approach to the examples discussed above was applied. The best monomers, human PBREM and the MHM hybrid, were multimerised and tested with both the Min-Tk minimal promoter and the SV40 minimal promoter. The sequences of these multimers are presented in Table 3. The promoters were: 2×hPB SV40 (2× human PBREM elements with SV40 minimal promoter); 2×MHM-MinTK (2× Mouse Human Mouse hybrid with MinTK minimal promoter); 2×MHM-SV40 (2× Mouse Human Mouse hybrid with SV40 minimal promoter); 3×hPB minTK (3× human PBREM elements with MinTK minimal promoter); and 3×hPB-SV40 (3× human PBREM elements with SV40 minimal promoter)—SEQ ID NOs: 67 to 71, respectively.

Expression and induction from these promoters was assessed using both CITCO and flavone in both the Huh7 CAR expressing stable cell line and primary hepatocytes as previously described.

Figure 11:
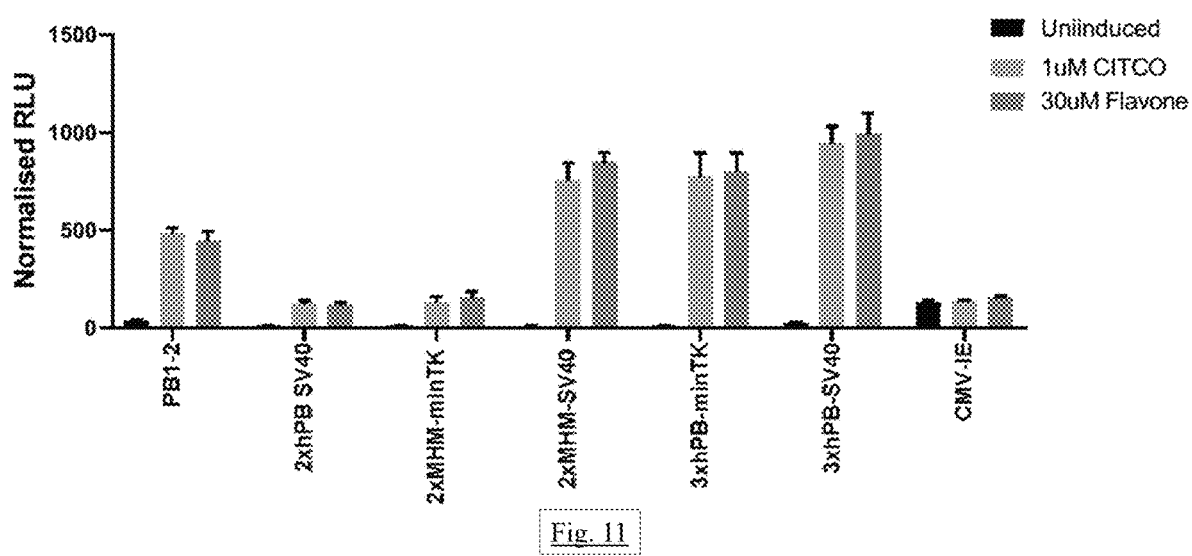
FIG. 11 shows the effect of CITCO and Flavone on the induction of multimers of the PBREM hybrids in a Huh7 cell line stably expressing human CAR.
Figure 12:
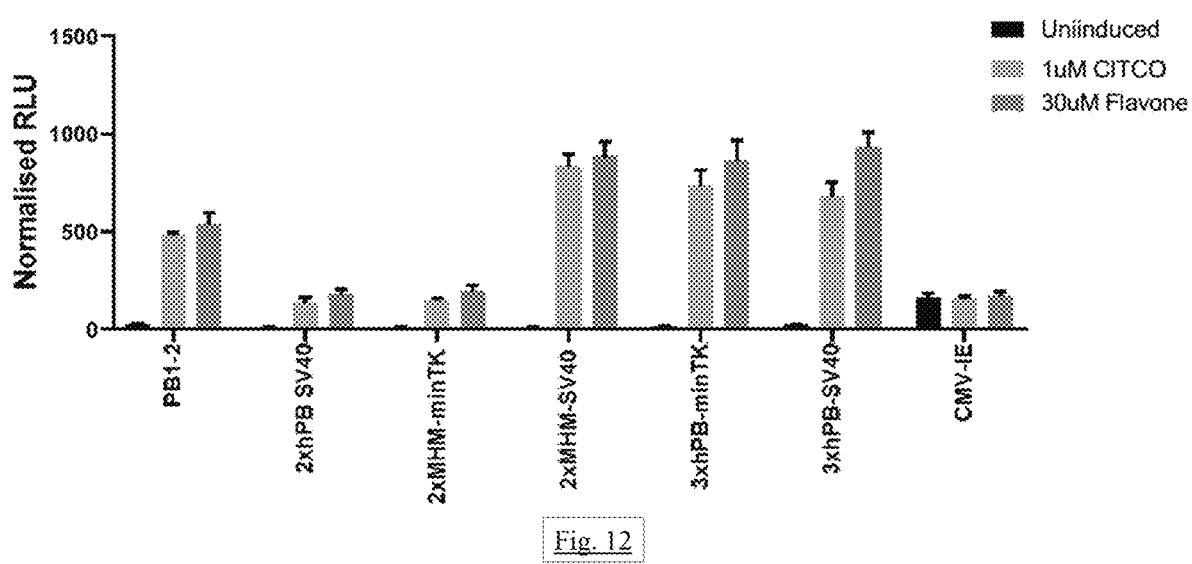
FIG. 12 shows the effect of CITCO and Flavone on the induction of multimers of the PBREM hybrids in primary hepatocytes.

The results can be seen in FIGS. 11 and 12. The comparison here is with the PB1-2 from the earlier examples. It can be observed that the multimer promoters all induce to high degree with both compounds, and that they all have very low background regardless of the minimal promoter used. Furthermore, the 2×MHM and 3×hPB performed the best, with overall expression levels higher than were observed for P1B1-2 and comparable background levels. This suggests that some of the new promoters may perform better in vivo, and also gives more options to control gene expression as required.

Sequences

TABLE 1

PBREM elements, variants and parts thereof

| Name | Sequence (SEQ ID NO) |
|---|---|
| PBREM (mouse/rat) | TCTGTACTTTCCTGACCTTGGCACAGTGCCACCA<u>TCAACTTGCCTGACACC</u> (1) |
| PBREM (human) | ACT<u>GTACTTTCCTGACCC</u>TGAAGAGGTGGCAGCA<u>TGGACTTTCCTGAACC</u>A (2) |
| NR1 motif of PBREM (mouse/rat) | TGTACTTTCCTGACCT (3) |
| NR1 motif of PBREM (human) | TGTACTTTCCTGACCC (4) |
| 3× NR1 sequence (mouse) | gatcTCTGTACTTTCCTGACCTTGgatcgatcTCTGTACTTTCCTGACCTTGgatcgatcTCTGTACTTTCCTGACCTTGgatc (5) |

TABLE 1-continued

PBREM elements, variants and parts thereof

| Name | Sequence (SEQ ID NO) |
|---|---|
| 3x NR1 sequence (human) | gatcACTGTACTTTCCTGACCCTGgatcgatcACTGTACTTTCCTGACCCTGgatcgatcACTGTACTTTCCTGACCCTGgatc (6) |
| NF1 motif of PBREM (mouse/rat) | TGGCACAGTGCCA (55) |
| NF1 motif of PBREM (human) | TGAAGAGGTGGCA (56) |
| NR2 motif of PBREM (mouse/rat) | TCAACTTGCCTGACAC (57) |
| NR2 motif of PBREM (human) | TGGACTTTCCTGAACC (58) |

NR1 motif underlined, NF1 motif bold, and NF2 motif double underlined.

TABLE 2

Inducible promoters comprising mouse PBREM element

| Name | Sequence (SEQ ID NO) |
|---|---|
| PB1-MinTK | TCTGTACTTTCCTGACCTTGGCACAGTGCCACCATCAACTTGCCTGACACCGATCCGGCCCCGCCCAGCGTCTTGTCATTGGCGAATTCGAACACGCAGATGCAGTCGGGGCGGCGCGGTCCGAGGTCCACTTCGCATATTAAGGTGACGCGTGTGGCCTCGAACACCGAGCGACCCTGCAGCGACCCGCTTAACAGCGTCAACAGCGTGCCGCAGATCTCGAGGAGCTTGGCGAGATTTTCAGGAGCTAAGGAAGCTAAAC (7) |
| PB1-CMV-MP | TCTGTACTTTCCTGACCTTGGCACAGTGCCACCATCAACTTGCCTGACACCGCTGGGAGTTCGTAGACGGAGCGATTAATCCATATGCAGGTCTATATAAGCAGAGCTCGTTTAGTGAACCGTCAGATCGCCTAGATACGCCATCCACGCTGTTTTGACCTCCATAGAAGATCGCCACCC (8) |
| PB1-SV40-MP | TCTGTACTTTCCTGACCTTGGCACAGTGCCACCATCAACTTGCCTGACACCGCTGGGAGTTCGTAGACGGACTAGCCCGGGCTCGAGATCTGCGATCTGCATCTCAATTAGTCAGCAACCATAGTCCCGCCCCTAACTCCGCCCATCCCGCCCCTAACTCCGCCCAGTTCCGCCCATTCTCCGCCCCATCGCTGACTAATTTTTTTTATTTATGCAGAGGCCGAGGCCGCCTCGGCCTCTGAGCTATTCCAGAAGTAGTGAGGAGGCTTTTTTGGAGGCCTAGGCTTTTGCAAAAAGCTTGGCATTCCGGTACTGTTGGTAAAGCCACCC (9) |
| PB1-MinTK and EPO | GGCCTAACTGGCCGGTACTCTGTACTTTCCTGACCTTGGCACAGTGCCACCATCAACTTGCCTGACACCGATCCGGCCCCGCCCAGCGTCTTGTCATTGGCGAATTCGAACACGCAGATGCAGTCGGGGCGGCGCGGTCCGAGGTCCACTTCGCATATTAAGGTGACGCGTGTGGCCTCGAACACCGAGCGACCCTGCAGCGACCCGCTTAACAGCGTCAACAGCGTGCCGCAGATCTCGAGGAGCTTGGCGAGATTTTCAGGAGCTAAGGAAGCTAAAC_ATGGGGGTGCACGAATGTCCTGCCTGGCTGTGGCTTCTCCTGTCCCTGCTGTCGCTCCCTCTGGGCCTCCCAGTCCTGGGCGCCCCACCACGCCTCATCTGTGACAGCCGAGTCCTGGAGAGGTACCTCTTGGAGGCCAAGGAGGCCGAGAATATCACGACGGGCGTGTCCTGAACACTGCAGCTTGAATGAGAATATCACTGTCCCAGACACCAAAGTTAATTTCTATGCCTGGAAGAGGATGGAGGTCGGGCAGCAGGCCGTAGAAGTCTGGCAGGGCCTGGCCCTGCTGTCGGAAGCTGTCCTGCGGGGCCAGGCCCTGTTGGTCAACTCTTCCCAGCCGTGGGAGCCCCTGCAGCTGCATGTGGATAAAGCCGTCAGTGGCCTTCGCAGCCTCACCACTCTGCTTCGGGCTCTGGGAGCCCAGAAGGAAGCCATCTCCCCTCCAGATGCGGCCTCAGCTGCTCCACTCCGAACAATCACTGCTGACACTTTCCGCAAACTCTTCCGAGTCTACTCCAATTTCCTCCGGGGAAAGCTGAAGCTGTACACAGGGGAGGCCTGCAGGACAGGGGACAGATGATCTAGAGTCGGGGCGGCCGGCCGCTTCGAGCAGACATGA_TAAGATACATTGATGAGTTTGGACAAACCACAACTAGAATGCAGTGAAAAAAATGCTTTATTTGTGAAATTTGTGATGCTATTGCTTTATTTGTAACCATTATAAGCTGCAATAAACAAGTT (19) |
| PB1-1-MinTk (2xPBREM) | TCTGTACTTTCCTGACCTTGGCACAGTGCCACCATCAACTTGCCTGACACCCATTACTCGCATCCATTCTCTCTGTACTTTCCTGACCTTGGCACAGTGCCACCATCAACTTGCCTGACACCGCTGGGAGTTCGTAGACGGAGATCCGGCCCCGCCCAGCGTCTTGTCATTGGCGAATTCGAACACGCAGATGCAGTCGGGGCGGCGCGGTCCGAGGTCCACTTCGCATATTAAGGTGACGCGTGTGGCCTCGAACACCGAGCGACCCTGCAGCGACCCGCTTAACAGCGTCAACAGCGTGCCGCAGATCTCGAGGAGCTTGGCGAGATTTTCAGGAGCTAAGGAAGCTAAAC (10) |
| PB1-2-MinTk (3xPBREM) | TCTGTACTTTCCTGACCTTGGCACAGTGCCACCATCAACTTGCCTGACACCCATTACTCGCATCCATTCTCTCTGTACTTTCCTGACCTTGGCACAGTGCCACCATCAACTTGCCTGACACCGCACTGAAGGTCCTCAATCGTCTGTACTTTCCTGACCTTGGCACAGTGCCACCATCAACTTGCCTGACACCGCTGGGAGTTCGTAGACGGAGATCCGGCCCCGCCCAGCGTCTTGTCATTGGCGAATTCGAACACGCAGATGCAGTCGGGGCGGCGCGGTCCGAGGTCCACTTCGCATATTAAGGTGACGCGTGTGGCCTCGAACACCGAGCGACCCTGCAGCGACCCGCTTAACAGCGTCAACAGCGTGCCGCAGATCTCGAGGAGCTTGGCGAGATTTTCAGGAGCTAAGGAAGCTAAAC (11) |

TABLE 2-continued

Inducible promoters comprising mouse PBREM element

| Name | Sequence (SEQ ID NO) |
|---|---|
| PB1-3-MinTk | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCACTGAAGGTCCTCAA<br>TCGTCTGTACTTTCCTGACCTTGGCACAGTGCCACCATCAACTTGCCTGACACCCTGACCTCCTGCCAG<br>CAATATCTGTACTTTCCTGACCTTGGCACAGTGCCACCATCAACTTGCCTGACACCGCTGGGAGTTCGT<br>AGACGGAGATCCGGCCCCGCCCAGCGTCTTGTCATTGGCGAATTCGAACACGCAGATGCAGTCGGGG<br>CGGCGCGGTCCGAGGTCCACTTCGCATATTAAGGTGACGCGTGTGGCCTCGAACACCGAGCGACCCT<br>GCAGCGACCCGCTTAACAGCGTCAACAGCGTGCCGCAGATCTCGAGGAGCTTGGCGAGATTTTCAGG<br>AGCTAAGGAAGCTAAAC (12) |
| PB1-1-SV40 | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCTGGGAGTTCGTAGAC<br>GGACTAGCCCGGGCTCGAGATCTGCGATCTGCATCTCAATTAGTCAGCAACCATAGTCCCGCCCCTAA<br>CTCCGCCCATCCCGCCCCTAACTCCGCCCAGTTCCGCCCATTCTCCGCCCCATCGCTGACTAATTTTTTT<br>TATTTATGCAGAGGCCGAGGCCGCCTCGGCCTCTGAGCTATTCCAGAAGTAGTGAGGAGGCTTTTTT<br>GGAGGCCTAGGCTTTTGCAAAAAGCTTGGCATTCCGGTACTGTTGGTAAAGCCACCC (13) |
| P1-2-SV40 | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCACTGAAGGTCCTCAA<br>TCGTCTGTACTTTCCTGACCTTGGCACAGTGCCACCATCAACTTGCCTGACACCGCTGGGAGTTCGTAG<br>ACGGACTAGCCCGGGCTCGAGATCTGCGATCTGCATCTCAATTAGTCAGCAACCATAGTCCCGCCCCT<br>AACTCCGCCCATCCCGCCCCTAACTCCGCCCAGTTCCGCCCATTCTCCGCCCCATCGCTGACTAATTTTT<br>TTTATTTATGCAGAGGCCGAGGCCGCCTCGGCCTCTGAGCTATTCCAGAAGTAGTGAGGAGGCTTTT<br>TTGGAGGCCTAGGCTTTTGCAAAAAGCTTGGCATTCCGGTACTGTTGGTAAAGCCACCC (14) |
| P1-3-SV40 | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCACTGAAGGTCCTCAA<br>TCGTCTGTACTTTCCTGACCTTGGCACAGTGCCACCATCAACTTGCCTGACACCCTGACCTCCTGCCAG<br>CAATATCTGTACTTTCCTGACCTTGGCACAGTGCCACCATCAACTTGCCTGACACCGCTGGGAGTTCGT<br>AGACGGACTAGCCCGGGCTCGAGATCTGCGATCTGCATCTCAATTAGTCAGCAACCATAGTCCCGCC<br>CCTAACTCCGCCCATCCCGCCCCTAACTCCGCCCAGTTCCGCCCATTCTCCGCCCCATCGCTGACTAAT<br>TTTTTTTATTTATGCAGAGGCCGAGGCCGCCTCGGCCTCTGAGCTATTCCAGAAGTAGTGAGGAGGC<br>TTTTTTGGAGGCCTAGGCTTTTGCAAAAAGCTTGGCATTCCGGTACTGTTGGTAAAGCCACCC (15) |
| P1-1-CMV | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCTGGGAGTTCGTAGAC<br>GGAGCGATTAATCCATATGCAGGTCTATATAAGCAGAGCTCGTTTAGTGAACCGTCAGATCGCCTAG<br>ATACGCCATCCACGCTGTTTTGACCTCCATAGAAGATCGCCACCC (16) |
| P1-2-CMV | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCACTGAAGGTCCTCAA<br>TCGTCTGTACTTTCCTGACCTTGGCACAGTGCCACCATCAACTTGCCTGACACCGCTGGGAGTTCGTAG<br>ACGGAGCGATTAATCCATATGCAGGTCTATATAAGCAGAGCTCGTTTAGTGAACCGTCAGATCGCCT<br>AGATACGCCATCCACGCTGTTTTGACCTCCATAGAAGATCGCCACCC (17) |
| P1-3-CMV | TCTGTACTTTCCTGACCTTGGCACAGTGCCACCATCAACTTGCCTGACACCCATTACTCGCATCCATTCT<br>CTCTGTACTTTCCTGACCTTGGCACAGTGCCACCATCAACTTGCCTGACACCGCACTGAAGGTCCTCAA<br>TCGTCTGTACTTTCCTGACCTTGGCACAGTGCCACCATCAACTTGCCTGACACCCTGACCTCCTGCCAG<br>CAATATCTGTACTTTCCTGACCTTGGCACAGTGCCACCATCAACTTGCCTGACACCGCTGGGAGTTCGT<br>AGACGGAGCGATTAATCCATATGCAGGTCTATATAAGCAGAGCTCGTTTAGTGAACCGTCAGATCGC<br>CTAGATACGCCATCCACGCTGTTTTGACCTCCATAGAAGATCGCCACCC (18) |
| Human NR1x3-MinTK | ACTGTACTTTCCTGACCCTGAAGAGACTGTACTTTCCTGACCCTGAAGAGACTGTACTTTCCTGACCCT<br>GAAGAGGATCCGGCCCCGCCCAGCGTCTTGTCATTGGCGAATTCGAACACGCAGATGCAGTCGGGGC<br>GGCGCGGTCCGAGGTCCACTTCGCATATTAAGGTGACGCGTGTGGCCTCGAACACCGAGCGACCCT<br>GCAGCGACCCGCTTAACAGCGTCAACAGCGTGCCGCAGATCTCGAGGAGCTTGGCGAGATTTTCAGG<br>AGCT (59) |
| Human PBREM-MinTK | ACTGTACTTTCCTGACCCTGAAGAGGTGGCAGCATGGACTTTCCTGAACCAGATCCGGCCCCGCCCAG<br>CGTCTTGTCATTGGCGAATTCGAACACGCAGATGCAGTCGGGGCGGCGCGGTCCGAGGTCCACTTCG<br>CATATTAAGGTGACGCGTGTGGCCTCGAACACCGAGCGACCCTGCAGCGACCCGCTTAACAGCGTCA<br>ACAGCGTGCCGCAGATCTCGAGGAGCTTGGCGAGATTTTCAGGAGCTAAGGAAGCTAAACATGGAA<br>GATGCCAAAAACATTAAG (60) |
| hNR1-mNFI-hNR2-MinTK (HMH MinTK) | ACTGTACTTTCCTGACCCTGGCACAGTGCCACCATGGACTTTCCTGAACCAGATCCGGCCCCGCCCAGC<br>GTCTTGTCATTGGCGAATTCGAACACGCAGATGCAGTCGGGGCGGCGCGGTCCGAGGTCCACTTCGC<br>ATATTAAGGTGACGCGTGTGGCCTCGAACACCGAGCGACCCTGCAGCGACCCGCTTAACAGCGTCA<br>ACAGCGTGCCGCAGATCTCGAGGAGCTTGGCGAGATTTTCAGGAGCTAAGGAAGCTAAACATGGAA<br>GATGCCAAAAACATTAAG (61) |
| hNR1-mNFI mNR2-MinTK (HMM MinTK) | ACTGTACTTTCCTGACCCTGGCACAGTGCCACCATCAACTTGCCTGACACCGATCCGGCCCCGCCCAGC<br>GTCTTGTCATTGGCGAATTCGAACACGCAGATGCAGTCGGGGCGGCGCGGTCCGAGGTCCACTTCGC<br>ATATTAAGGTGACGCGTGTGGCCTCGAACACCGAGCGACCCGCTTAACAGCGTCA<br>ACAGCGTGCCGCAGATCTCGAGGAGCTTGGCGAGATTTTCAGGAGCTAAGGAAGCTAAACATGGAA<br>GATGCCAAAAACATTAAG (62) |

TABLE 2-continued

Inducible promoters comprising mouse PBREM element

| Name | Sequence (SEQ ID NO) |
|---|---|
| mNR1-hNFI-mNR2-MinTK (MHM MinTK) | TCTGTACTTTCCTGACCTTGAAGAGGTGGCACCATCAACTTGCCTGACACCGATCCGGCCCCGCCCAGC GTCTTGTCATTGGCGAATTCGAACACGCAGATGCAGTCGGGGCGGCGCGGTCCGAGGTCCACTTCGC ATATTAAGGTGACGCGTGTGGCCTCGAACACCGAGCGACCCTGCAGCGACCCGCTTAACAGCGTCA ACAGCGTGCCGCAGATCTCGAGGAGCTTGGCGAGATTTTCAGGAGCTAAGGAAGCTAAACATGGAA GATGCCAAAAACATTAAG (63) |
| mNR1-hNFI hNR2-MinTK (MHH MinTK) | TCTGTACTTTCCTGACCTTGAAGAGGTGGCAGCATGGACTTTCCTGAACCAGATCCGGCCCCGCCCAG CGTCTTGTCATTGGCGAATTCGAACACGCAGATGCAGTCGGGGCGGCGCGGTCCGAGGTCCACTTCG CATATTAAGGTGACGCGTGTGGCCTCGAACACCGAGCGACCCTGCAGCGACCCGCTTAACAGCGTCA ACAGCGTGCCGCAGATCTCGAGGAGCTTGGCGAGATTTTCAGGAGCTAAGGAAGCTAAACATGGAA GATGCCAAAAACATTAAG (64) |
| hPB-SV40 | ACTGTACTTTCCTGACCCTGAAGAGGTGGCAGCATGGACTTTCCTGAACCAGCTGGGAGTTCGTAGAC GGACTAGCCCGGGCTCGAGATCTGCGATCTGCATCTCAATTAGTCAGCAACCATAGTCCCGCCCCTAA CTCCGCCCATCCCGCCCCTAACTCCGCCCAGTTCCGCCCATTCTCCGCCCCATCGCTGACTAATTTTTTT TATTTATGCAGAGGCCGAGGCCGCCTCGGCCTCTGAGCTATTCCAGAAGTAGTGAGGAGGCTTTTTT GGAGGCCTAGGCTTTTGCAAAAAGCTTGGCATTCCGGTACTGTTGGTAAAGCCACCC (65) |
| MHM-SV40 | TCTGTACTTTCCTGACCTTGAAGAGGTGGCACCATCAACTTGCCTGACACCGCTGGGAGTTCGTAGAC GGACTAGCCCGGGCTCGAGATCTGCGATCTGCATCTCAATTAGTCAGCAACCATAGTCCCGCCCCTAA CTCCGCCCATCCCGCCCCTAACTCCGCCCAGTTCCGCCCATTCTCCGCCCCATCGCTGACTAATTTTTTT ATTTATGhPBCAGAGGCCGAGGCCGCCTCGGCCTCTGAGCTATTCCAGAAGTAGTGAGGAGGCTTTTT TGGAGGCCTAGGCTTTTGCAAAAAGCTTGGCATTCCGGTACTGTTGGTAAAGCCACCC (66) |
| 2xhPBSV40 | ACTGTACTTTCCTGACCCTGAAGAGGTGGCAGCATGGACTTTCCTGAACCACATTACTCGCATCCATTC TCACTGTACTTTCCTGACCCTGAAGAGGTGGCAGCATGGACTTTCCTGAACCAGCTGGGAGTTCGTAG ACGGACTAGCCCGGGCTCGAGATCTGCGATCTGCATCTCAATTAGTCAGCAACCATAGTCCCGCCCCT AACTCCGCCCATCCCGCCCCTAACTCCGCCCAGTTCCGCCCATTCTCCGCCCCATCGCTGACTAATTTTT TTTATTTATGCAGAGGCCGAGGCCGCCTCGGCCTCTGAGCTATTCCAGAAGTAGTGAGGAGGCTTTTT TTGGAGGCCTAGGCTTTTGCAAAAAGCTTGGCATTCCGGTACTGTTGGTAAAGCCACCC (67) |
| 2xMHM-MinTK | TCTGTACTTTCCTGACCTTGAAGAGGTGGCACCATCAACTTGCCTGACACCCATTACTCGCATCCATTCT CTCTGTACTTTCCTGACCTTGAAGAGGTGGCACCATCAACTTGCCTGACACCGCTGGGAGTTCGTAGA CGGAGATCCGGCCCCGCCCAGCGTCTTGTCATTGGCGAATTCGAACACGCAGATGCAGTCGGGGCGG CGCGGTCCGAGGTCCACTTCGCATATTAAGGTGACGCGTGTGGCCTCGAACACCGAGCGACCCTGCA GCGACCCGCTTAACAGCGTCAACAGCGTGCCGCAGATCTCGAGGAGCTTGGCGAGATTTTCAGGAGC TAAGGAAGCTAAAC (68) |
| 2xMHM-SV40 | TCTGTACTTTCCTGACCTTGAAGAGGTGGCACCATCAACTTGCCTGACACCCATTACTCGCATCCATTCT CTCTGTACTTTCCTGACCTTGAAGAGGTGGCACCATCAACTTGCCTGACACCGCTGGGAGTTCGTAGA CGGACTAGCCCGGGCTCGAGATCTGCGATCTGCATCTCAATTAGTCAGCAACCATAGTCCCGCCCCTA ACTCCGCCCATCCCGCCCCTAACTCCGCCCAGTTCCGCCCATTCTCCGCCCCATCGCTGACTAATTTTTT TTATTTATGCAGAGGCCGAGGCCGCCTCGGCCTCTGAGCTATTCCAGAAGTAGTGAGGAGGCTTTTT TGGAGGCCTAGGCTTTTGCAAAAAGCTTGGCATTCCGGTACTGTTGGTAAAGCCACCC (69) |
| 3xhPB-minTK | ACTGTACTTTCCTGACCCTGAAGAGGTGGCAGCATGGACTTTCCTGAACCACATTACTCGCATCCATTC TCACTGTACTTTCCTGACCCTGAAGAGGTGGCAGCATGGACTTTCCTGAACCAGCACTGAAGGTCCTC AATCGACTGTACTTTCCTGACCCTGAAGAGGTGGCAGCATGGACTTTCCTGAACCAGCTGGGAGTTCG TAGACGGAGATCCGGCCCCGCCCAGCGTCTTGTCATTGGCGAATTCGAACACGCAGATGCAGTCGGG GCGGCGGTCCGAGGTCCACTTCGCATATTAAGGTGACGCGTGTGGCCTCGAACACCGAGCGACC CTGCAGCGACCCGCTTAACAGCGTCAACAGCGTGCCGCAGATCTCGAGGAGCTTGGCGAGATTTTCA GGAGCTAAGGAAGCTAAAC (70) |
| 3xhPB-SV40 | ACTGTACTTTCCTGACCCTGAAGAGGTGGCAGCATGGACTTTCCTGAACCACATTACTCGCATCCATTC TCACTGTACTTTCCTGACCCTGAAGAGGTGGCAGCATGGACTTTCCTGAACCAGCACTGAAGGTCCTC AATCGACTGTACTTTCCTGACCCTGAAGAGGTGGCAGCATGGACTTTCCTGAACCAGCTGGGAGTTCG TAGACGGACTAGCCCGGGCTCGAGATCTGCGATCTGCATCTCAATTAGTCAGCAACCATAGTCCCGCC CCTAACTCCGCCCATCCCGCCCCTAACTCCGCCCAGTTCCGCCCATTCTCCGCCCCATCGCTGACTAAT TTTTTTTATTTATGCAGAGGCCGAGGCCGCCTCGGCCTCTGAGCTATTCCAGAAGTAGTGAGGAGGC TTTTTTGGAGGCCTAGGCTTTTGCAAAAAGCTTGGCATTCCGGTACTGTTGGTAAAGCCACCC (71) |

PBREM elements are underlined; minimal promoter is in bold; gene sequences are double underlined.

TABLE 3

Constructs and other sequences.

| Name | Sequence (SEQ ID NO) |
|---|---|
| pAAV-ZsGreen original plasmid | AGCGCCCAATACGCAAACCGCCTCTCCCCGCGCGTTGGCCGATTCATTAATGCAGCTGGCACGACAGG TTTCCCGACTGGAAAGCGGGCAGTGAGCGCAACGCAATTAATGTGAGTTAGCTCACTCATTAGGCACC CCAGGCTTTACACTTTATGCTTCCGGCTCGTATGTTGTGTGGAATTGTGAGCGGATAACAATTTCACAC AGGAAACAGCTATGACCATGATTACGAATTGCCTGCAGGCAGCTGCGCGCTCGCTCGCTCACTGAGG |

TABLE 3-continued

Constructs and other sequences.

| Name | Sequence (SEQ ID NO) |
|---|---|
| | CCGCCCGGGCAAAGCCCGGGCGTCGGGCGACCTTTGGTCGCCCGGCCTCAGTGAGCGAGCGAGCGC |
| | GCAGAGAGGGAGTGGCCAACTCCATCACTAGGGGTTCCTATCGATATCAAGCTTTAATAGTAATCAAT |
| | TACGGGGTCATTAGTTCATAGCCCATATATGGAGTTCCGCGTTACATAACTTACGGTAAATGGCCCGC |
| | CTGGCTGACCGCCCAACGACCCCCGCCCATTGACGTCAATAATGACGTATGTTCCCATAGTAACGCCA |
| | ATAGGGACTTTCCATTGACGTCAATGGGTGGAGTATTTACGGTAAACTGCCCACTTGGCAGTACATCA |
| | AGTGTATCATATGCCAAGTACGCCCCCTATTGACGTCAATGACGGTAAATGGCCCGCCTGGCATTATG |
| | CCCAGTACATGACCTTATGGGACTTTCCTACTTGGCAGTACATCTACGTATTAGTCATCGCTATTACCAT |
| | GGTGATGCGGTTTTGGCAGTACATCAATGGGCGTGGATAGCGGTTTGACTCACGGGGATTTCCAAGT |
| | CTCCACCCCATTGACGTCAATGGGAGTTTGTTTTGGCACCAAAATCAACGGGACTTTCCAAAATGTCGT |
| | AACAACTCCGCCCCATTGACGCAAATGGGCGGTAGGCGTGTACGGTGGGAGGTCTATATAAGCAGAG |
| | CTGGTTTAGTGGATATCCTTAAGGGCCCAGCCGGCCCGAATCCCGGCCGGGAACGGTGCATTGGAAC |
| | GCGGATTCCCCGTGCCAAGAGTGACGTAAGTACCGCCTATAGAGTCTATAGGCCCACAAAAAATGCTT |
| | TCTTCTTTTAATATACTTTTTTGTTTATCTTATTTCTAATACTTTCCCTAATCTCTTTCTTTCAGGGCAATA |
| | ATGATACAATGTATCATGCCTCTTTGCACCATTCTAAAGAATAACAGTGATAATTTCTGGGTTAAGGCA |
| | ATAGCAATATTTCTGCATATAAATATTTCTGCATATAAATTGTAACTGATGTAAGAGGTTTCATATTGCT |
| | AATAGCAGCTACAATCCAGCTACCATTCTGCTTTTATTTTATGGTTGGGATAAGGCTGGATTATTCTGA |
| | GTCCAAGCTAGGCCCTTTTGCTAATCATGTTCATACCTCTTATCTTCCTCCCACAGCTCCTGGGCAACGT |
| | GCTGGTCTGTGTGCTGGCCCATCACTTTGGCAAAGAATTGGGATTCGCGAGAATTCGCCACCATGGCC |
| | CAGTCCAAGCACGGCCTGACCAAGGAGATGACCATGAAGTACCGCATGGAGGGCTGCGTGGACGGC |
| | CACAAGTTCGTGATCACCGGCGAGGGCATCGGCTACCCCTTCAAGGGCAAGCAGGCCATCAACCTGT |
| | GCGTGGTGGAGGGCGGCCCCTTGCCCTTCGCCGAGGACATCTTGTCCGCCGCCTTCATGTACGGCAAC |
| | CGCGTGTTCACCGAGTACCCCCAGGACATCGTCGACTACTTCAAGAACTCCTGCCCCGCCGGCTACAC |
| | CTGGGACCGCTCCTTCCTGTTCGAGGACGGCGCCGTGTGCATCTGCAACGCCGACATCACCGTGAGCG |
| | TGGAGGAGAACTGCATGTACCACGAGTCCAAGTTCTACGGCGTGAACTTCCCCGCCGACGGCCCCGT |
| | GATGAAGAAGATGACCGACAACTGGGAGCCCTCCTGCGAGAAGATCATCCCCGTGCCCAAGCAGGGC |
| | ATCTTGAAGGGCGACGTGAGCATGTACCTGCTGCTGAAGGACGGTGGCCGCTGCGCTGCCAGTTCG |
| | ACACCGTGTACAAGGCCAAGTCCGTGCCCCGCAAGATGCCCGACTGGCACTTCATCCAGCACAAGCTG |
| | ACCCGCGAGGACCGCAGCGACGCCAAGAACCAGAAGTGGCACCTGACCGAGCACGCCATCGCCTCCG |
| | GCTCCGCCTTGCCCTGATAAGGATCCACGGGTGGCATCCCTGTGACCCCTCCCCAGTGCCTCTCCTGGC |
| | CCTGGAAGTTGCCACTCCAGTGCCCACCAGCCTTGTCCTAATAAAATTAAGTTGCATCATTTTGTCTGA |
| | CTAGGTGTCCTTCTATAATATTATGGGTGGAGGGGGGTGGTATGGAGCAAGGGGCAAGTTGGGAA |
| | GACAACCTGTAGGGCCTGCGGGGTCTATTGGGAACCAAGCTGGAGTGCAGTGGCACAATCTTGGCTC |
| | ACTGCAATCTCCGCCTCCTGGGTTCAAGCGATTCTCCTGCCTCAGCCTCCCGAGTTGTTGGGATTCCAG |
| | GCATGCATGACCAGGCTCAGCTAATTTTTGTTTTTTGGTAGAGACGGGGTTTCACCATATTGGCCAG |
| | GCTGGTCTCCAACTCCTAATCTCAGGTGATCTACCCACCTTGGCCTCCCAAATTGCTGGGATTACAGGC |
| | GTGAACCACTGCTCCCTTCCCTGTCCTTATCGATAGATCTAGGAACCCCTAGTGATGGAGTTGGCCACT |
| | CCCTCTCTGCGCGCTCGCTCGCTCACTGAGGCCGGGCGACCAAAGGTCGCCCGACGCCCGGGCTTTGC |
| | CCGGGCGGCCTCAGTGAGCGAGCGAGCGCGCAGCTGCCTGCAGGCAGCTTGGCACTGGCCGTCGTTTT |
| | TACAACGTCGTGACTGGGAAAACCCTGGCGTTACCCAACTTAATCGCCTTGCAGCACATCCCCCTTTCG |
| | CCAGCTGGCGTAATAGCGAAGAGGCCCGCACCGATCGCCCTTCCCAACAGTTGCGCAGCCTGAATGG |
| | CGAATGGCGCCTGATGCGGTATTTTCTCCTTACGCATCTGTGCGGTATTTCACACCGCATACGTCAAAG |
| | CAACCATAGTACGCGCCCTGTAGCGGCGCATTAAGCGCGGCGGGTGTGGTGGTTACGCGCAGCGTGA |
| | CCGCTACACTTGCCAGCGCCCTAGCGCCCGCTCCTTTCGCTTTCTTCCCTTCCTTTCTCGCCACGTTCGCC |
| | GGCTTTCCCCGTCAAGCTCTAAATCGGGGGCTCCCTTTAGGGTTCCGATTTAGTGCTTTACGGCACCTC |
| | GACCCCAAAAAACTTGATTTGGGTGATGGTTCACGTAGTGGGCCATCGCCCTGATAGACGGTTTTTCG |
| | CCCTTTGACGTTGGAGTCCACGTTCTTTAATAGTGGACTCTTGTTCCAAACTGGAACAACACTCAACCC |
| | TATCTCGGGCTATTCTTTTGATTTATAAGGGATTTTGCCGATTTCGGCCTATTGGTTAAAAAATGAGCT |
| | GATTTAACAAAAATTTAACGCGAATTTTAACAAAATATTAACGTTTACAATTTATGGTGCACTCTCAGT |
| | ACAATCTGCTCTGATGCCGCATAGTTAAGCCAGCCCCGACACCCGCCAACACCCGCTGACGCGCCCTG |
| | ACGGGCTTGTCTGCTCCCGGCATCCGCTTACAGACAAGCTGTGACCGTCTCCGGGAGCTGCATGTGTC |
| | AGAGGTTTTCACCGTCATCACCGAAACGCGCGAGACGAAAGGGCCTCGTGATACGCCTATTTTTATAG |
| | GTTAATGTCATGATAATAATGGTTTCTTAGACGTCAGGTGGCACTTTTCGGGGAAATGTGCGCGGAAC |
| | CCCTATTTGTTTATTTTTCTAAATACATTCAAATATGTATCCGCTCATGAGACAATAACCCTGATAAATG |
| | CTTCAATAATATTGAAAAAGGAAGAGTATGAGTATTCAACATTTCCGTGTCGCCCTTATTCCCTTTTTTG |
| | CGGCATTTTGCCTTCCTGTTTTTGCTCACCCAGAAACGCTGGTGAAAGTAAAAGATGCTGAAGATCAG |
| | TTGGGTGCACGAGTGGGTTACATCGAACTGGATCTCAACAGCGGTAAGATCCTTGAGAGTTTTCGCCC |
| | CGAAGAACGTTTTCCAATGATGAGCACTTTTAAAGTTCTGCTATGTGGCGCGGTATTATCCCGTATTGA |
| | CGCCGGGCAAGAGCAACTCGGTCGCCGCATACACTATTCTCAGAATGACTTGGTTGAGTACTCACCAG |
| | TCACAGAAAAGCATCTTACGGATGGCATGACAGTAAGAGAATTATGCAGTGCTGCCATAACCATGAG |
| | TGATAACACTGCGGCCAACTTACTTCTGACAACGATCGGAGGACCGAAGGAGCTAACCGCTTTTTTGC |
| | ACAACATGGGGGATCATGTAACTCGCCTTGATCGTTGGGAACCGGAGCTGAATGAAGCCATACCAAA |
| | CGACGAGCGTGACACCACGATGCCTGTAGCAATGGCAACAACGTTGCGCAAACTATTAACTGGCGAA |
| | CTACTTACTCTAGCTTCCCGGCAACAATTAATAGACTGGATGGAGGCGGATAAAGTTGCAGGACCACT |
| | TCTGCGCTCGGCCCTTCCGGCTGGCTGGTTTATTGCTGATAAATCTGGAGCCGGTGAGCGTGGGTCTC |
| | GCGGTATCATTGCAGCACTGGGGCCAGATGGTAAGCCCTCCCGTATCGTAGTTATCTACACGACGGG |
| | GAGTCAGGCAACTATGGATGAACGAAATAGACAGATCGCTGAGATAGGTGCCTCACTGATTAAGCAT |
| | TGGTAACTGTCAGACCAAGTTTACTCATATATACTTTAGATTGATTTAAAACTTCATTTTTAATTTAAAA |
| | GGATCTAGGTGAAGATCCTTTTTGATAATCTCATGACCAAAATCCCTTAACGTGAGTTTTCGTTCCACT |
| | GAGCGTCAGACCCCGTAGAAAAGATCAAAGGATCTTCTTGAGATCCTTTTTTTCTGCGCGTAATCTGCT |
| | GCTTGCAAACAAAAAAACCACCGCTACCAGCGGTGGTTTGTTTGCCGGATCAAGAGCTACCAACTCTT |
| | TTTCCGAAGGTAACTGGCTTCAGCAGAGCGCAGATACCAAATACTGTTCTTCTAGTGTAGCCGTAGTT |
| | AGGCCACCACTTCAAGAACTCTGTAGCACCGCCTACATACCTCGCTCTGCTAATCCTGTTACCAGTGGC |
| | TGCTGCCAGTGGCGATAAGTCGTGTCTTACCGGGTTGGACTCAAGACGATAGTTACCGGATAAGGCG |
| | CAGCGGTCGGGCTGAACGGGGGGTTCGTGCACACAGCCCAGCTTGGAGCGAACGACCTACACCGAA |
| | CTGAGATACCTACAGCGTGAGCTATGAGAAAGCGCCACGCTTCCCGAAGGGAGAAAGGCGGACAGG |
| | TATCCGGTAAGCGGCAGGGTCGGAACAGGAGAGCGCACGAGGGAGCTTCCAGGGGGAAACGCCTG |

TABLE 3-continued

Constructs and other sequences.

| Name | Sequence (SEQ ID NO) |
|---|---|
| | GTATCTTTATAGTCCTGTCGGGTTTCGCCACCTCTGACTTGAGCGTCGATTTTTGTGATGCTCGTCAGG |
| | GGGGCGGAGCCTATGGAAAAACGCCAGCAACGCGGCCTTTTTACGGTTCCTGGCCTTTTGCTGGCCTT |
| | TTGCTCACATGTTCTTTCCTGCGTTATCCCCTGATTCTGTGGATAACCGTATTACCGCCTTTGAGTGAGC |
| | TGATACCGCTCGCCGCAGCCGAACGACCGAGCGCAGCGAGTCAGTGAGCGAGGAAGCGGAAG (48) |
| pAAV-PB1-MinTk | TGCCTGCAGGCAGCTGCGCGCTCGCTCGCTCACTGAGGCCGCCCGGGCAAAGCCCGGGCGTCGGGC |
| | GACCTTTGGTCGCCCGGCCTCAGTGAGCGAGCGAGCGCGCAGAGAGGGAGTGGCCAACTCCATCACT |
| | AGGGGTTCCTATCGATATCAAGCTTCTGTACTTTCCTGACCTTGGCACAGTGCCACCATCAACTTGCCT |
| | GACACCGATCCGGCCCCGCCCAGCGTCTTGTCATTGGCGAATTCGAACACGCAGATGCAGTCGGGGC |
| | GGCGCGGTCCGAGGTCCACTTCGCATATTAAGGTGACGCGTGTGGCCTCGAACACCGAGCGACCCTG |
| | CAGCGACCCGCTTAACAGCGTCAACAGCGTGCCGCAGATCTCGAGGAGCTTGGCGAGATTTTCAGGA |
| | GCTAAGGAAGCTAAACATGGAAGATGCCAAAACATTAAGAAGGGCCCAGCGCCATTCTACCCACTC |
| | GAAGACGGGACCGCCGGCGAGCAGCTGCACAAAGCCATGAAGCGCTACGCCCTGGTGCCCGGCACC |
| | ATCGCCTTTACCGACGCACATATCGAGGTGGACATTACCTACGCCGAGTACTTCGAGATGAGCGTTCG |
| | GCTGGCAGAAGCTATGAAGCGCTATGGGCTGAATACAAACCATCGGATCGTGGTGTGCAGCGAGAAT |
| | AGCTTGCAGTTCTTCATGCCCGTGTTGGGTGCCCTGTTCATCGGTGTGGCTGTGGCCCCAGCTAACGA |
| | CATCTACAACGAGCGCGAGCTGCTGAACAGCATGGGCATCAGCCAGCCCACCGTCGTATTCGTGAGC |
| | AAGAAAGGGCTGCAAAAGATCCTCAACGTGCAAAAGAAGCTACCGATCATACAAAAGATCATCATCA |
| | TGGATAGCAAGACCGACTACCAGGGCTTCCAAAGCATGTACACCTTCGTGACTTCCCATTTGCCACCC |
| | GGCTTCAACGAGTACGACTTCGTGCCCGAGAGCTTCGACCGGGACAAAACCATCGCCCTGATCATGAA |
| | CAGTAGTGGCAGTACCGGATTGCCCAAGGGCGTAGCCTACCGCACCGCACCGCTTGTGTCCGATTCA |
| | GTCATGCCCGCGACCCCATCTTCGGCAACCAGATCATCCCCGACACCGCTATCCTCAGCGTGGTGCCAT |
| | TCACCACGGCTTCGGCATGTTCACCACGCTGGGCTACTTGATCTGCGGCTTTCGGGTCGTGCTCATGT |
| | ACCGCTTCGAGGAGGAGCTATTCTTGCGCAGCTTGCAAGACTATAAGATTCAATCTGCCCTGCTGGTG |
| | CCCACACTATTTAGCTTCTTCGCTAAGAGCACTCTCATCGACAAGTACGACCTAAGCAACTTGCACGAG |
| | ATCGCCAGCGGCGGGGCGCCGCTCAGCAAGGAGGTAGGTGAGGCCGTGGCCAAACGCTTCCACCTA |
| | CCAGGCATCCGCCAGGGCTACGCCTGACAGAAACAACCAGCGCCATTCTGATCACCCCCGAAGGGG |
| | ACGACAAGCCTGGCGCAGTAGGCAAGGTGGTGCCCTTCTTCGAGGCTAAGGTGGTGGACTTGGACAC |
| | CGGTAAGACACTGGGTGTGAACCAGCGCGGCGAGCTGTGCGTCCGTGGCCCCATGATCATGAGCGGC |
| | TACGTTAACAACCCCGAGGCTACAAACGCTCTCATCGACAAGGACGGCTGGCTGCACAGCGGCGACA |
| | TCGCCTACTGGGACGAGGACGAGCACTTCTTCATCGTGGACCGGCTGAAGAGCCTGATCAAATACAA |
| | GGGCTACCAGGTAGCCCCAGCCGAACTGGAGAGCATCCTGCTGCAACACCCCAACATCTTCGACGCC |
| | GGGGTCGCCGGCCTGCCCGACGACGATGCCGGCGAGCTGCCCGCCGCAGTCGTCGTGCTGGAACAC |
| | GGTAAAACCATGACCGAGAAGGAGATCGTGGACTATGTGGCCAGCCAGGTTACAACCGCCAAGAAG |
| | CTGCGCGGTGGTGTTGTGTTCGTGGACGAGGTGCCTAAAGGACTGACCGGCAAGTTGGACGCCCGCA |
| | AGATCCGCGAGATTCTCATTAAGGCCAAGAAGGGCGGCAAGATCGCCGTGTAATCGCGAGAATTCTC |
| | TAGAGTCGACACTAGTGCGGATCCACGGGTGGCATCCCTGTGACCCCTCCCCAGTGCCTCTCCTGGCC |
| | CTGGAAGTTGCCACTCCAGTGCCCACCAGCCTTGTCCTAATAAAATTAAGTTGCATCATTTTGTCTGAC |
| | TAGGTGTCCTTCTATAATATTATGGGTGGAGGGGGGTGGTATGGAGCAAGGGGCAAGTTGGGAAG |
| | ACAACCTGTAGGGCCTGCGGGGTCTATTGGGAACCAAGCTGGAGTGCAGTGGCACAATCTTGGCTCA |
| | CTGCAATCTCCGCCTCCTGGGTTCAAGCGATTCTCCTGCCTCAGCCTCCCGAGTTGTTGGGATTCCAGG |
| | CATGCATGACCAGGCTCAGCTAATTTTTGTTTTTTTGGTAGAGACGGGGTTTCACCATATTGGCCAGGC |
| | TGGTCTCAACCTCCTAATCTCAGGTGATCTACCCACCTTGGCCTCCCAAATTGCTGGGATTACAGGCGT |
| | GAACCACTGCTCCCTTCCCTGTCCTTATCGATAGATCTAGGAACCCCTAGTGATGGAGTTGGCCACTCC |
| | CTCTCTGCGCGCTCGCTCGCTCACTGAGGCCGGGCGACCAAAGGTCGCCCGACGCCCGGGCTTTGCCC |
| | GGGCGGCCTCAGTGAGCGAGCGAGCGCGCAGCTGCCTGCAGGCAGCTTGGCACTGGCCGTCGTTTTA |
| | CAACGTCGTGACTGGGAAAACCCTGGCGTTACCCAACTTAATCGCCTTGCAGCACATCCCCCTTTCGCC |
| | AGCTGGCGTAATAGCGAAGAGGCCCGCACCGATCGCCCTTCCCAACAGTTGCGCAGCCTGAATGGCG |
| | AATGGCGCCTGATGCGGTATTTTCTCCTTACGCATCTGTGCGGTATTTCACACCGCATACGTCAAAGCA |
| | ACCATAGTACGCGCCCTGTAGCGGCGCATTAAGCGCGGCGGGTGTGGTGGTTACGCGCAGCGTGACC |
| | GCTACACTTGCCAGCGCCCTAGCGCCCGCTCCTTTCGCTTTCTTCCCTTCCTTTCTCGCCACGTTCGCCG |
| | GCTTTCCCCGTCAAGCTCTAAATCGGGGGCTCCCTTTAGGGTTCCGATTTAGTGCTTTACGGCACCTCG |
| | ACCCCAAAAAACTTGATTTGGGTGATGGTTCACGTAGTGGGCCATCGCCCTGATAGACGGTTTTTCGC |
| | CCTTTGACGTTGGAGTCCACGTTCTTTAATAGTGGACTCTTGTTCCAAACTGGAACAACACTCAACCCT |
| | ATCTCGGGCTATTCTTTTGATTTATAAGGGATTTTGCCGATTTCGGCCTATTGGTTAAAAAATGAGCTG |
| | ATTTAACAAAAATTTAACGCGAATTTTAACAAAATATTAACGTTTACAATTTTATGGTGCACTCTCAGTA |
| | CAATCTGCTCTGATGCCGCATAGTTAAGCCAGCCCCGACACCCGCCAACACCCGCTGACGCGCCCTGA |
| | CGGGCTTGTCTGCTCCCGGCATCCGCTTACAGACAAGCTGTGACCGTCTCCGGGAGCTGCATGTGTCA |
| | GAGGTTTTCACCGTCATCACCGAAACGCGCGAGACGAAAGGGCCTCGTGATACGCCTATTTTTATAGG |
| | TTAATGTCATGATAATAATGGTTTCTTAGACGTCAGGTGGCACTTTTCGGGGAAATGTGCGCGGAACC |
| | CCTATTTGTTTATTTTTCTAAATACATTCAAATATGTATCCGCTCATGAGACAATAACCCTGATAAATGC |
| | TTCAATAATATTGAAAAGGAAGAGTATGAGTATTCAACATTTCCGTGTCGCCCTTATTCCCTTTTTTGC |
| | GGCATTTTGCCTTCCTGTTTTTGCTCACCCAGAAACGCTGGTGAAAGTAAAAGATGCTGAAGATCAGTT |
| | GGGTGCACGAGTGGGTTACATCGAACTGGATCTCAACAGCGGTAAGATCCTTGAGAGTTTTCGCCCC |
| | GAAGAACGTTTTCCAATGATGAGCACTTTTAAAGTTCTGCTATGTGGCGCGGTATTATCCCGTATTGAC |
| | GCCGGGCAAGAGCAACTCGGTCGCCGCATACACTATTCTCAGAATGACTTGGTTGAGTACTCACCAGT |
| | CACAGAAAAGCATCTTACGGATGGCATGACAGTAAGAGAATTATGCAGTGCTGCCATAACCATGAGT |
| | GATAACACTGCGGCCAACTTACTTCTGACAACGATCGGAGGACCGAAGGAGCTAACCGCTTTTTTGCA |
| | CAACATGGGGGATCATGTAACTCGCCTTGATCGTTGGGAACCGGAGCTGAATGAAGCCATACCAAAC |
| | GACGAGCGTGACACCACGATGCCTGTAGCAATGGCAACAACGTTGCGCAAACTATTAACTGGCGAAC |
| | TACTTACTCTAGCTTCCCGGCAACAATTAATAGACTGGATGGAGGCGGATAAAGTTGCAGGACCACTT |
| | CTGCGCTCGGCCCTTCCGGCTGGCTGGTTTATTGCTGATAAATCTGGAGCCGGTGAGCGTGGGTCTCG |
| | CGGTATCATTGCAGCACTGGGGCCAGATGGTAAGCCCTCCCGTATCGTAGTTATCTACACGACGGGGA |
| | GTCAGGCAACTATGGATGAACGAAATAGACAGATCGCTGAGATAGGTGCCTCACTGATTAAGCATTG |
| | GTAACTGTCAGACCAAGTTTACTCATATATACTTTAGATTGATTTAAAACTTCATTTTTAATTTAAAAGG |
| | ATCTAGGTGAAGATCCTTTTTGATAATCTCATGACCAAAATCCCTTAACGTGAGTTTTCGTTCCACTGA |

TABLE 3-continued

Constructs and other sequences.

| Name | Sequence (SEQ ID NO) |
|---|---|
| | GCGTCAGACCCCGTAGAAAAGATCAAAGGATCTTCTTGAGATCCTTTTTTTCTGCGCGTAATCTGCTGC<br>TTGCAAACAAAAAAACCACCGCTACCAGCGGTGGTTTGTTTGCCGGATCAAGAGCTACCAACTCTTTTT<br>CCGAAGGTAACTGGCTTCAGCAGAGCGCAGATACCAAATACTGTTCTTCTAGTGTAGCCGTAGTTAGG<br>CCACCACTTCAAGAACTCTGTAGCACCGCCTACATACCTCGCTCTGCTAATCCTGTTACCAGTGGCTGC<br>TGCCAGTGGCGATAAGTCGTGTCTTACCGGGTTGGACTCAAGACGATAGTTACCGGATAAGGCGCAG<br>CGGTCGGGCTGAACGGGGGGTTCGTGCACACAGCCCAGCTTGGAGCGAACGACCTACACCGAACTG<br>AGATACCTACAGCGTGAGCTATGAGAAAGCGCCACGCTTCCCGAAGGGAGAAAGGCGGACAGGTAT<br>CCGGTAAGCGGCAGGGTCGGAACAGGAGAGCGCACGAGGGAGCTTCCAGGGGGAAACGCCTGGTA<br>TCTTTATAGTCCTGTCGGGTTTCGCCACCTCTGACTTGAGCGTCGATTTTTGTGATGCTCGTCAGGGGG<br>GCGGAGCCTATGGAAAAACGCCAGCAACGCGGCCTTTTTACGGTTCCTGGCCTTTTGCTGGCCTTTTG<br>CTCACATGTTCTTTCCTGCGTTATCCCCTGATTCTGTGGATAACCGTATTACCGCCTTTGAGTGAGCTGA<br>TACCGCTCGCCGCAGCCGAACGACCGAGCGCAGCGAGTCAGTGAGCGAGGAAGCGGAAGAGCGCCC<br>AATACGCAAACCGCCTCTCCCCGCGCGTTGGCCGATTCATTAATGCAGCTGGCACGACAGGTTTCCCG<br>ACTGGAAAGCGGGCAGTGAGCGCAACGCAATTAATGTGAGTTAGCTCACTCATTAGGCACCCCAGGC<br>TTTACACTTTATGCTTCCGGCTCGTATGTTGTGTGGAATTGTGAGCGGATAACAATTTCACACAGGAAA<br>CAGCTATGACCATGATTACGAAT (49) |
| pAAV-PB1-2-<br>MinTk | GCCTGCAGGCAGCTGCGCGCTCGCTCGCTCACTGAGGCCGCCCGGGCAAAGCCCGGGCGTCGGGCG<br>ACCTTTGGTCGCCCGGCCTCAGTGAGCGAGCGAGCGCGCAGAGAGGGAGTGGCCAACTCCATCACTA<br>GGGGTTCCTATCGATATCAAGCTTTTCTCTGGCCTAACTGGCCGGTACTCTGTACTTTCCTGACCTTGG<br>CACAGTGCCACCATCAACTTGCCTGACACCCATTACTCGCATCCATTCTCTCTGTACTTTCCTGACCTTG<br>GCACAGTGCCACCATCAACTTGCCTGACACCGCACTGAAGGTCCTCAATCGTCTGTACTTTCCTGACCT<br>TGGCACAGTGCCACCATCAACTTGCCTGACACCGCTGGGAGTTCGTAGACGGAGATCCGGCCCCGCCC<br>AGCGTCTTGTCATTGGCGAATTCGAACACGCAGATGCAGTCGGGGCGGCGCGGTCCGAGGTCCACTT<br>CGCATATTAAGGTGACGCGTGTGGCCTCGAACACCGAGCGACCCTGCAGCGACCCGCTTAACAGCGT<br>CAACAGCGTGCCGCAGATCTCGAGGAGCTTGGCGAGATTTTCAGGAGCTAAGGAAGCTAAACATGGA<br>AGATGCCAAAACATTAAGAAGGGCCCAGCGCCATTCTACCCACTCGAAGACGGGACCGCCGGCGAG<br>CAGCTGCACAAAGCCATGAAGCGCTACGCCCTGGTGCCCGGCACCATCGCCTTTACCGACGCACATAT<br>CGAGGTGGACATTACCTACGCCGGATACTTCGAGATGAGCGTTCGGCTGGCAGAAGCTATGAAGCGC<br>TATGGGCTGAATACAAACCATCGGATCGTGGTGTGCAGCGAGAATAGCTTGCAGTTCTTCATGCCCGT<br>GTTGGGTGCCCTGTTCATCGGTGTGGCTGTGGCCCCAGCTAACGACATCTACAACGAGCGCGAGCTG<br>CTGAACAGCATGGGCATCAGCCAGCCCACCGTCGTATTCGTGAGCAAGAAAGGGCTGCAAAAGATCC<br>TCAACGTGCAAAAGAAGCTACCGATCATACAAAAGATCATCATCATGGATAGCAAGACCGACTACCAG<br>GGCTTCCAAAGCATGTACACCTTCGTGACTTCCCATTTGCCACCCGGCTTCAACGAGTACGACTTCGTG<br>CCCGAGAGCTTCGACCGGGACAAAACCATCGCCCTGATCATGAACAGTAGTGGCAGTACCGGATTGC<br>CAAGGGCGTAGCCCTACCGCACCGCACCGCTTGTGTCCGATTCAGTCATGCCCGCGACCCCATCTTC<br>GGCAACCAGATCATCCCCGACACCGCTATCCTCAGCGTGGTGCCATTTCACCACGGCTTCGGCATGTTC<br>ACCAGCTGGGCTACTTGATCTGCCGGCTTTCGGGTCGTGCTCATGTACCGCTTCGAGGAGGAGCTATT<br>CTTGCGCAGCTTGCAAGACTATAAGATTCAATCTGCCCTGCTGGTGCCCACACTATTTAGCTTCTTCGC<br>TAAGAGCACTCTCATCGACAAGTACGACCTAAGCAACTTGCACGAGATCGCCAGCGGCGGGGCGCCG<br>CTCAGCAAGGAGGTAGGTGAGGCCGTGGCCAAACGCTTCCACCTACCAGGCATCCGCCAGGGCTACG<br>GCCTGACAGAAACAACCAGCGCCATTCTGATCACCCCCGAAGGGGACGACAAGCCTGGCGCAGTAGG<br>CAAGGTGGTGCCCTTCTTCGAGGCTAAGGTGGTGGACTTGGACACCGGTAAGACACTGGGTGTGAAC<br>CAGCGCGGCGAGCTGTGCGTCCGTGGCCCCATGATCATGAGCGGCTACGTTAACAACCCCGAGGCTA<br>CAAACGCTCTCATCGACAAGGACGGCTGGCTGCACAGCGGCGACATCGCCTACTGGGACGAGGACGA<br>GCACTTCTTCATCGTGGACCGGCTGAAGAGCCTGATCAAATACAAGGGCTACCAGGTAGCCCCAGCC<br>GAACTGGAGAGCATCCTGCTGCAACACCCCAACATCTTCGACGCCGGGGTCGCCGGCCTGCCCGACG<br>ACGATGCCGGCGAGCTGCCCGCCGCAGTCGTCGTGCTGGAACACGGTAAAACCATGACCGAGAAGG<br>AGATCGTGGACTATGTGGCCAGCCAGGTTACAACCGCCAAGAAGCTGCGCGGTGGTGTTGTGTTCGT<br>GGACGAGGTGCCTAAAGGACTGACCGGCAAGTTGGACGCCCGCAAGATCCGCGAGATTCTCATTAAG<br>GCCAAGAAGGGCGGCAAGATCGCCGTGTAATCGCGAGAATTCTCTAGAGTCGACACTAGTGCGGATC<br>CACGGGTGGCATCCCTGTGACCCCTCCCCAGTGCCTCTCCTGGCCCTGGAAGTTGCCACTCCAGTGCCC<br>ACCAGCCTTGTCCTAATAAAATTAAGTTGCATCATTTTGTCTGACTAGGTGTCCTTCTATAATATTATGG<br>GGTGGAGGGGGGTGGTATGGAGCAAGGGGCAAGTTGGGAAGACAACCTGTAGGGCCTGCGGGGTC<br>TATTGGGAACCAAGCTGGAGTGCAGTGGCACAATCTTGGCTCACTGCAATCTCCGCCTCCTGGGTTCA<br>AGCGATTCTCCTGCCTCAGCCTCCCGAGTTGTTGGGATTCCAGGCATGCATGACCAGGCTCAGCTAAT<br>TTTTGTTTTTTTGGTAGAGACGGGGTTTCACCATATTGGCCAGGCTGGTCTCCAACTCCTAATCTCAGG<br>TGATCTACCCACCTTGGCCTCCCAAATTGCTGGGATTACAGGCGTGAACCACTGCTCCCTTCCCTGTCC<br>TTATCGATAGATCTAGGAACCCCTAGTGATGGAGTTGGCCACTCCCTCTCTGCGCGCTCGCTCGCTCAC<br>TGAGGCCGGGCGACCAAAGGTCGCCCGACGCCCGGGCTTTGCCCGGGCGGCCTCAGTGAGCGAGCG<br>AGCGCGCAGCTGCCTGCAGGCAGCTTGGCACTGGCCGTCGTTTTACAACGTCGTGACTGGGAAAACC<br>CTGGCGTTACCCAACTTAATCGCCTTGCAGCACATCCCCCTTTCGCCAGCTGGCGTAATAGCGAAGAG<br>GCCCGCACCGATCGCCCTTCCCAACAGTTGCGCAGCCTGAATGGCGAATGGCGCTGATGCGGTATTT<br>TCTCCTTACGCATCTGTGCGGTATTTCACACCGCATACGTCAAAGCAACCATAGTACGCGCCCTGTAGC<br>GGCGCATTAAGCGCGGCGGGTGTGGTGGTTACGCGCAGCGTGACCGCTACACTTGCCAGCGCCCTAG<br>CGCCCGCTCCTTTCGCTTTCTTCCCTTCCTTTCTCGCCACGTTCGCCGGCTTTCCCCGTCAAGCTCTAAAT<br>CGGGGCTCCCTTTAGGGTTCCGATTTAGTGCTTTACGGCACCTCGACCCCAAAAAACTTGATTTGGG<br>TGATGGTTCACGTAGTGGGCCATCGCCCTGATAGACGGTTTTTCGCCCTTTGACGTTGGAGTCCACGTT<br>CTTTAATAGTGGACTCTTGTTCCAAACTGGAACAACACTCAACCCTATCTCGGGCTATTCTTTTGATTTA<br>TAAGGGATTTTGCCGATTTCGGCCTATTGGTTAAAAAATGAGCTGATTTAACAAAAATTTAACGCGAA<br>TTTTAACAAAATATTAACGCTTACAATTTATGGTGCACTCTCAGTACAATCTGCTCTGATGCCGCATAG<br>TTAAGCCAGCCCCGACACCCGCCAACACCCGCTGACGCGCCCTGACGGGCTTGTCTGCTCCCGGCATC<br>CGCTTACAGACAAGCTGTGACCGTCTCCGGGAGCTGCATGTGTCAGAGGTTTTCACCGTCATCACCGA<br>AACGCGCGAGACGAAAGGGCCTCGTGATACGCCTATTTTTATAGGTTAATGTCATGATAATAATGGTT<br>TCTTAGACGTCAGGTGGCACTTTTCGGGGAAATGTGCGCGGAACCCCTATTTGTTTATTTTTCTAAATA<br>CATTCAAATATGTATCCGCTCATGAGACAATAACCCTGATAAATGCTTCAATAATATTGAAAAAGGAA |

TABLE 3-continued

Constructs and other sequences.

| Name | Sequence (SEQ ID NO) |
|---|---|
| | GAGTATGAGTATTCAACATTTCCGTGTCGCCCTTATTCCCTTTTTTGCGGCATTTTGCCTTCCTGTTTTTG
CTCACCCAGAAACGCTGGTGAAAGTAAAAGATGCTGAAGATCAGTTGGGTGCACGAGTGGGTTACAT
CGAACTGGATCTCAACAGCGGTAAGATCCTTGAGAGTTTTCGCCCCGAAGAACGTTTTCCAATGATGA
GCACTTTTAAAGTTCTGCTATGTGGCGCGGTATTATCCCGTATTGACGCCGGGCAAGAGCAACTCGGT
CGCCGCATACACTATTCTCAGAATGACTTGGTTGAGTACTCACCAGTCACAGAAAAGCATCTTACGGA
TGGCATGACAGTAAGAGAATTATGCAGTGCTGCCATAACCATGAGTGATAACACTGCGGCCAACTTAC
TTCTGACAACGATCGGAGGACCGAAGGAGCTAACCGCTTTTTTGCACAACATGGGGGATCATGTAACT
CGCCTTGATCGTTGGGAACCGGAGCTGAATGAAGCCATACCAAACGACGAGCGTGACACCACGATGC
CTGTAGCAATGGCAACAACGTTGCGCAAACTATTAACTGGCGAACTACTTACTCTAGCTTCCCGGCAA
CAATTAATAGACTGGATGGAGGCGGATAAAGTTGCAGGACCACTTCTGCGCTCGGCCCTTCCGGCTG
GCTGGTTTATTGCTGATAAATCTGGAGCCGGTGAGCGTGGGTCTCGCGGTATCATTGCAGCACTGGG
GCCAGATGGTAAGCCCTCCCGTATCGTAGTTATCTACACGACGGGGAGTCAGGCAACTATGGATGAA
CGAAATAGACAGATCGCTGAGATAGGTGCCTCACTGATTAAGCATTGGTAACTGTCAGACCAAGTTTA
CTCATATATACTTTAGATTGATTTAAAACTTCATTTTTAATTTAAAAGGATCTAGGTGAAGATCCTTTTT
GATAATCTCATGACCAAAATCCCTTAACGTGAGTTTTCGTTCCACTGAGCGTCAGACCCCGTAGAAAA
GATCAAAGGATCTTCTTGAGATCCTTTTTTTCTGCGCGTAATCTGCTGCTTGCAAACAAAAAAACCACC
GCTACCAGCGGTGGTTTGTTTGCCGGATCAAGAGCTACCAACTCTTTTTCCGAAGGTAACTGGCTTCA
GCAGAGCGCAGATACCAAATACTGTTCTTCTAGTGTAGCCGTAGTTAGGCCACCACTTCAAGAACTCT
GTAGCACCGCCTACATACCTCGCTCTGCTAATCCTGTTACCAGTGGCTGCTGCCAGTGGCGATAAGTC
GTGTCTTACCGGGTTGGACTCAAGACGATAGTTACCGGATAAGGCGCAGCGGTCGGGCTGAACGGG
GGGTTCGTGCACACAGCCCAGCTTGGAGCGAACGACCTACACCGAACTGAGATACCTACAGCGTGA
CTATGAGAAAGCGCCACGCTTCCCGAAGGGAGAAAGGCGGACAGGTATCCGGTAAGCGGCAGGGTC
GGAACAGGAGAGCGCACGAGGGAGCTTCCAGGGGGAAACGCCTGGTATCTTTATAGTCCTGTCGGG
TTTCGCCACCTCTGACTTGAGCGTCGATTTTTGTGATGCTCGTCAGGGGGCGGAGCCTATGGAAAAA
CGCCAGCAACGCGGCCTTTTTACGGTTCCTGGCCTTTTGCTGGCCTTTTGCTCACATGTTCTTTCCTGCG
TTATCCCCTGATTCTGTGGATAACCGTATTACCGCCTTTGAGTGAGCTGATACCGCTCGCCGCAGCCGA
ACGACCGAGCGCAGCGAGTCAGTGAGCGAGGAAGCGGAAGAGCGCCCAATACGCAAACCGCCTCTC
CCCGCGCGTTGGCCGATTCATTAATGCAGCTGGCACGACAGGTTTCCCGACTGGAAAGCGGGCAGTG
AGCGCAACGCAATTAATGTGAGTTAGCTCACTCATTAGGCACCCCAGGCTTTACACTTTATGCTTCCGG
CTCGTATGTTGTGTGGAATTGTGAGCGGATAACAATTTCACACAGGAAACAGCTATGACCATGATTAC
GAATT (50) |
| pGL4.10 backbone vector | GGCCTAACTGGCCGGTACCTGAGCTCGCTAGCCTCGAGGATATCAAGATCTGGCCTCGGCGGCCAAG
CTTGGCAATCCGGTACTGTTGGTAAAGCCACCATGGAAGATGCCAAAAACATTAAGAAGGGCCCAGC
GCCATTCTACCCACTCGAAGACGGGACCGCCGGCGAGCAGCTGCACAAAGCCATGAAGCGCTACGCC
CTGGTGCCCGGCACCATCGCCTTTACCGACGCACATATCGAGGTGGACATTACCTACGCCGAGTACTT
CGAGATGAGCGTTCGGCTGGCAGAAGCTATGAAGCGCTATGGGCTGAATACAAACCATCGGATCGTG
GTGTGCAGCGAGAATAGCTTGCAGTTCTTCATGCCCGTGTTGGGTGCCCTGTTCATCGGTGTGGCTGT
GGCCCCAGCTAACGACATCTACAACGAGCGCGAGCTGCTGAACAGCATGGGCATCAGCCAGCCCACC
GTCGTATTCGTGAGCAAGAAAGGGCTGCAAAAGATCCTCAACGTGCAAAAGAAGCTACCGATCATAC
AAAAGATCATCATCATGGATAGCAAGACCGACTACCAGGGCTTCCAAAGCATGTACACCTTCGTGACT
TCCCATTTGCCACCCGGCTTCAACGAGTACGACTTCGTGCCCGAGAGCTTCGACCGGGACAAAACCAT
CGCCCTGATCATGAACAGTAGTGGCAGTACCGGATTGCCCAAGGGCGTAGCCCTACCGCACCGCACC
GCTTGTGTCCGATTCAGTCATGCCCGCGACCCCATCTTCGGCAACCAGATCATCCCCGACACCGCTATC
CTCAGCGTGGTGCCATTTCACCACGGCTTCGGCATGTTCACCACGCTGGGCTACTTGATCTGCGGCTTT
CGGGTCGTGCTCATGTACCGCTTCGAGGAGGAGCTATTCTTGCGCAGCTGCAAGACTATAAGATTCA
ATCTGCCCTGCTGGTGCCCACACTATTTAGCTTCTTCGCTAAGAGCACTCTCATCGACAAGTACGACCT
AAGCAACTTGCACGAGATCGCCAGCGGCGGGGCGCCGCTCAGCAAGGAGGTAGGTGAGGCCGTGGC
CAAACGCTTCCACCTACCAGGCATCCGCCAGGGCTACGGCCTGACAGAAACAACCAGCGCCATTCTGA
TCACCCCCGAAGGGGACGACAAGCCTGGCGCAGTAGGCAAGGTGGTGCCCTTCTTCGAGGCTAAGGT
GGTGGACTTGGACACCGGTAAGACACTGGGTGTGAACCAGCGCGGCGAGCTGTGCGTCCGTGGCCC
CATGATCATGAGCGGCTACGTTAACAACCCCGAGGCTACAAACGCTCTCATCGACAAGGACGGCTGG
CTGCACAGCGGCGACATCGCCTACTGGGACGAGGACGAGCACTTCTTCATCGTGGACCGGCTGAAGA
GCCTGATCAAATACAAGGGCTACCAGGTAGCCCCAGCCGAACTGGAGAGCATCCTGCTGCAACACCC
CAACATCTTCGACGCCGGGGTCGCCGGCCTGCCCGACGACGATGCCGGCGAGCTGCCCGCCGCAGTC
GTCGTGCTGGAACACGGTAAAACCATGACCGAGAAGGAGATCGTGGACTATGTGGCCAGCCAGGTTA
CAACCGCCAAGAAGCTGCGCGGTGGTGTTGTGTTCGTGGACGAGGTGCCTAAAGGACTGACCGGCAA
GTTGGACGCCCGCAAGATCCGCGAGATTCTCATTAAGGCCAAGAAGGGCGGCAAGATCGCCGTGTAA
TAATTCTAGAGTCGGGGCGGCCGGCCGCTTCGAGCAGACATGATAAGATACATTGATGAGTTTGGAC
AAACCACAACTAGAATGCAGTGAAAAAAATGCTTTATTTGTGAAATTTGTGATGCTATTGCTTTATTTG
TAACCATTATAAGCTGCAATAAACAAGTTAACAACAACAATTGCATTCATTTTATGTTTCAGGTTCAGG
GGGAGGTGTGGGAGGTTTTTTAAAGCAAGTAAAACCTCTACAAATGTGGTAAAATCGATAAGGATCC
GTCGACCGATGCCCTTGAGAGCCTTCAACCCAGTCAGCTCCTTCCGGTGGGCGCGGGGCATGACTATC
GTCGCCGCACTTATGACTGTCTTCTTTATCATGCAACTCGTAGGACAGGTGCCGGCAGCGCTCTTCCGC
TTCCTCGCTCACTGACTCGCTGCGCTCGGTCGTTCGGCTGCGGCGAGCGGTATCAGCTCACTCAAAGG
CGGTAATACGGTTATCCACAGAATCAGGGGATAACGCAGGAAAGAACATGTGAGCAAAAGGCCAGC
AAAAGGCCAGGAACCGTAAAAAGGCCGCGTTGCTGGCGTTTTTCCATAGGCTCCGCCCCCCTGACGA
GCATCACAAAAATCGACGCTCAAGTCAGAGGTGGCGAAACCCGACAGGACTATAAAGATACCAGGCG
TTTCCCCCTGGAAGCTCCCTCGTGCGCTCTCCTGTTCCGACCCTGCCGCTTACCGGATACCTGTCCGCCT
TTCTCCCTTCGGGAAGCGTGGCGCTTTCTCATAGCTCACGCTGTAGGTATCTCAGTTCGGTGTAGGTCG
TTCGCTCCAAGCTGGGCTGTGTGCACGAACCCCCCGTTCAGCCCGACCGCTGCGCCTTATCCGGTAAC
TATCGTCTTGAGTCCAACCCGGTAAGACACGACTTATCGCCACTGGCAGCAGCCACTGGTAACAGGAT
TAGCAGAGCGAGGTATGTAGGCGGTGCTACAGAGTTCTTGAAGTGGTGGCCTAACTACGGCTACACT
AGAAGAACAGTATTTGGTATCTGCGCTCTGCTGAAGCCAGTTACCTTCGGAAAAAGAGTTGGTAGCTC
TTGATCCGGCAAACAAACCACCGCTGGTAGCGGTGGTTTTTTTGTTTGCAAGCAGCAGATTACGCGCA
GAAAAAAAGGATCTCAAGAAGATCCTTTGATCTTTTCTACGGGGTCTGACGCTCAGTGGAACGAAAAC |

TABLE 3-continued

Constructs and other sequences.

| Name | Sequence (SEQ ID NO) |
|---|---|
|  | TCACGTTAAGGGATTTTGGTCATGAGATTATCAAAAAGGATCTTCACCTAGATCCTTTTAAATTAAAAA<br>TGAAGTTTTAAATCAATCTAAAGTATATATGAGTAAACTTGGTCTGACAGCGGCCGCAAATGCTAAAC<br>CACTGCAGTGGTTACCAGTGCTTGATCAGTGAGGCACCGATCTCAGCGATCTGCCTATTTCGTTCGTCC<br>ATAGTGGCCTGACTCCCCGTCGTGTAGATCACTACGATTCGTGAGGGCTTACCATCAGGCCCCAGCGC<br>AGCAATGATGCCGCGAGAGCCGCGTTCACCGGCCCCCGATTTGTCAGCAATGAACCAGCCAGCAGGG<br>AGGGCCGAGCGAAGAAGTGGTCCTGCTACTTTGTCCGCCTCCATCCAGTCTATGAGCTGCTGTCGTGA<br>TGCTAGAGTAAGAAGTTCGCCAGTGAGTAGTTTCCGAAGAGTTGTGGCCATTGCTACTGGCATCGTG<br>GTATCACGCTCGTCGTTCGGTATGGCTTCGTTCAACTCTGGTTCCCAGCGGTCAAGCCGGGTCACATG<br>ATCACCCATATTATGAAGAAATGCAGTCAGCTCCTTAGGGCCTCCGATCGTTGTCAGAAGTAAGTTGG<br>CCGCGGTGTTGTCGCTCATGGTAATGGCAGCACTACACAATTCTCTTACCGTCATGCCATCCGTAAGAT<br>GCTTTTCCGTGACCGGCGAGTACTCAACCAAGTCGTTTTGTGAGTAGTGTATACGGCGACCAAGCTGC<br>TCTTGCCCGGCGTCTATACGGGACAACACCGCGCCACATAGCAGTACTTTGAAAGTGCTCATCATCGG<br>GAATCGTTCTTCGGGGCGGAAAGACTCAAGGATCTTGCCGCTATTGATGATCCAGTTCGATATAGCCCA<br>CTCTTGCACCCAGTTGATCTTCAGCATCTTTTACTTTCACCAGCGTTTCGGGGTGTGCAAAAACAGGCA<br>AGCAAATGCCGCAAAGAAGGGAATGAGTGCGACACGAAAATGTTGGATGCTCATACTCGTCCTTTTT<br>CAATATTATTGAAGCATTTATCAGGGTTACTAGTACGTCTCTCAAGGATAAGTAAGTAATATTAAGGTA<br>CGGGAGGTATTGGACAGGCCGCAATAAAATATCTTTATTTTCATTACATCTGTGTGTTGGTTTTTTGTG<br>TGAATCGATAGTACTAACATACGCTCTCCATCAAAACAAAACGAAACAAAACAAACTAGCAAAATAGG<br>CTGTCCCCAGTGCAAGTGCAGGTGCCAGAACATTTCTCT (51) |
| CMV-IE<br>comparative<br>promoter | GACATTGATTATTGACTAGTTATTAATAGTAATCAATTACGGGGTCATTAGTTCATAGCCCATATATGG<br>AGTTCCGCGTTACATAACTTACGGTAAATGGCCCGCCTGGCTGACCGCCCAACGACCCCCGCCCATTG<br>ACGTCAATAATGACGTATGTTCCCATAGTAACGCCAATAGGGACTTTCCATTGACGTCAATGGGTGGA<br>GTATTTACGGTAAACTGCCCACTTGGCAGTACATCAAGTGTATCATATGCCAAGTACGCCCCCTATTGA<br>CGTCAATGACGGTAAATGGCCCGCCTGGCATTATGCCCAGTACGTGACCTTATGGGACTTTCCTACTTG<br>GCAGTACATCTACGTATTAGTCATCGCTATTACCATGGTGATGCGGTTTTGGCAGTACATCAATGGGC<br>GTGGATAGCGGTTTGACTCACGGGGATTTCCAAGTCTCCACCCCATTGACGTCAATGGGAGTTTGTTT<br>TGGCACCAAAATCAACGGGACTTTCCAAATGTCGTAACAACTCCGCCCCATTGACGCAAATGGGCGG<br>TAGGCGTGTACGGTGGGAGGTCTATATAAGCAGAGCT (52) |
| pcDNA6.0 β-<br>galactosidase<br>transfection<br>control | GACGGATCGGGAGATCTCCCGATCCCCTATGGTGCACTCTCAGTACAATCTGCTCTGATGCCGCATAG<br>TTAAGCCAGTATCTGCTCCCTGCTTGTGTGTTGGAGGTCGCTGAGTAGTGCGCGAGCAAAATTTAAGC<br>TACAACAAGGCAAGGCTTGACCGACAATTGCATGAAGAATCTGCTTAGGGTTAGGCGTTTTGCGCTGC<br>TTCGCGATGTACGGGCCAGATATACGCGTTGACATTGATTATTGACTAGTTATTAATAGTAATCAATTA<br>CGGGGTCATTAGTTCATAGCCCATATATGGAGTTCCGCGTTACATAACTTACGGTAAATGGCCCGCCT<br>GGCTGACCGCCCAACGACCCCCGCCCATTGACGTCAATAATGACGTATGTTCCCATAGTAACGCCAAT<br>AGGGACTTTCCATTGACGTCAATGGGTGGAGTATTTACGGTAAACTGCCCACTTGGCAGTACATCAAG<br>TGTATCATATGCCAAGTACGCCCCCTATTGACGTCAATGACGGTAAATGGCCCGCCTGGCATTATGCCC<br>AGTACATGACCTTATGGGACTTTCCTACTTGGCAGTACATCTACGTATTAGTCATCGCTATTACCATGG<br>TGATGCGGTTTTGGCAGTACATCAATGGGCGTGGATAGCGGTTTGACTCACGGGGATTTCCAAGTCTC<br>CACCCCATTGACGTCAATGGGAGTTTGTTTTGGCACCAAAATCAACGGGACTTTCCAAAATGTCGTAA<br>CAACTCCGCCCCATTGACGCAAATGGGCGGTAGGCGTGTACGGTGGGAGGTCTATATAAGCAGAGCT<br>CTCTGGCTAACTAGAGAACCCACTGCTTACTGGCTTATCGAAATTAATACGACTCACTATAGGGAGAC<br>CCAAGCTGGCTAGCGTTTAAACTTAAGCTTGGTACCGAGCTCGGATCCACTAGTCCAGTGTGGTGGAA<br>TTCTGCAGATCGAAACGATGATAGATCCCGTCGTTTTACAACGTCGTGACTGGGAAAACCCTGGCGTT<br>ACCCAACTTAATCGCCTTGCAGCACATCCCCTTTCGCCAGCTGGCGTAATAGCGAAGAGGCCCGCAC<br>CGATCGCCCTTCCCAACAGTTGCGCAGCCTGAATGGCGAATGGCGCTTTGCCTGGTTTCCGGCACCAG<br>AAGCGGTGCCGGAAAGCTGGCTGGAGTGCGATCTTCCTGAGGCCGATACTGTCGTCGTCCCCTCAAA<br>CTGGCAGATGCACGGTTACGATGCGCCCATCTACACCAACGTGACCTATCCCATTACGGTCAATCCGC<br>CGTTTGTTCCCACGGAGAATCCGACGGGTTGTTACTCGCTCACATTTAATGTTGATGAAAGCTGGCTAC<br>AGGAAGGCCAGACGCGAATTATTTTTGATGGCGTTAACTCGGCGTTTCATCTGTGGTGCAACGGGCG<br>CTGGGTCGGTTACGGCCAGGACAGTCGTTTGCCGTCTGAATTTGACCTGAGCGCATTTTTACGCGCCG<br>GAGAAAACCGCCTCGCGGTGATGGTGCTGCGCTGGAGTGACGGCAGTTATCTGGAAGATCAGGATAT<br>GTGGCGGATGAGCGGCATTTTCCGTGACGTCTCGTTGCTGCATAAACCGACTACACAAATCAGCGATT<br>TCCATGTTGCCACTCGCTTTAATGATGATTTCAGCCGCGCTGTACTGGAGGCTGAAGTTCAGATGTGC<br>GGCGAGTTGCGTGACTACCTACGGGTAACAGTTTCTTTATGGCAGGGTGAAACGCAGGTCGCCAGCG<br>GCACCGCGCCTTTCGGCGGTGAAATTATCGATGAGCGTGGTGGTTATGCCGATCGCGTCACACTACGT<br>CTGAACGTCGAAAACCCGAAACTGTGGAGCGCCGAAATCCCGAATCTCTATCGTGCGGTGGTTGAACT<br>GCACACCGCCGACGGCACGCTGATTGAAGCAGAAGCCTGCGATGTCGGTTTCCGCGAGGTGCGGATT<br>GAAAATGGTCTGCTGCTGCTGAACGGCAAGCCGTTGCTGATTCGAGGCGTTAACCGTCACGAGCATC<br>ATCCTCTGCATGGTCAGGTCATGGATGAGCAGACGATGGTGCAGGATATCCTGCTGATGAAGCAGAA<br>CAACTTTAACGCCGTGCGCTGTTCGCATTATCCGAACCATCCGCTGTGGTACACGCTGTGCGACCGCTA<br>CGGCCTGTATGTGGTGGATGAAGCCAATATTGAAACCCACGGCATGGTGCCAATGAATCGTCTGACC<br>GATGATCCGCGCTGGCTACCGGCGATGAGCGAACGCGTAACGCGAATGGTGCAGCGCGATCGTAATC<br>ACCCGAGTGTGATCATCTGGTCGCTGGGGAATGAATCAGGCCACGGCGCTAATCACGACGCGCTGTA<br>TCGCTGGATCAAATCTGTCGATCCTTCCCGCCCGGTGCAGTATGAAGGCGGCGGAGCCGACACCACG<br>GCCACCGATATTATTTGCCCGATGTACGCGCGCGTGGATGAAGACCAGCCCTTCCCGGCTGTGCCGAA<br>ATGGTCCATCAAAAAATGGCTTTCGCTACCTGGAGAGACGCGCCCGCTGATCCTTTGCGAATACGCCC<br>ACGCGATGGGTAACAGTCTTGGCGGTTTCGCTAAATACTGGCAGGCGTTTCGTCAGTATCCCCGTTTA<br>CAGGGCGGCTTCGTCTGGGACTGGGTGGATCAGTCGCTGATTAAATATGATGAAAACGGCAACCCGT<br>GGTCGGCTTACGGCGGTGATTTTGGCGATACGCCGAACGATCGCCAGTTCTGTATGAACGGTCTGGTC<br>TTTGCCGACCGCACGCCGCATCCAGCGCTGACGGAAGCAAAACACCAGCAGCAGTTTTTCCAGTTCCG<br>TTTATCCGGGCAAACCATCGAAGTGACCAGCGAATACCTGTTCCGTCATAGCGATAACGAGCTCCTGC<br>ACTGGATGGTGGCGCTGGATGGTAAGCCGCTGGCAAGCGGTGAAGTGCCTCTGGATGTCGCTCCACA<br>AGGTAAACAGTTGATTGAACTGCCTGAACTACCGCAGCCGGAGAGCGCCGGGCAACTCTGGCTCACA<br>GTACGCGTAGTGCAACCGAACGCGACCGCATGGTCAGAAGCCGGGCACATCAGCGCCTGGCAGCAG |

TABLE 3-continued

Constructs and other sequences.

| Name | Sequence (SEQ ID NO) |
|---|---|
| | TGGCGTCTGGCGGAAAACCTCAGTGTGACGCTCCCCGCCGCGTCCCACGCCATCCCGCATCTGACCAC |
| | CAGCGAAATGGATTTTTGCATCGAGCTGGGTAATAAGCGTTGGCAATTTAACCGCCAGTCAGGCTCTC |
| | TTTCACAGATGTGGATTGGCGATAAAAACCAACTGCTGACGCCGCTGCGCGATCAGTTCACCCGTGCA |
| | CCGCTGGATAACGACATTGGCGTAAGTGAAGCGACCCGCATTGACCCTAACGCCTGGGTCGAACGCT |
| | GGAAGGCGGCGGGCCATTACCAGGCCGAAGCAGCGTTGTTGCAGTGCACGGCAGATACACTTGCTG |
| | ATGCGGTGCTGATTACGACCGCTCACGCGTGGCAGCATCAGGGGAAAACCTTATTTATCAGCCGGAA |
| | AACCTACCGGATTGATGGTAGTGGTCAAATGGCGATTACCGTTGATGTTGAAGTGGCGAGCGATACA |
| | CCGCATCCGGCGCGGATTGGCCTGAACTGCCAGCTGGCGCAGGTAGCAGAGCGGGTAAACTGGCTC |
| | GGATTAGGGCCGCAAGAAAACTATCCCGACCGCCTTACTGCCGCCTGTTTTGACCGCTGGGATCTGCC |
| | ATTGTCAGACATGTATACCCCGTACGTCTTCCCGAGCGAAAACGGTCTGCGCTGCGGGACGCGCGAAT |
| | TGAATTATGGCCCACACCAGTGGCGCGGCGACTTCCAGTTCAACATCAGCCGCTACAGTCAACAGCAA |
| | CTGATGGAAACCAGCCATCGCCATCTGCTGCACGCGGAAGAAGGCACATGGCTGAATATCGACGGTT |
| | TCCATATGGGGATTGGTGGCGACGACTCCTGGAGCCCGTCAGTATCGGCGGAATTCCAGCTGAGCGC |
| | CGGTCGCTACCATTACCAGTTGGTCTGGTGTCAAAAAGCGGCCGCTCGAGGTCACCCATTCGAAGGTA |
| | AGCCTATCCCTAACCCTCTCCTCGGTCTCGATTCTACGCGTACCGGTCATCATCACCATCACCATTGAGT |
| | TTAAACCCGCTGATCAGCCTCGACTGTGCCTTCTAGTTGCCAGCCATCTGTTGTTTGCCCCTCCCCCGTG |
| | CCTTCCTTGACCCTGGAAGGTGCCACTCCCACTGTCCTTTCCTAATAAAATGAGGAAATTGCATCGCAT |
| | TGTCTGAGTAGGTGTCATTCTATTCTGGGGGGTGGGGTGGGGCAGGACAGCAAGGGGGAGGATTGG |
| | GAAGACAATAGCAGGCATGCTGGGGATGCGGTGGGCTCTATGGCTTCTGAGGCGGAAAGAACCAGC |
| | TGGGGCTCTAGGGGGTATCCCCACGCGCCCTGTAGCGGCGCATTAAGCGCGGCGGGTGTGGTGGTTA |
| | CGCGCAGCGTGACCGCTACACTTGCCAGCGCCCTAGCGCCCGCTCCTTTCGCTTTCTTCCCTTCCTTTCT |
| | CGCCACGTTCGCCGGCTTTCCCCGTCAAGCTCTAAATCGGGGGCTCCCTTTAGGGTTCCGATTTAGTGC |
| | TTTACGGCACCTCGACCCCAAAAAACTTGATTAGGGTGATGGTTCACGTAGTGGGCCATCGCCCTGAT |
| | AGACGGTTTTTCGCCCTTTGACGTTGGAGTCCACGTTCTTTAATAGTGGACTCTTGTTCCAAACTGGAA |
| | CAACACTCAACCCTATCTCGGTCTATTCTTTTGATTTATAAGGGATTTTGCCGATTTCGGCCTATTGTT |
| | AAAAAATGAGCTGATTTAACAAAAATTTAACGCGAATTAATTCTGTGGAATGTGTGTCAGTTAGGGTG |
| | TGGAAAGTCCCCAGGCTCCCCAGCAGGCAGAAGTATGCAAAGCATGCATCTCAATTAGTCAGCAACC |
| | AGGTGTGGAAAGTCCCCAGGCTCCCCAGCAGGCAGAAGTATGCAAAGCATGCATCTCAATTAGTCAG |
| | CAACCATAGTCCCGCCCCTAACTCCGCCCATCCCGCCCCTAACTCCGCCCAGTTCCGCCCATTCTCCGCC |
| | CCATGGCTGACTAATTTTTTTTATTTATGCAGAGGCCGAGGCCGCCTCTGCCTCTGAGCTATTCCAGAA |
| | GTAGTGAGGAGGCTTTTTTGGAGGCCTAGGCTTTTGCAAAAAGCTCCCGGGAGCTTGTATATCCATTT |
| | TCGGATCTGATCAGCACGTGTTGACAATTAATCATCGGCATAGTATATCGGCATAGTATAATACGACA |
| | AGGTGAGGAACTAAACCATGGCCAAGCCTTTGTCTCAAGAAGAATCCACCCTCATTGAAAGAGCAAC |
| | GGCTACAATCAACAGCATCCCCATCTCTGAAGACTACAGCGTCGCCAGCGCAGCTCTCTCTAGCGACG |
| | GCCGCATCTTCACTGGTGTCAATGTATATCATTTTACTGGGGGACCTTGTGCAGAACTCGTGGTGCTG |
| | GGCACTGCTGCTGCTGCGGCAGCTGGCAACCTGACTTGTATCGTCGCGATCGGAAATGAGAACAGGG |
| | GCATCTTGAGCCCCTGCGGACGGTGCCGACAGGTGCTTCTCGATCTGCATCCTGGGATCAAAGCCATA |
| | GTGAAGGACAGTGATGGACAGCCGACGGCAGTTGGGATTCGTGAATTGCTGCCCTCTGGTTATGTGT |
| | GGGAGGGCTAAGCACTTCGTGGCCGAGGAGCAGGACTGACACGTGCTACGAGATTTCGATTCCACCG |
| | CCGCCTTCTATGAAAGGTTGGGCTTCGGAATCGTTTTCCGGGACGCCGGCTGGATGATCCTCCAGCGC |
| | GGGGATCTCATGCTGGAGTTCTTCGCCCACCCCAACTTGTTTATTGCAGCTTATAATGGTTACAAATAA |
| | AGCAATAGCATCACAAATTTCACAAATAAAGCATTTTTTCACTGCATTCTAGTTGTGGTTTGTCCAAAC |
| | TCATCAATGTATCTTATCATGTCTGTATACCGTCGACCTCTAGCTAGAGCTTGGCGTAATCATGGTCAT |
| | AGCTGTTTCCTGTGTGAAATTGTTATCCGCTCACAATTCCACACAACATACGAGCCGGAAGCATAAAGT |
| | GTAAAGCCTGGGGTGCCTAATGAGTGAGCTAACTCACATTAATTGCGTTGCGCTCACTGCCCGCTTTC |
| | CAGTCGGGAAACCTGTCGTGCCAGCTGCATTAATGAATCGGCCAACGCGCGGGGAGAGGCGGTTTGC |
| | GTATTGGGCGCTCTTCCGCTTCCTCGCTCACTGACTCGCTGCGCTCGGTCGTTCGGCTGCGGCGAGCG |
| | GTATCAGCTCACTCAAAGGCGGTAATACGGTTATCCACAGAATCAGGGGATAACGCAGGAAAGAACA |
| | TGTGAGCAAAAGGCCAGCAAAAGGCCAGGAACCGTAAAAAGGCCGCGTTGCTGGCGTTTTTCCATAG |
| | GCTCCGCCCCCCTGACGAGCATCACAAAAATCGACGCTCAAGTCAGAGGTGGCGAAACCCGACAGGA |
| | CTATAAAGATACCAGGCGTTTCCCCCTGGAAGCTCCCTCGTGCGCTCTCCTGTTCCGACCCTGCCGCTT |
| | ACCGGATACCTGTCCGCCTTTCTCCCTTCGGGAAGCGTGGCGCTTTCTCATAGCTCACGCTGTAGGTAT |
| | CTCAGTTCGGTGTAGGTCGTTCGCTCCAAGCTGGGCTGTGTGCACGAACCCCCCGTTCAGCCCGACCG |
| | CTGCGCCTTATCCGGTAACTATCGTCTTGAGTCCAACCCGGTAAGACACGACTTATCGCCACTGGCAGC |
| | AGCCACTGGTAACAGGATTAGCAGAGCGAGGTATGTAGGCGGTGCTACAGAGTTCTTGAAGTGGTG |
| | GCCTAACTACGGCTACACTAGAAGAACAGTATTTGGTATCTGCGCTCTGCTGAAGCCAGTTACCTTCG |
| | GAAAAAGAGTTGGTAGCTCTTGATCCGGCAAACAAACCACCGCTGGTAGCGGTGGTTTTTTTGTTTGC |
| | AAGCAGCAGATTACGCGCAGAAAAAAAGGATCTCAAGAAGATCCTTTGATCTTTTCTACGGGGTCTGA |
| | CGCTCAGTGGAACGAAAACTCACGTTAAGGGATTTTGGTCATGAGATTATCAAAAAGGATCTTCACCT |
| | AGATCCTTTTAAATTAAAAATGAAGTTTTAAATCAATCTAAAGTATATATGAGTAAACTTGGTCTGACA |
| | GTTACCAATGCTTAATCAGTGAGGCACCTATCTCAGCGATCTGTCTATTTCGTTCATCCATAGTTGCCTG |
| | ACTCCCCGTCGTGTAGATAACTACGATACGGGAGGGCTTACCATCTGGCCCCAGTGCTGCAATGATAC |
| | CGCGAGACCCACGCTCACCGGCTCCAGATTTATCAGCAATAAACCAGCCAGCCGGAAGGGCCGAGCG |
| | CAGAAGTGGTCCTGCAACTTTATCCGCCTCCATCCAGTCTATTAATTGTTGCCGGGAAGCTAGAGTAA |
| | GTAGTTCGCCAGTTAATAGTTTGCGCAACGTTGTTGCCATTGCTACAGGCATCGTGGTGTCACGCTCGT |
| | CGTTTGGTATGGCTTCATTCAGCTCCGGTTCCCAACGATCAAGGCGAGTTACATGATCCCCCATGTTGT |
| | GCAAAAAAGCGGTTAGCTCCTTCGGTCCTCCGATCGTTGTCAGAAGTAAGTTGGCCGCAGTGTTATCA |
| | CTCATGGTTATGGCAGCACTGCATAATTCTCTTACTGTCATGCCATCCGTAAGATGCTTTTCTGTGACTG |
| | GTGAGTACTCAACCAAGTCATTCTGAGAATAGTGTATGCGGCGACCGAGTTGCTCTTGCCCGGCGTCA |
| | ATACGGGATAATACCGCGCCACATAGCAGAACTTTAAAAGTGCTCATCATTGGAAAACGTTCTTCGGG |
| | GCGAAAACTCTCAAGGATCTTACCGCTGTTGAGATCCAGTTCGATGTAACCCACTCGTGCACCCAACT |
| | GATCTTCAGCATCTTTTACTTTCACCAGCGTTTCTGGGTGAGCAAAAACAGGAAGGCAAAATGCCGCA |
| | AAAAAGGGAATAAGGGCGACACGGAAATGTTGAATACTCATACTCTTCCTTTTTCAATATTATTGAAG |
| | CATTTATCAGGGTTATTGTCTCATGAGCGGATACATATTTGAATGTATTTAGAAAAATAAACAAATAGG |
| | GGTTCCGCGCACATTTCCCCGAAAAGTGCCACCTGACGTC (53) |

TABLE 3-continued

Constructs and other sequences.

| Name | Sequence (SEQ ID NO) |
|---|---|
| pGL4.10-CMV-MP-EPO | GGCCTAACTGGCCGGTACCGTCGACGATATCGGATCCAGGTCTATATAAGCAGAGCTCGTTTAGTGAA<br>CCGTCAGATCGCCTAGATACGCCATCCACGCTGTTTTGACCTCCATAGAAGATCGCCACCATGGGGGT<br>GCACGAATGTCCTGCCTGGCTGTGGCTTCTCCTGTCCCTGCTGTCGCTCCCTCTGGGCCTCCCAGTCCT<br>GGGCGCCCCACCACGCCTCATCTGTGACAGCCGAGTCCTGGAGAGGTACCTCTTGGAGGCCAAGGAG<br>GCCGAGAATATCACGACGGGCTGTGCTGAACACTGCAGCTTGAATGAGAATATCACTGTCCCAGACA<br>CCAAAGTTAATTTCTATGCCTGGAAGAGGATGGAGGTCGGGCAGCAGGCCGTAGAAGTCTGGCAGG<br>GCCTGGCCCTGCTGTCGGAAGCTGTCCTGCGGGGCCAGGCCCTGTTGGTCAACTCTTCCCAGCCGTGG<br>GAGCCCCTGCAGCTGCATGTGGATAAAGCCGTCAGTGGCCTTCGCAGCCTCACCACTCTGCTTCGGGC<br>TCTGGGAGCCCAGAAGGAAGCCATCTCCCCTCCAGATGCGGCCTCAGCTGCTCCACTCCGAACAATCA<br>CTGCTGACACTTTCCGCAAACTCTTCCGAGTCTACTCCAATTTCCTCCGGGGAAAGCTGAAGCTGTACA<br>CAGGGGAGGCCTGCAGGACAGGGGACAGATGATCTAGAGTCGGGGCGGCCGGCCGCTTCGAGCAG<br>ACATGATAAGATACATTGATGAGTTTGGACAAACCACAACTAGAATGCAGTGAAAAAAATGCTTTATT<br>TGTGAAATTTGTGATGCTATTGCTTTATTTGTAACCATTATAAGCTGCAATAAACAAGTTAACAACAAC<br>AATTGCATTCATTTTATGTTTCAGGTTCAGGGGGAGGTGTGGGAGGTTTTTTAAAGCAAGTAAAACCT<br>CTACAAATGTGGTAAAATCGATAAGGATCCGTCGACCGATGCCCTTGAGAGCCTTCAACCCAGTCAGC<br>TCCTTCCGGTGGGCGCGGGGCATGACTATCGTCGCCGCACTTATGACTGTCTTCTTTATCATGCAACTC<br>GTAGGACAGGTGCCGGCAGCGCTCTTCCGCTTCCTCGCTCACTGACTCGCTGCGCTCGGTCGTTCGGC<br>TGCGGCGAGCGGTATCAGCTCACTCAAAGGCGGTAATACGGTTATCCACAGAATCAGGGGATAACGC<br>AGGAAAGAACATGTGAGCAAAAGGCCAGCAAAAGGCCAGGAACCGTAAAAAGGCCGCGTTGCTGGC<br>GTTTTTCCATAGGCTCCGCCCCCCTGACGAGCATCACAAAAATCGACGCTCAAGTCAGAGGTGGCGAA<br>ACCCGACAGGACTATAAAGATACCAGGCGTTTCCCCCTGGAAGCTCCCTCGTGCGCTCTCCTGTTCCGA<br>CCCTGCCGCTTACCGGATACCTGTCCGCCTTTCTCCCTTCGGGAAGCGTGGCGCTTTCTCATAGCTCAC<br>GCTGTAGGTATCTCAGTTCGGTGTAGGTCGTTCGCTCCAAGCTGGGCTGTGTGCACGAACCCCCCGTT<br>CAGCCCGACCGCTGCGCCTTATCCGGTAACTATCGTCTTGAGTCCAACCCGGTAAGACACGACTTATC<br>GCCACTGGCAGCAGCCACTGGTAACAGGATTAGCAGAGCGAGGTATGTAGGCGGTGCTACAGAGTTC<br>TTGAAGTGGTGGCCTAACTACGGCTACACTAGAAGAACAGTATTTGGTATCTGCGCTCTGCTGAAGCC<br>AGTTACCTTCGGAAAAAGAGTTGGTAGCTCTTGATCCGGCAAACAAACCACCGCTGGTAGCGGTGGTT<br>TTTTTGTTTGCAAGCAGCAGATTACGCGCAGAAAAAAAGGATCTCAAGAAGATCCTTTGATCTTTTCTA<br>CGGGGTCTGACGCTCAGTGGAACGAAAACTCACGTTAAGGGATTTTGGTCATGAGATTATCAAAAAG<br>GATCTTCACCTAGATCCTTTTAAATTAAAAATGAAGTTTTAAATCAATCTAAAGTATATATGAGTAAACT<br>TGGTCTGACAGCGGCCGCAAATGCTAAACCACTGCAGTGGTTACCAGTGCTTGATCAGTGAGGCACC<br>GATCTCAGCGATCTGCCTATTTCGTTCGTCCATAGTGGCCTGACTCCCCGTCGTGTAGATCACTACGAT<br>TCGTGAGGGCTTACCATCAGGCCCCAGCGCAGCAATGATGCCGCGAGAGCCGCGTTCACCGGCCCC<br>GATTTGTCAGCAATGAACCAGCCAGCAGGGAGGGCCGAGCGAAGAAGTGGTCCTGCTACTTTGTCCG<br>CCTCCATCCAGTCTATGAGCTGCTGTCGTGATGCTAGAGTAAGAAGTTCGCCAGTGAGTAGTTTCCGA<br>AGAGTTGTGGCCATTGCTACTGGCATCGTGGTATCACGCTCGTCGTTCGGTATGGCTTCGTTCAACTCT<br>GGTTCCCAGCGGTCAAGCCGGGTCACATGATCACCCATATTATGAAGAAATGCAGTCAGCTCCTTAGG<br>GCCTCCGATCGTTGTCAGAAGTAAGTTGGCCGCGGTGTTGTCGCTCATGGTAATGGCAGCACTACACA<br>ATTCTCTTACCGTCATGCCATCCGTAAGATGCTTTTCCGTGACCGGCGAGTACTCAACCAAGTCGTTTT<br>GTGAGTAGTGTATACGGCGACCAAGCTGCTCTTGCCCGGCGTCTATACGGGACAACACCGCGCCACAT<br>AGCAGTACTTTGAAAGTGCTCATCATCGGGAATCGTTCTTCGGGGCGGAAAGACTCAAGGATCTTGCC<br>GCTATTGAGATCCAGTTCGATATAGCCCACTCTTGCACCCAGTTGATCTTCAGCATCTTTTACTTTCACC<br>AGCGTTTCGGGGTGTGCAAAAACAGGCAAGCAAATGCCGCAAAGAAGGGAATGAGTGCGACACGA<br>AAATGTTGGATGCTCATACTCGTCCTTTTTCAATATTATTGAAGCATTTATCAGGGTTACTAGTACGTCT<br>CTCAAGGATAAGTAAGTAATATTAAGGTACGGGAGGTATTGGACAGGCCGCAATAAAATATCTTTATT<br>TTCATTACATCTGTGTGTTGGTTTTTTGTGTGAATCGATAGTACTAACATACGCTCTCCATCAAAACAAA<br>ACGAAACAAAACAAACTAGCAAAATAGGCTGTCCCCAGTGCAAGTGCAGGTGCCAGAACATTTCTCT<br>(54) |

What is claimed is:

1. A vector comprising an expression cassette, the expression cassette comprising a synthetic liver-specific inducible promoter operably linked to a gene, the synthetic liver-specific inducible promoter comprising the at least one cis-regulatory module (CRM) comprising or consisting of a sequence selected from the group consisting of: SEQ ID NO: 42, SEQ ID NO: 43, SEQ ID NO: 44, SEQ ID NO: 45, SEQ ID NO: 46, and SEQ ID NO: 47.

2. The vector of claim 1, comprising a plurality of cis-regulatory element (CREs) that are each capable of being bound and activated by a heterodimer of CAR and RXR or a CRE that is capable of being bound and activated by a heterodimer of CAR and RXR operably linked to a minimal promoter or proximal promoter.

3. The vector of claim 2, comprising 2 or 3 CREs that are each capable of being bound and activated by a heterodimer of CAR and RXR.

4. The vector of claim 2 wherein the minimal promoter is HSV thymidine kinase minimal promoter (MinTK), CMV minimal promoter (CMVmp) or SV40 minimal promoter (SV40mp).

5. The vector of claim 1, which comprises a sequence according any one of SEQ ID NOs: 10-18 and 59, 67 and 71.

6. The vector of claim 5, which comprises a sequence SEQ ID NO: 10, SEQ ID NO: 11, SEQ ID NO: 12, SEQ ID NO: 68, SEQ ID NO: 69, SEQ ID NO: 70 or SEQ ID NO: 71.

7. The vector of claim 1, wherein the synthetic liver-specific expression cassette comprises sequences providing or coding for one or more of, and preferably all of, a ribosomal binding site, a start codon, a stop codon, a transcription termination sequence, a nucleic acid encoding a posttranscriptional regulatory element and/or a polyA element.

8. The vector of claim 1, wherein the gene encodes any one of:
- a protein or RNA,
- a therapeutic expression product,
- a therapeutic protein suitable for use in treating a disease or condition associated with aberrant gene expression in the liver,
- a site-specific nuclease, such as a meganuclease, zinc finger nuclease (ZFN), transcription activator-like effector-based nuclease (TALEN), or the clustered regularly interspaced short palindromic repeats system (CRISPR-Cas.

9. The vector of claim 1, which is a plasmid or a viral vector.

10. The vector of claim 1, wherein the gene encodes a therapeutic expression product.

11. The vector of claim 1, formulated as a pharmaceutical composition and comprising a pharmaceutically acceptable carrier.

12. The vector according to claim 1 present in a cell.

13. The vector of claim 12 which is a liver cell.

* * * * *

SEQUENCE LISTING

<160> NUMBER OF SEQ ID NOS: 91

<210> SEQ ID NO 1
<211> LENGTH: 51
<212> TYPE: DNA
<213> ORGANISM: Mus musculus

<400> SEQUENCE: 1
tctgtacttt cctgaccttg gcacagtgcc accatcaact tgcctgacac c        51

<210> SEQ ID NO 2
<211> LENGTH: 51
<212> TYPE: DNA
<213> ORGANISM: Homo sapiens

<400> SEQUENCE: 2
actgtacttt cctgaccctg aagaggtggc agcatggact ttcctgaacc a        51

<210> SEQ ID NO 3
<211> LENGTH: 16
<212> TYPE: DNA
<213> ORGANISM: Mus musculus

<400> SEQUENCE: 3
tgtactttcc tgacct                                                    16

<210> SEQ ID NO 4
<211> LENGTH: 16
<212> TYPE: DNA
<213> ORGANISM: Homo sapiens

<400> SEQUENCE: 4
tgtactttcc tgaccc                                                    16

<210> SEQ ID NO 5
<211> LENGTH: 84
<212> TYPE: DNA
<213> ORGANISM: Artificial Sequence
<220> FEATURE:
<223> OTHER INFORMATION: 3x NR1 sequence (mouse)

<400> SEQUENCE: 5
gatctctgta ctttcctgac cttggatcga tctctgtact ttcctgacct tggatcgatc    60
tctgtacttt cctgaccttg gatc                                           84

<210> SEQ ID NO 6
<211> LENGTH: 84
<212> TYPE: DNA
<213> ORGANISM: Artificial Sequence
<220> FEATURE:
<223> OTHER INFORMATION: 3x NR1 sequence (human)

<400> SEQUENCE: 6
gatcactgta ctttcctgac cctggatcga tcactgtact ttcctgaccc tggatcgatc    60
actgtacttt cctgaccctg gatc                                           84

<210> SEQ ID NO 7
<211> LENGTH: 262
<212> TYPE: DNA
<213> ORGANISM: Artificial Sequence
<220> FEATURE:
<223> OTHER INFORMATION: PB1-MinTK

<400> SEQUENCE: 7
tctgtacttt cctgaccttg gcacagtgcc accatcaact tgcctgacac cgatccggcc    60
ccgcccagcg tcttgtcatt ggcgaattcg aacacgcaga tgcagtcggg gcggcgcggt   120
ccgaggtcca cttcgcatat taaggtgacg cgtgtggcct cgaacaccga gcgaccctgc   180
agcgacccgc ttaacagcgt caacagcgtg ccgcagatct cgaggagctt ggcgagattt   240
tcaggagcta aggaagctaa ac                                            262

<210> SEQ ID NO 8
<211> LENGTH: 180
<212> TYPE: DNA
<213> ORGANISM: Artificial Sequence
<220> FEATURE:
<223> OTHER INFORMATION: PB1-CMV-MP

<400> SEQUENCE: 8

```
tctgtacttt cctgaccttg gcacagtgcc accatcaact tgcctgacac cgctgggagt      60
tcgtagacgg agcgattaat ccatatgcag gtctatataa gcagagctcg tttagtgaac     120
cgtcagatcg cctagatacg ccatccacgc tgttttgacc tccatagaag atcgccaccc     180
```

<210> SEQ ID NO 9
<211> LENGTH: 330
<212> TYPE: DNA
<213> ORGANISM: Artificial Sequence
<220> FEATURE:
<223> OTHER INFORMATION: PB1-SV40-MP

<400> SEQUENCE: 9

```
tctgtacttt cctgaccttg gcacagtgcc accatcaact tgcctgacac cgctgggagt      60
tcgtagacgg actagcccgg gctcgagatc tgcgatctgc atctcaatta gtcagcaacc     120
atagtcccgc ccctaactcc gcccatcccg cccctaactc cgcccagttc cgcccattct     180 ccgcccatc gctgactaat ttttttatt tatgcagagg ccgaggccgc ctcggcctct       240
gagctattcc agaagtagtg aggaggcttt tttggaggcc taggcttttg caaaaagctt     300
ggcattccgg tactgttggt aaagccaccc                                      330
```

<210> SEQ ID NO 10
<211> LENGTH: 353
<212> TYPE: DNA
<213> ORGANISM: Artificial Sequence
<220> FEATURE:
<223> OTHER INFORMATION: PB1-1-MinTk (2xPBREM)

<400> SEQUENCE: 10

```
tctgtacttt cctgaccttg gcacagtgcc accatcaact tgcctgacac ccattactcg      60
catccattct ctctgtactt tcctgacctt ggcacagtgc caccatcaac ttgcctgaca     120
ccgctgggag ttcgtagacg gagatccggc cccgcccagc gtcttgtcat tggcgaattc     180
gaacacgcag atgcagtcgg ggcggcgcgg tccgaggtcc acttcgcata ttaaggtgac     240
gcgtgtggcc tcgaacaccg agcgaccctg cagcgacccg cttaacagcg tcaacagcgt     300
gccgcagatc tcgaggagct tggcgagatt tcaggagct aaggaagcta aac             353
```

<210> SEQ ID NO 11
<211> LENGTH: 424
<212> TYPE: DNA
<213> ORGANISM: Artificial Sequence
<220> FEATURE:
<223> OTHER INFORMATION: PB1-2-MinTk (3xPBREM)

<400> SEQUENCE: 11

```
tctgtacttt cctgaccttg gcacagtgcc accatcaact tgcctgacac ccattactcg      60
catccattct ctctgtactt tcctgacctt ggcacagtgc caccatcaac ttgcctgaca     120
ccgcactgaa ggtcctcaat cgtctgtact tcctgacct tggcacagtg ccaccatcaa     180
cttgcctgac accgctggga gttcgtagac ggagatccgg ccccgcccag cgtcttgtca     240
ttggcgaatt cgaacacgca gatgcagtcg gggcggcgcg gtccgaggtc cacttcgcat     300
attaaggtga cgcgtgtggc ctcgaacacc gagcgaccct gcagcgaccc gcttaacagc     360
gtcaacagcg tgccgcagat ctcgaggagc ttggcgagat tttcaggagc taaggaagct     420
aaac                                                                  424
```

<210> SEQ ID NO 12
<211> LENGTH: 495

<212> TYPE: DNA
<213> ORGANISM: Artificial Sequence
<220> FEATURE:
<223> OTHER INFORMATION: PB1-3-MinTk

<400> SEQUENCE: 12

```
tctgtacttt cctgaccttg gcacagtgcc accatcaact tgcctgacac ccattactcg     60
catccattct ctctgtactt tcctgacctt ggcacagtgc caccatcaac ttgcctgaca    120
ccgcactgaa ggtcctcaat cgtctgtact ttcctgacct tggcacagtg ccaccatcaa    180
cttgcctgac accctgacct cctgccagca atatctgtac tttcctgacc ttggcacagt    240
gccaccatca acttgcctga caccgctggg agttcgtaga cggagatccg gccccgccca    300
gcgtcttgtc attggcgaat cgaacacgc agatgcagtc ggggcggcgc ggtccgaggt     360
ccacttcgca tattaaggtg acgcgtgtgg cctcgaacac cgagcgaccc tgcagcgacc    420
cgcttaacag cgtcaacagc gtgccgcaga tctcgaggag cttggcgaga ttttcaggag    480
ctaaggaagc taaac                                                     495
```

<210> SEQ ID NO 13
<211> LENGTH: 401
<212> TYPE: DNA
<213> ORGANISM: Artificial Sequence
<220> FEATURE:
<223> OTHER INFORMATION: PB1-1-SV40

<400> SEQUENCE: 13

```
tctgtacttt cctgaccttg gcacagtgcc accatcaact tgcctgacac ccattactcg     60
catccattct ctctgtactt tcctgacctt ggcacagtgc caccatcaac ttgcctgaca    120
ccgctgggag ttcgtagacg gactagcccg ggctcgagat ctgcgatctg catctcaatt    180
agtcagcaac catagtcccg ccctaactcc gcccatccc gccctaactc cgcccagtt     240
ccgcccattc tccgcccat cgctgactaa tttttttat ttatgcagag gccgaggccg      300
cctcggcctc tgagctattc cagaagtagt gaggaggctt ttttggaggc ctaggctttt    360
gcaaaaagct tggcattccg gtactgttgg taaagccacc c                        401
```

<210> SEQ ID NO 14
<211> LENGTH: 472
<212> TYPE: DNA
<213> ORGANISM: Artificial Sequence
<220> FEATURE:
<223> OTHER INFORMATION: PB1-2-SV40

<400> SEQUENCE: 14

```
tctgtacttt cctgaccttg gcacagtgcc accatcaact tgcctgacac ccattactcg     60
catccattct ctctgtactt tcctgacctt ggcacagtgc caccatcaac ttgcctgaca    120
ccgcactgaa ggtcctcaat cgtctgtact ttcctgacct tggcacagtg ccaccatcaa    180
cttgcctgac accgctggga gttcgtagac ggactagccc gggctcgaga tctgcgatct    240
gcatctcaat tagtcagcaa ccatagtccc gccctaact ccgcccatcc cgccctaac     300
tccgcccagt tccgcccatt ctccgcccca tcgctgacta attttttta tttatgcaga    360
ggccgaggcc gcctcggcct ctgagctatt ccagaagtag tgaggaggct ttttggagg    420
cctaggcttt tgcaaaaagc ttggcattcc ggtactgttg gtaaagccac cc            472
```

<210> SEQ ID NO 15
<211> LENGTH: 543
<212> TYPE: DNA

<213> ORGANISM: Artificial Sequence
<220> FEATURE:
<223> OTHER INFORMATION: PB1-3-SV40

<400> SEQUENCE: 15

```
tctgtacttt cctgaccttg gcacagtgcc accatcaact tgcctgacac ccattactcg    60
catccattct ctctgtactt tcctgacctt ggcacagtgc caccatcaac ttgcctgaca   120
ccgcactgaa ggtcctcaat cgtctgtact ttcctgacct tggcacagtg ccaccatcaa   180
cttgcctgac accctgacct cctgccagca atatctgtac tttcctgacc ttggcacagt   240
gccaccatca acttgcctga caccgctggg agttcgtaga cggactagcc cgggctcgag   300
atctgcgatc tgcatctcaa ttagtcagca accatagtcc cgcccctaac tccgcccatc   360
ccgcccctaa ctccgcccag ttccgcccat tctccgcccc atcgctgact aattttttt   420
atttatgcag aggccgaggc cgcctcggcc tctgagctat tccagaagta gtgaggaggc   480
ttttttggag gcctaggctt ttgcaaaaag cttggcattc cggtactgtt ggtaaagcca   540
ccc                                                                 543
```

<210> SEQ ID NO 16
<211> LENGTH: 251
<212> TYPE: DNA
<213> ORGANISM: Artificial Sequence
<220> FEATURE:
<223> OTHER INFORMATION: PB1-1-CMV

<400> SEQUENCE: 16

```
tctgtacttt cctgaccttg gcacagtgcc accatcaact tgcctgacac ccattactcg    60
catccattct ctctgtactt tcctgacctt ggcacagtgc caccatcaac ttgcctgaca   120
ccgctgggag ttcgtagacg gagcgattaa tccatatgca ggtctatata agcagagctc   180
gtttagtgaa ccgtcagatc gcctagatac gccatccacg ctgttttgac ctccatagaa   240
gatcgccacc c                                                        251
```

<210> SEQ ID NO 17
<211> LENGTH: 322
<212> TYPE: DNA
<213> ORGANISM: Artificial Sequence
<220> FEATURE:
<223> OTHER INFORMATION: PB1-2-CMV

<400> SEQUENCE: 17

```
tctgtacttt cctgaccttg gcacagtgcc accatcaact tgcctgacac ccattactcg    60
catccattct ctctgtactt tcctgacctt ggcacagtgc caccatcaac ttgcctgaca   120
ccgcactgaa ggtcctcaat cgtctgtact ttcctgacct tggcacagtg ccaccatcaa   180
cttgcctgac accgctggga gttcgtagac ggagcgatta atccatatgc aggtctatat   240
aagcagagct cgtttagtga accgtcagat cgcctagata cgccatccac gctgttttga   300
cctccataga agatcgccac cc                                            322
```

<210> SEQ ID NO 18
<211> LENGTH: 393
<212> TYPE: DNA
<213> ORGANISM: Artificial Sequence
<220> FEATURE:
<223> OTHER INFORMATION: PB1-3-CMV

<400> SEQUENCE: 18

```
tctgtacttt cctgaccttg gcacagtgcc accatcaact tgcctgacac ccattactcg    60
```

| | | |
|---|---|---|
| catccattct ctctgtactt tcctgacctt ggcacagtgc caccatcaac ttgcctgaca | 120 |
| ccgcactgaa ggtcctcaat cgtctgtact ttcctgacct tggcacagtg ccaccatcaa | 180 |
| cttgcctgac accctgacct cctgccagca atatctgtac tttcctgacc ttggcacagt | 240 |
| gccaccatca acttgcctga caccgctggg agttcgtaga cggagcgatt aatccatatg | 300 |
| caggtctata taagcagagc tcgtttagtg aaccgtcaga tcgcctagat acgccatcca | 360 |
| cgctgttttg acctccatag aagatcgcca ccc | 393 |

<210> SEQ ID NO 19
<211> LENGTH: 1023
<212> TYPE: DNA
<213> ORGANISM: Artificial Sequence
<220> FEATURE:
<223> OTHER INFORMATION: PB1-MinTK and EPO

<400> SEQUENCE: 19

| | | |
|---|---|---|
| ggcctaactg gccggtactc tgtactttcc tgaccttggc acagtgccac catcaacttg | 60 |
| cctgacaccg atccggcccc gcccagcgtc ttgtcattgg cgaattcgaa cacgcagatg | 120 |
| cagtcggggc ggcgcggtcc gaggtccact tcgcatatta aggtgacgcg tgtggcctcg | 180 |
| aacaccgagc gaccctgcag cgacccgctt aacagcgtca acagcgtgcc gcagatctcg | 240 |
| aggagcttgg cgagattttc aggagctaag gaagctaaac atgggggtgc acgaatgtcc | 300 |
| tgcctggctg tggcttctcc tgtccctgct gtcgctccct ctgggcctcc cagtcctggg | 360 |
| cgccccacca cgcctcatct gtgacagccg agtcctggag aggtacctct tggaggccaa | 420 |
| ggaggccgag aatatcacga cgggctgtgc tgaacactgc agcttgaatg agaatatcac | 480 |
| tgtcccagac accaaagtta atttctatgc ctggaagagg atggaggtcg ggcagcaggc | 540 |
| cgtagaagtc tggcagggcc tggccctgct gtcggaagct gtcctgcggg gccaggccct | 600 |
| gttggtcaac tcttcccagc cgtgggagcc cctgcagctg catgtggata agccgtcag | 660 |
| tggccttcgc agcctcacca ctctgcttcg ggctctggga gcccagaagg aagccatctc | 720 |
| ccctccagat gcggcctcag ctgctccact ccgaacaatc actgctgaca ctttccgcaa | 780 |
| actcttccga gtctactcca atttcctccg gggaaagctg aagctgtaca caggggaggc | 840 |
| ctgcaggaca ggggacagat gatctagagt cggggcggcc ggccgcttcg agcagacatg | 900 |
| ataagataca ttgatgagtt tggacaaacc acaactagaa tgcagtgaaa aaaatgcttt | 960 |
| atttgtgaaa tttgtgatgc tattgcttta tttgtaacca ttataagctg caataaacaa | 1020 |
| gtt | 1023 |

<210> SEQ ID NO 20
<211> LENGTH: 16
<212> TYPE: DNA
<213> ORGANISM: Artificial Sequence
<220> FEATURE:
<223> OTHER INFORMATION: NR1 motif from PBREM
<220> FEATURE:
<221> NAME/KEY: misc_feature
<222> LOCATION: (16)..(16)
<223> OTHER INFORMATION: n is a, c, g, or t

<400> SEQUENCE: 20

| | |
|---|---|
| tgtactttcc tgaccn | 16 |

<210> SEQ ID NO 21
<211> LENGTH: 17
<212> TYPE: DNA

```
<213> ORGANISM: Artificial Sequence
<220> FEATURE:
<223> OTHER INFORMATION: sequence preferably comprised in a functional
      variant of a PBREM element
<220> FEATURE:
<221> NAME/KEY: misc_feature
<222> LOCATION: (17)..(17)
<223> OTHER INFORMATION: n is a, c, g, or t

<400> SEQUENCE: 21
ctgtactttc ctgaccn                                                   17

<210> SEQ ID NO 22
<211> LENGTH: 17
<212> TYPE: DNA
<213> ORGANISM: Artificial Sequence
<220> FEATURE:
<223> OTHER INFORMATION: sequence preferably comprised in a functional
      variant of a PBREM element

<400> SEQUENCE: 22
ctgtactttc ctgaccy                                                   17

<210> SEQ ID NO 23
<211> LENGTH: 17
<212> TYPE: DNA
<213> ORGANISM: Artificial Sequence
<220> FEATURE:
<223> OTHER INFORMATION: sequence preferably comprised in a functional
      variant of a PBREM element

<400> SEQUENCE: 23
ctgtactttc ctgacct                                                   17

<210> SEQ ID NO 24
<211> LENGTH: 17
<212> TYPE: DNA
<213> ORGANISM: Artificial Sequence
<220> FEATURE:
<223> OTHER INFORMATION: sequence preferably comprised in a functional
      variant of a PBREM element

<400> SEQUENCE: 24
ctgtactttc ctgaccc                                                   17

<210> SEQ ID NO 25
<211> LENGTH: 20
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t

<400> SEQUENCE: 25
nctgtacttt cctgaccntg                                                20

<210> SEQ ID NO 26
<211> LENGTH: 20
<212> TYPE: DNA
<213> ORGANISM: Artificial Sequence
<220> FEATURE:
```

```
<223> OTHER INFORMATION: sequence suitably comprised in a functional
      variant of a PBREM sequence

<400> SEQUENCE: 26
wctgtacttt cctgaccytg                                               20

<210> SEQ ID NO 27
<211> LENGTH: 20
<212> TYPE: DNA
<213> ORGANISM: Artificial Sequence
<220> FEATURE:
<223> OTHER INFORMATION: sequence suitably comprised in a functional
      variant of a PBREM sequence

<400> SEQUENCE: 27
tctgtacttt cctgaccttg                                               20

<210> SEQ ID NO 28
<211> LENGTH: 20
<212> TYPE: DNA
<213> ORGANISM: Artificial Sequence
<220> FEATURE:
<223> OTHER INFORMATION: sequence suitably comprised in a functional
      variant of a PBREM sequence

<400> SEQUENCE: 28
actgtacttt cctgaccctg                                               20

<210> SEQ ID NO 29
<211> LENGTH: 16
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (16)..(16)
<223> OTHER INFORMATION: optional spacer
<220> FEATURE:
<221> NAME/KEY: misc_feature
<222> LOCATION: (16)..(16)
<223> OTHER INFORMATION: n is a, c, g, or t

<400> SEQUENCE: 29
tgtactttcc tgaccn                                                   16

<210> SEQ ID NO 30
<211> LENGTH: 17
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (17)..(17)
<223> OTHER INFORMATION: optional spacer
<220> FEATURE:
<221> NAME/KEY: misc_feature
<222> LOCATION: (17)..(17)
<223> OTHER INFORMATION: n is a, c, g, or t

<400> SEQUENCE: 30
ctgtactttc ctgaccn                                                  17

<210> SEQ ID NO 31
<211> LENGTH: 20
<212> TYPE: DNA
```

```
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (20)..(20)
<223> OTHER INFORMATION: optional spacer

<400> SEQUENCE: 31
nctgtacttt cctgaccntg                                              20

<210> SEQ ID NO 32
<211> LENGTH: 32
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (16)..(17)
<223> OTHER INFORMATION: optional spacer
<220> FEATURE:
<221> NAME/KEY: misc_feature
<222> LOCATION: (16)..(16)
<223> OTHER INFORMATION: n is a, c, g, or t
<220> FEATURE:
<221> NAME/KEY: misc_feature
<222> LOCATION: (32)..(32)
<223> OTHER INFORMATION: n is a, c, g, or t

<400> SEQUENCE: 32
tgtactttcc tgaccntgta ctttcctgac cn                                32

<210> SEQ ID NO 33
<211> LENGTH: 48
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (16)..(17)
<223> OTHER INFORMATION: optional spacer
<220> FEATURE:
<221> NAME/KEY: misc_feature
<222> LOCATION: (16)..(16)
<223> OTHER INFORMATION: n is a, c, g, or t
<220> FEATURE:
<221> NAME/KEY: misc_feature
<222> LOCATION: (32)..(32)
<223> OTHER INFORMATION: n is a, c, g, or t
<220> FEATURE:
<221> NAME/KEY: misc_feature
<222> LOCATION: (32)..(33)
<223> OTHER INFORMATION: optional spacer
<220> FEATURE:
<221> NAME/KEY: misc_feature
<222> LOCATION: (48)..(48)
<223> OTHER INFORMATION: n is a, c, g, or t

<400> SEQUENCE: 33
tgtactttcc tgaccntgta ctttcctgac cntgtacttt cctgaccn               48
```

```
<210> SEQ ID NO 34
<211> LENGTH: 34
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (17)..(18)
<223> OTHER INFORMATION: optional spacer
<220> FEATURE:
<221> NAME/KEY: misc_feature
<222> LOCATION: (17)..(17)
<223> OTHER INFORMATION: n is a, c, g, or t
<220> FEATURE:
<221> NAME/KEY: misc_feature
<222> LOCATION: (34)..(34)
<223> OTHER INFORMATION: n is a, c, g, or t

<400> SEQUENCE: 34
ctgtactttc ctgaccnctg tactttcctg accn                                    34

<210> SEQ ID NO 35
<211> LENGTH: 51
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (17)..(18)
<223> OTHER INFORMATION: optional spacer
<220> FEATURE:
<221> NAME/KEY: misc_feature
<222> LOCATION: (17)..(17)
<223> OTHER INFORMATION: n is a, c, g, or t
<220> FEATURE:
<221> NAME/KEY: misc_feature
<222> LOCATION: (34)..(34)
<223> OTHER INFORMATION: n is a, c, g, or t
<220> FEATURE:
<221> NAME/KEY: misc_feature
<222> LOCATION: (34)..(35)
<223> OTHER INFORMATION: optional spacer
<220> FEATURE:
<221> NAME/KEY: misc_feature
<222> LOCATION: (51)..(51)
<223> OTHER INFORMATION: n is a, c, g, or t

<400> SEQUENCE: 35
ctgtactttc ctgaccnctg tactttcctg accnctgtac tttcctgacc n                 51

<210> SEQ ID NO 36
<211> LENGTH: 40
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (20)..(21)
<223> OTHER INFORMATION: optional spacer
<220> FEATURE:
```

```
<221> NAME/KEY: misc_feature
<222> LOCATION: (21)..(21)
<223> OTHER INFORMATION: n is a, c, g, or t
<220> FEATURE:
<221> NAME/KEY: misc_feature
<222> LOCATION: (38)..(38)
<223> OTHER INFORMATION: n is a, c, g, or t

<400> SEQUENCE: 36 nctgtactt  cctgaccntg nctgtactt  cctgaccntg                          40

<210> SEQ ID NO 37
<211> LENGTH: 60
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (20)..(21)
<223> OTHER INFORMATION: optional spacer
<220> FEATURE:
<221> NAME/KEY: misc_feature
<222> LOCATION: (21)..(21)
<223> OTHER INFORMATION: n is a, c, g, or t
<220> FEATURE:
<221> NAME/KEY: misc_feature
<222> LOCATION: (38)..(38)
<223> OTHER INFORMATION: n is a, c, g, or t
<220> FEATURE:
<221> NAME/KEY: misc_feature
<222> LOCATION: (40)..(41)
<223> OTHER INFORMATION: optional spacer
<220> FEATURE:
<221> NAME/KEY: misc_feature
<222> LOCATION: (41)..(41)
<223> OTHER INFORMATION: n is a, c, g, or t
<220> FEATURE:
<221> NAME/KEY: misc_feature
<222> LOCATION: (58)..(58)
<223> OTHER INFORMATION: n is a, c, g, or t

<400> SEQUENCE: 37 nctgtactt  cctgaccntg nctgtactt  cctgaccntg nctgtactt  cctgaccntg    60

<210> SEQ ID NO 38
<211> LENGTH: 60
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (20)..(21)
<223> OTHER INFORMATION: optional spacer
<220> FEATURE:
<221> NAME/KEY: misc_feature
<222> LOCATION: (40)..(41)
<223> OTHER INFORMATION: optional spacer

<400> SEQUENCE: 38 tctgtactt  cctgaccttg tctgtactt  cctgaccttg tctgtactt  cctgaccttg    60
```

```
<210> SEQ ID NO 39
<211> LENGTH: 60
<212> TYPE: DNA
<213> ORGANISM: Artificial Sequence
<220> FEATURE:
<223> OTHER INFORMATION: sequence suitably comprised in a functional
      variant of a PBREM sequence
<220> FEATURE:
<221> NAME/KEY: misc_feature
<222> LOCATION: (20)..(21)
<223> OTHER INFORMATION: optional spacer
<220> FEATURE:
<221> NAME/KEY: misc_feature
<222> LOCATION: (40)..(41)
<223> OTHER INFORMATION: optional spacer

<400> SEQUENCE: 39
actgtacttt cctgaccctg actgtacttt cctgaccctg actgtacttt cctgaccctg    60

<210> SEQ ID NO 40
<211> LENGTH: 8
<212> TYPE: DNA
<213> ORGANISM: Artificial Sequence
<220> FEATURE:
<223> OTHER INFORMATION: spacer

<400> SEQUENCE: 40 gatcgatc                                                              8

<210> SEQ ID NO 41
<211> LENGTH: 51
<212> TYPE: DNA
<213> ORGANISM: Artificial Sequence
<220> FEATURE:
<223> OTHER INFORMATION: sequence preferably comprised in a functional
      variant of a PBREM sequence
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (21)..(25)
<223> OTHER INFORMATION: n is a, c, g, or t
<220> FEATURE:
<221> NAME/KEY: misc_feature
<222> LOCATION: (29)..(29)
<223> OTHER INFORMATION: n is a, c, g, or t
<220> FEATURE:
<221> NAME/KEY: misc_feature
<222> LOCATION: (32)..(32)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(49)
<223> OTHER INFORMATION: n is a, c, g, or t
<220> FEATURE:
<221> NAME/KEY: misc_feature
<222> LOCATION: (51)..(51)
<223> OTHER INFORMATION: n is a, c, g, or t

<400> SEQUENCE: 41
``` nctgtactt cctgaccntg nnnnngtgnc ancatnnact tncctgannc n  51

<210> SEQ ID NO 42
<211> LENGTH: 102
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (21)..(25)
<223> OTHER INFORMATION: n is a, c, g, or t
<220> FEATURE:
<221> NAME/KEY: misc_feature
<222> LOCATION: (29)..(29)
<223> OTHER INFORMATION: n is a, c, g, or t
<220> FEATURE:
<221> NAME/KEY: misc_feature
<222> LOCATION: (32)..(32)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(49)
<223> OTHER INFORMATION: n is a, c, g, or t
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (51)..(51)
<223> OTHER INFORMATION: n is a, c, g, or t
<220> FEATURE:
<221> NAME/KEY: misc_feature
<222> LOCATION: (52)..(52)
<223> OTHER INFORMATION: n is a, c, g, or t
<220> FEATURE:
<221> NAME/KEY: misc_feature
<222> LOCATION: (69)..(69)
<223> OTHER INFORMATION: n is a, c, g, or t
<220> FEATURE:
<221> NAME/KEY: misc_feature
<222> LOCATION: (72)..(76)
<223> OTHER INFORMATION: n is a, c, g, or t
<220> FEATURE:
<221> NAME/KEY: misc_feature
<222> LOCATION: (80)..(80)
<223> OTHER INFORMATION: n is a, c, g, or t
<220> FEATURE:
<221> NAME/KEY: misc_feature
<222> LOCATION: (83)..(83)
<223> OTHER INFORMATION: n is a, c, g, or t
<220> FEATURE:
<221> NAME/KEY: misc_feature
<222> LOCATION: (87)..(88)
<223> OTHER INFORMATION: n is a, c, g, or t
<220> FEATURE:
<221> NAME/KEY: misc_feature
<222> LOCATION: (93)..(93)
<223> OTHER INFORMATION: n is a, c, g, or t
<220> FEATURE:
<221> NAME/KEY: misc_feature

```
<222> LOCATION: (99)..(100)
<223> OTHER INFORMATION: n is a, c, g, or t
<220> FEATURE:
<221> NAME/KEY: misc_feature
<222> LOCATION: (102)..(102)
<223> OTHER INFORMATION: n is a, c, g, or t

<400> SEQUENCE: 42
nctgtacttt cctgaccntg nnnnngtgnc ancatnnact tncctgannc nnctgtactt        60
tcctgaccnt gnnnnngtgn cancatnnac ttncctgann cn                         102

<210> SEQ ID NO 43
<211> LENGTH: 153
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (21)..(25)
<223> OTHER INFORMATION: n is a, c, g, or t
<220> FEATURE:
<221> NAME/KEY: misc_feature
<222> LOCATION: (29)..(29)
<223> OTHER INFORMATION: n is a, c, g, or t
<220> FEATURE:
<221> NAME/KEY: misc_feature
<222> LOCATION: (32)..(32)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(49)
<223> OTHER INFORMATION: n is a, c, g, or t
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (51)..(51)
<223> OTHER INFORMATION: n is a, c, g, or t
<220> FEATURE:
<221> NAME/KEY: misc_feature
<222> LOCATION: (52)..(52)
<223> OTHER INFORMATION: n is a, c, g, or t
<220> FEATURE:
<221> NAME/KEY: misc_feature
<222> LOCATION: (69)..(69)
<223> OTHER INFORMATION: n is a, c, g, or t
<220> FEATURE:
<221> NAME/KEY: misc_feature
<222> LOCATION: (72)..(76)
<223> OTHER INFORMATION: n is a, c, g, or t
<220> FEATURE:
<221> NAME/KEY: misc_feature
<222> LOCATION: (80)..(80)
<223> OTHER INFORMATION: n is a, c, g, or t
<220> FEATURE:
<221> NAME/KEY: misc_feature
<222> LOCATION: (83)..(83)
```

```
<223> OTHER INFORMATION: n is a, c, g, or t
<220> FEATURE:
<221> NAME/KEY: misc_feature
<222> LOCATION: (87)..(88)
<223> OTHER INFORMATION: n is a, c, g, or t
<220> FEATURE:
<221> NAME/KEY: misc_feature
<222> LOCATION: (93)..(93)
<223> OTHER INFORMATION: n is a, c, g, or t
<220> FEATURE:
<221> NAME/KEY: misc_feature
<222> LOCATION: (99)..(100)
<223> OTHER INFORMATION: n is a, c, g, or t
<220> FEATURE:
<221> NAME/KEY: misc_feature
<222> LOCATION: (102)..(102)
<223> OTHER INFORMATION: n is a, c, g, or t
<220> FEATURE:
<221> NAME/KEY: misc_feature
<222> LOCATION: (102)..(103)
<223> OTHER INFORMATION: optional spacer
<220> FEATURE:
<221> NAME/KEY: misc_feature
<222> LOCATION: (103)..(103)
<223> OTHER INFORMATION: n is a, c, g, or t
<220> FEATURE:
<221> NAME/KEY: misc_feature
<222> LOCATION: (120)..(120)
<223> OTHER INFORMATION: n is a, c, g, or t
<220> FEATURE:
<221> NAME/KEY: misc_feature
<222> LOCATION: (123)..(127)
<223> OTHER INFORMATION: n is a, c, g, or t
<220> FEATURE:
<221> NAME/KEY: misc_feature
<222> LOCATION: (131)..(131)
<223> OTHER INFORMATION: n is a, c, g, or t
<220> FEATURE:
<221> NAME/KEY: misc_feature
<222> LOCATION: (134)..(134)
<223> OTHER INFORMATION: n is a, c, g, or t
<220> FEATURE:
<221> NAME/KEY: misc_feature
<222> LOCATION: (138)..(139)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
<220> FEATURE:
<221> NAME/KEY: misc_feature
<222> LOCATION: (150)..(151)
<223> OTHER INFORMATION: n is a, c, g, or t
<220> FEATURE:
<221> NAME/KEY: misc_feature
<222> LOCATION: (153)..(153)
<223> OTHER INFORMATION: n is a, c, g, or t

<400> SEQUENCE: 43
nctgtacttt cctgaccntg nnnnngtgnc ancatnnact tncctgannc nnctgtactt      60
tcctgaccnt gnnnnngtgn cancatnnac ttncctgann cnnctgtact ttcctgaccn     120
tgnnnnngtg ncancatnna cttncctgan ncn                                  153

<210> SEQ ID NO 44
<211> LENGTH: 102
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (51)..(52)
<223> OTHER INFORMATION: optional spacer

<400> SEQUENCE: 44
```

```
tctgtacttt cctgaccttg gcacagtgcc accatcaact tgcctgacac ctctgtactt    60
tcctgacctt ggcacagtgc caccatcaac ttgcctgaca cc                      102
```

<210> SEQ ID NO 45
<211> LENGTH: 153
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (102)..(103)
<223> OTHER INFORMATION: optional spacer

<400> SEQUENCE: 45

```
tctgtacttt cctgaccttg gcacagtgcc accatcaact tgcctgacac ctctgtactt    60
tcctgacctt ggcacagtgc caccatcaac ttgcctgaca cctctgtact tcctgacct   120 tggcacagtg ccaccatcaa cttgcctgac acc                                153
```

<210> SEQ ID NO 46
<211> LENGTH: 153
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (102)..(103)
<223> OTHER INFORMATION: optional spacer

<400> SEQUENCE: 46

```
actgtacttt cctgaccctg aagaggtggc agcatggact ttcctgaacc aactgtactt    60
tcctgaccct gaagaggtgg cagcatggac tttcctgaac caactgtact ttcctgaccc   120
tgaagaggtg gcagcatgga ctttcctgaa cca                                153
```

<210> SEQ ID NO 47
<211> LENGTH: 102
<212> TYPE: DNA
<213> ORGANISM: Artificial Sequence
<220> FEATURE:
<223> OTHER INFORMATION: CRM
<220> FEATURE:
<221> NAME/KEY: misc_feature
<222> LOCATION: (51)..(52)
<223> OTHER INFORMATION: optional spacer

<400> SEQUENCE: 47

```
actgtacttt cctgaccctg aagaggtggc agcatggact ttcctgaacc aactgtactt    60
tcctgaccct gaagaggtgg cagcatggac tttcctgaac ca                      102
```

<210> SEQ ID NO 48
<211> LENGTH: 5716
<212> TYPE: DNA
<213> ORGANISM: Artificial Sequence
<220> FEATURE:
<223> OTHER INFORMATION: pAAV-ZsGreen original plasmid

```
<400> SEQUENCE: 48
agcgcccaat acgcaaaccg cctctccccg cgcgttggcc gattcattaa tgcagctggc    60
acgacaggtt tcccgactgg aaagcgggca gtgagcgcaa cgcaattaat gtgagttagc   120
tcactcatta ggcaccccag gctttacact ttatgcttcc ggctcgtatg ttgtgtggaa   180
ttgtgagcgg ataacaattt cacacaggaa acagctatga ccatgattac gaattgcctg   240
caggcagctg cgcgctcgct cgctcactga ggccgcccgg gcaaagcccg ggcgtcgggc   300
gacctttggt cgcccggcct cagtgagcga gcgagcgcgc agagagggag tggccaactc   360
catcactagg ggttcctatc gatatcaagc tttaatagta atcaattacg ggtcattag   420
ttcatagccc atatatggag ttccgcgtta cataacttac ggtaaatggc ccgcctggct   480
gaccgcccaa cgaccccgc ccattgacgt caataatgac gtatgttccc atagtaacgc   540
caatagggac tttccattga cgtcaatggg tggagtattt acggtaaact gcccacttgg   600
cagtacatca agtgtatcat atgccaagta cgccccctat tgacgtcaat gacggtaaat   660
ggcccgcctg gcattatgcc cagtacatga ccttatggga ctttcctact tggcagtaca   720
tctacgtatt agtcatcgct attaccatgg tgatgcggtt ttggcagtac atcaatgggc   780
gtggatagcg gtttgactca cggggatttc caagtctcca ccccattgac gtcaatggga   840
gtttgttttg gcaccaaaat caacgggact ttccaaaatg tcgtaacaac tccgccccat   900
tgacgcaaat gggcggtagg cgtgtacggt gggaggtcta taagcaga gctggtttag   960
tggatatcct taagggccca gccggcccga atcccggccg ggaacggtgc attggaacgc  1020
ggattccccg tgccaagagt gacgtaagta ccgcctatag agtctatagg cccacaaaaa  1080
atgctttctt cttttaatat acttttttgt ttatcttatt tctaatactt tccctaatct  1140
ctttctttca gggcaataat gatacaatgt atcatgcctc tttgcaccat tctaaagaat  1200
aacagtgata atttctgggt taaggcaata gcaatatttc tgcatataaa tatttctgca  1260
tataaattgt aactgatgta agaggtttca tattgctaat agcagctaca atccagctac  1320
cattctgctt ttattttatg gttgggataa ggctggatta ttctgagtcc aagctaggcc  1380
cttttgctaa tcatgttcat acctcttatc ttcctcccac agctcctggg caacgtgctg  1440
gtctgtgtgc tggcccatca ctttggcaaa gaattgggat tcgcgagaat cgccaccat  1500
ggcccagtcc aagcacggcc tgaccaagga tgaccatg aagtaccgca tggagggctg  1560
cgtggacggc cacaagttcg tgatcaccgg cgagggcatc ggctacccct tcaagggcaa  1620
gcaggccatc aacctgtgcg tggtggaggg cggcccttg cccttcgccg aggacatctt  1680
gtccgccgcc ttcatgtacg gcaaccgcgt gttcaccgag taccccagg acatcgtcga  1740
ctacttcaag aactcctgcc ccgccggcta cacctgggac cgctccttcc tgttcgagga  1800
cggcgccgtg tgcatctgca acgccgacat caccgtgagc gtggaggaga actgcatgta  1860
ccacgagtcc aagttctacg gcgtgaactt ccccgccgac ggccccgtga tgaagaagat  1920
gaccgacaac tgggagccct cctgcgagaa gatcatcccc gtgcccaagc agggcatctt  1980
gaagggcgac gtgagcatgt acctgctgct gaaggacggt ggccgcttgc gctgccagtt  2040
cgacaccgtg tacaaggcca agtccgtgcc ccgcaagatg cccgactggc acttcatcca  2100
gcacaagctg acccgcgagg accgcagcga cgccaagaac cagaagtggc acctgaccga  2160
gcacgccatc gcctccggct ccgccttgcc ctgataagga tccacgggtg gcatccctgt  2220
gacccctccc cagtgcctct cctggccctg gaagttgcca ctccagtgcc caccagcctt  2280
gtcctaataa aattaagttg catcattttg tctgactagg tgtccttcta taatattatg  2340
```

```
gggtggaggg gggtggtatg gagcaagggg caagttggga agacaacctg tagggcctgc   2400
ggggtctatt gggaaccaag ctggagtgca gtggcacaat cttggctcac tgcaatctcc   2460
gcctcctggg ttcaagcgat tctcctgcct cagcctcccg agttgttggg attccaggca   2520
tgcatgacca ggctcagcta attttttgttt ttttggtaga gacggggttt caccatattg   2580
gccaggctgg tctccaactc ctaatctcag gtgatctacc caccttggcc tcccaaattg   2640
ctgggattac aggcgtgaac cactgctccc ttccctgtcc ttatcgatag atctaggaac   2700
ccctagtgat ggagttggcc actccctctc tgcgcgctcg ctcgctcact gaggccgggc   2760
gaccaaaggt cgcccgacgc ccgggctttg cccgggcggc tcagtgagc gagcgagcgc    2820 gcagctgcct gcaggcagct tggcactggc cgtcgtttta caacgtcgtg actgggaaaa   2880
ccctggcgtt acccaactta atcgccttgc agcacatccc cctttcgcca gctggcgtaa   2940
tagcgaagag gcccgcaccg atcgcccttc ccaacagttg cgcagcctga atggcgaatg   3000
gcgcctgatg cggtattttc tccttacgca tctgtgcggt atttcacacc gcatacgtca   3060
aagcaaccat agtacgcgcc ctgtagcggc gcattaagcg cggcgggtgt ggtggttacg   3120
cgcagcgtga ccgctacact tgccagcgcc ctagcgcccg ctcctttcgc tttcttccct   3180
tcctttctcg ccacgttcgc cggctttccc cgtcaagctc taaatcgggg gctcccttta   3240
gggttccgat ttagtgcttt acggcacctc gacccccaaaa aacttgattt gggtgatggt   3300
tcacgtagtg ggccatcgcc ctgatagacg gttttttcgcc ctttgacgtt ggagtccacg   3360
ttctttaata gtggactctt gttccaaact ggaacaacac tcaaccctat ctcgggctat   3420
tcttttgatt tataagggat tttgccgatt tcggcctatt ggttaaaaaa tgagctgatt   3480
taacaaaaat ttaacgcgaa ttttaacaaa atattaacgt ttacaatttt atggtgcact   3540
ctcagtacaa tctgctctga tgccgcatag ttaagccagc cccgacaccc gccaacaccc   3600
gctgacgcgc cctgacgggc ttgtctgctc ccggcatccg cttacagaca agctgtgacc   3660
gtctccggga gctgcatgtg tcagaggttt tcaccgtcat caccgaaacg cgcgagacga   3720
aagggcctcg tgatacgcct attttttatag gttaatgtca tgataataat ggtttcttag   3780
acgtcaggtg gcactttcg gggaaatgtg cgcggaaccc ctatttgttt attttttctaa   3840 atacattcaa atatgtatcc gctcatgaga caataaccct gataaatgct tcaataatat   3900
tgaaaaagga agagtatgag tattcaacat ttccgtgtcg cccttattcc cttttttgcg   3960
gcattttgcc ttcctgtttt tgctcaccca gaaacgctgg tgaaagtaaa agatgctgaa   4020
gatcagttgg gtgcacgagt gggttacatc gaactggatc tcaacagcgg taagatcctt   4080
gagagttttc gccccgaaga acgttttcca atgatgagca cttttaaagt tctgctatgt   4140
ggcgcggtat tatcccgtat tgacgccggg caagagcaac tcggtcgccg catacactat   4200
tctcagaatg acttggttga gtactcacca gtcacagaaa agcatcttac ggatggcatg   4260
acagtaagag aattatgcag tgctgccata accatgagtg ataacactgc ggccaactta   4320
cttctgacaa cgatcggagg accgaaggag ctaaccgctt ttttgcacaa catgggggat   4380
catgtaactc gccttgatcg ttgggaaccg gagctgaatg aagccatacc aaacgacgag   4440
cgtgacacca cgatgcctgt agcaatggca acaacgttgc gcaaactatt aactggcgaa   4500
ctacttactc tagcttcccg gcaacaatta atagactgga tggaggcgga taaagttgca   4560
ggaccacttc tgcgctcggc ccttccggct ggctggttta ttgctgataa atctggagcc   4620
ggtgagcgtg ggtctcgcgg tatcattgca gcactggggc cagatggtaa gccctcccgt   4680
```

| | |
|---|---|
| atcgtagtta tctacacgac ggggagtcag gcaactatgg atgaacgaaa tagacagatc | 4740 |
| gctgagatag gtgcctcact gattaagcat tggtaactgt cagaccaagt ttactcatat | 4800 |
| atactttaga ttgatttaaa acttcatttt taatttaaaa ggatctaggt gaagatcctt | 4860 |
| tttgataatc tcatgaccaa aatcccttaa cgtgagtttt cgttccactg agcgtcagac | 4920 |
| cccgtagaaa agatcaaagg atcttcttga gatcctttttt ttctgcgcgt aatctgctgc | 4980 |
| ttgcaaacaa aaaaccacc gctaccagcg gtggtttgtt tgccggatca agagctacca | 5040 |
| actctttttc cgaaggtaac tggcttcagc agagcgcaga taccaaatac tgttcttcta | 5100 |
| gtgtagccgt agttaggcca ccacttcaag aactctgtag caccgcctac atacctcgct | 5160 |
| ctgctaatcc tgttaccagt ggctgctgcc agtggcgata agtcgtgtct taccgggttg | 5220 |
| gactcaagac gatagttacc ggataaggcg cagcggtcgg gctgaacggg gggttcgtgc | 5280 |
| acacagccca gcttggagcg aacgacctac accgaactga gatacctaca gcgtgagcta | 5340 |
| tgagaaagcg ccacgcttcc cgaagggaga aaggcggaca ggtatccggt aagcggcagg | 5400 |
| gtcggaacag gagagcgcac gagggagctt ccagggggaa acgcctggta tctttatagt | 5460 |
| cctgtcgggt ttcgccacct ctgacttgag cgtcgatttt tgtgatgctc gtcaggggg | 5520 |
| cggagcctat ggaaaaacgc cagcaacgcg gcctttttac ggttcctggc cttttgctgg | 5580 |
| ccttttgctc acatgttctt tcctgcgtta tcccctgatt ctgtggataa ccgtattacc | 5640 |
| gcctttgagt gagctgatac cgctcgccgc agccgaacga ccgagcgcag cgagtcagtg | 5700 |
| agcgaggaag cggaag | 5716 |

<210> SEQ ID NO 49
<211> LENGTH: 5857
<212> TYPE: DNA
<213> ORGANISM: Artificial Sequence
<220> FEATURE:
<223> OTHER INFORMATION: pAAV-PB1-MinTk

<400> SEQUENCE: 49

| | |
|---|---|
| tgcctgcagg cagctgcgcg ctcgctcgct cactgaggcc gcccgggcaa agcccgggcg | 60 |
| tcgggcgacc tttggtcgcc cggcctcagt gagcgagcga gcgcgcagag agggagtggc | 120 |
| caactccatc actaggggtt cctatcgata tcaagcttct gtactttcct gaccttggca | 180 |
| cagtgccacc atcaacttgc ctgacaccga tccggccccg cccagcgtct tgtcattggc | 240 |
| gaattcgaac acgcagatgc agtcggggcg gcgcggtccg aggtccactt cgcatattaa | 300 |
| ggtgacgcgt gtggcctcga acaccgagcg accctgcagc gacccgctta acagcgtcaa | 360 |
| cagcgtgccg cagatctcga ggagcttggc gagattttca ggagctaagg aagctaaaca | 420 |
| tggaagatgc caaaaacatt aagaagggcc cagcgccatt ctaccactc gaagacggga | 480 |
| ccgccggcga gcagctgcac aaagccatga gcgctacgc cctggtgccc ggcaccatcg | 540 |
| cctttaccga cgcacatatc gaggtggaca ttacctacgc cgagtacttc gagatgagcg | 600 |
| ttcggctggc agaagctatg aagcgctatg gctgaatac aaaccatcgg atcgtggtgt | 660 |
| gcagcgagaa tagcttgcag ttcttcatgc ccgtgttggg tgccctgttc atcggtgtgg | 720 |
| ctgtggcccc agctaacgac atctacaacg agcgcgagct gctgaacagc atgggcatca | 780 |
| gccagcccac cgtcgtattc gtgagcaaga aagggctgca aagatcctc aacgtgcaaa | 840 |
| agaagctacc gatcatacaa aagatcatca tcatggatag caagaccgac taccagggct | 900 |
| tccaaagcat gtacaccttc gtgacttccc atttgccacc cggcttcaac gagtacgact | 960 |
| tcgtgcccga gagcttcgac cgggacaaaa ccatcgccct gatcatgaac agtagtggca | 1020 |

```
gtaccggatt gcccaagggc gtagccctac cgcaccgcac cgcttgtgtc cgattcagtc    1080
atgcccgcga ccccatcttc ggcaaccaga tcatccccga caccgctatc ctcagcgtgg    1140
tgccatttca ccacggcttc ggcatgttca ccacgctggg ctacttgatc tgcggctttc    1200
gggtcgtgct catgtaccgc ttcgaggagg agctattctt gcgcagcttg caagactata    1260
agattcaatc tgccctgctg gtgcccacac tatttagctt cttcgctaag agcactctca    1320
tcgacaagta cgacctaagc aacttgcacg agatcgccag cggcggggcg ccgctcagca    1380
aggaggtagg tgaggccgtg gccaaacgct tccacctacc aggcatccgc cagggctacg    1440
gcctgacaga aacaaccagc gccattctga tcacccccga aggggacgac aagcctggcg    1500
cagtaggcaa ggtggtgccc ttcttcgagg ctaaggtggt ggacttggac accggtaaga    1560
cactgggtgt gaaccagcgc ggcgagctgt gcgtccgtgg ccccatgatc atgagcggct    1620
acgttaacaa ccccgaggct acaaacgctc tcatcgacaa ggacggctgg ctgcacagcg    1680
gcgacatcgc ctactgggac gaggacgagc acttcttcat cgtggaccgg ctgaagagcc    1740
tgatcaaata caagggctac caggtagccc cagccgaact ggagagcatc ctgctgcaac    1800
accccaacat cttcgacgcc ggggtcgccg gcctgcccga cgacgatgcc ggcgagctgc    1860
ccgccgcagt cgtcgtgctg gaacacggta aaaccatgac cgagaaggag atcgtggact    1920
atgtggccag ccaggttaca accgccaaga agctgcgcgg tggtgttgtg ttcgtggacg    1980
aggtgcctaa aggactgacc ggcaagttgg acgcccgcaa gatccgcgag attctcatta    2040
aggccaagaa gggcggcaag atcgccgtgt aatcgcgaga attctctaga gtcgacacta    2100
gtgcggatcc acgggtggca tccctgtgac ccctccccag tgcctctcct ggccctggaa    2160
gttgccactc cagtgcccac cagccttgtc ctaataaaat taagttgcat cattttgtct    2220
gactaggtgt ccttctataa tattatgggg tggaggggggg tggtatggag caaggggcaa    2280
gttgggaaga caacctgtag ggcctgcggg gtctattggg aaccaagctg gagtgcagtg    2340
gcacaatctt ggctcactgc aatctccgcc tcctgggttc aagcgattct cctgcctcag    2400
cctcccgagt tgttgggatt ccaggcatgc atgaccaggc tcagctaatt tttgtttttt    2460
tggtagagac ggggtttcac catattggcc aggctggtct ccaactccta atctcaggtg    2520
atctacccac cttggcctcc caaattgctg ggattacagg cgtgaaccac tgctcccttc    2580
cctgtcctta tcgatagatc taggaacccc tagtgatgga gttggccact ccctctctgc    2640
gcgctcgctc gctcactgag gccgggcgac caaaggtcgc ccgacgcccg ggctttgccc    2700
gggcggcctc agtgagcgag cgagcgcgca gctgcctgca ggcagcttgg cactggccgt    2760
cgttttacaa cgtcgtgact gggaaaaccc tggcgttacc caacttaatc gccttgcagc    2820 acatcccccct ttcgccagct ggcgtaatag cgaagaggcc cgcaccgatc gcccttccca    2880
acagttgcgc agcctgaatg gcgaatggcg cctgatgcgg tattttctcc ttacgcatct    2940
gtgcggtatt tcacaccgca tacgtcaaag caaccatagt acgcgccctg tagcggcgca    3000
ttaagcgcgg cgggtgtggt ggttacgcgc agcgtgaccg ctacacttgc cagcgcccta    3060
gcgcccgctc ctttcgcttt cttcccttcc tttctcgcca cgttcgccgg ctttccccgt    3120
caagctctaa atcgggggct ccctttaggg ttccgattta gtgctttacg gcacctcgac    3180
cccaaaaaac ttgatttggg tgatggttca cgtagtgggc catcgccctg atagacggtt    3240
tttcgccctt tgacgttgga gtccacgttc tttaatagtg gactcttgtt ccaaactgga    3300
acaacactca accctatctc gggctattct tttgatttat aagggatttt gccgatttcg    3360
```

```
gcctattggt taaaaaatga gctgatttaa caaaaattta acgcgaattt taacaaaata   3420
ttaacgttta caattttatg gtgcactctc agtacaatct gctctgatgc cgcatagtta   3480
agccagcccc gacacccgcc aacacccgct gacgcgccct gacgggcttg tctgctcccg   3540
gcatccgctt acagacaagc tgtgaccgtc tccgggagct gcatgtgtca gaggttttca   3600
ccgtcatcac cgaaacgcgc gagacgaaag gcctcgtga tacgcctatt tttataggtt    3660
aatgtcatga taataatggt ttcttagacg tcaggtggca cttttcgggg aaatgtgcgc   3720
ggaacccta tttgtttatt tttctaaata cattcaaata tgtatccgct catgagacaa    3780
taaccctgat aaatgcttca ataatattga aaaggaaga gtatgagtat tcaacatttc    3840
cgtgtcgccc ttattccctt ttttgcggca ttttgccttc ctgttttgc tcacccagaa    3900
acgctggtga agtaaaaga tgctgaagat cagttgggtg cacgagtggg ttacatcgaa    3960
ctggatctca acagcggtaa gatccttgag agttttcgcc ccgaagaacg ttttccaatg   4020
atgagcactt ttaaagttct gctatgtggc gcggtattat cccgtattga cgccgggcaa   4080
gagcaactcg gtcgccgcat acactattct cagaatgact tggttgagta ctcaccagtc   4140
acagaaaagc atcttacgga tggcatgaca gtaagagaat tatgcagtgc tgccataacc   4200
atgagtgata acactgcggc caacttactt ctgacaacga tcggaggacc gaaggagcta   4260
accgcttttt tgcacaacat gggggatcat gtaactcgcc ttgatcgttg gaaccggag    4320
ctgaatgaag ccataccaaa cgacgagcgt gacaccacga tgcctgtagc aatggcaaca   4380
acgttgcgca aactattaac tggcgaacta cttactctag cttcccggca acaattaata   4440
gactggatgg aggcggataa agttgcagga ccacttctgc gctcggccct tccggctggc   4500
tggtttattg ctgataaatc tggagccggt gagcgtgggt ctcgcggtat cattgcagca   4560
ctggggccag atggtaagcc ctcccgtatc gtagttatct acacgacggg gagtcaggca   4620
actatggatg aacgaaatag acagatcgct gagataggtg cctcactgat taagcattgg   4680
taactgtcag accaagttta ctcatatata ctttagattg atttaaaact tcattttaa    4740
tttaaaagga tctaggtgaa gatcctttt gataatctca tgaccaaaat cccttaacgt    4800
gagttttcgt tccactgagc gtcagacccc gtagaaaaga tcaaaggatc ttcttgagat   4860
ccttttttc tgcgcgtaat ctgctgcttg caaacaaaaa aaccaccgct accagcggtg    4920
gtttgtttgc cggatcaaga gctaccaact cttttttccga aggtaactgg cttcagcaga   4980
gcgcagatac caaatactgt tcttctagtg tagccgtagt taggccacca cttcaagaac   5040
tctgtagcac cgcctacata cctcgctctg ctaatcctgt taccagtggc tgctgccagt   5100
ggcgataagt cgtgtcttac cgggttggac tcaagacgat agttaccgga taaggcgcag   5160
cggtcgggct gaacggggg ttcgtgcaca cagcccagct tggagcgaac gacctacacc    5220
gaactgagat acctacagcg tgagctatga gaaagcgcca cgcttcccga agggagaaag   5280
gcggacaggt atccggtaag cggcaggtc ggaacaggag agcgcacgag ggagcttcca    5340
ggggaaacg cctggtatct ttatagtcct gtcgggtttc gccacctctg acttgagcgt    5400
cgatttttgt gatgctcgtc aggggggcgg agcctatgga aaaacgccag caacgcggcc   5460
tttttacggt tcctggcctt ttgctggcct tttgctcaca tgttctttcc tgcgttatcc   5520
cctgattctg tggataaccg tattaccgcc tttgagtgag ctgataccgc tcgccgcagc   5580
cgaacgaccg agcgcagcga gtcagtgagc gaggaagcgg aagagcgccc aatacgcaaa   5640
ccgcctctcc ccgcgcgttg gccgattcat taatgcagct ggcacgacag gtttcccgac   5700
tggaaagcgg gcagtgagcg caacgcaatt aatgtgagtt agctcactca ttaggcaccc   5760
```

```
caggctttac actttatgct tccggctcgt atgttgtgtg gaattgtgag cggataacaa    5820
tttcacacag gaaacagcta tgaccatgat tacgaat                             5857

<210> SEQ ID NO 50
<211> LENGTH: 6044
<212> TYPE: DNA
<213> ORGANISM: Artificial Sequence
<220> FEATURE:
<223> OTHER INFORMATION: pAAV-PB1-2-MinTk

<400> SEQUENCE: 50
gcctgcaggc agctgcgcgc tcgctcgctc actgaggccg cccgggcaaa gcccgggcgt      60
cgggcgacct ttggtcgccc ggcctcagtg agcgagcgag cgcgcagaga gggagtggcc     120
aactccatca ctaggggttc ctatcgatat caagcttttc tctggcctaa ctggccggta     180
ctctgtactt tcctgacctt ggcacagtgc caccatcaac ttgcctgaca cccattactc     240
gcatccattc tctctgtact ttcctgacct tggcacagtg ccaccatcaa cttgcctgac     300
accgcactga aggtcctcaa tcgtctgtac tttcctgacc ttggcacagt gccaccatca     360
acttgcctga caccgctggg agttcgtaga cggagatccg gccccgccca gcgtcttgtc     420
attggcgaat tcgaacacgc agatgcagtc ggggcggcgc ggtccgaggt ccacttcgca     480
tattaaggtg acgcgtgtgg cctcgaacac cgagcgaccc tgcagcgacc cgcttaacag     540
cgtcaacagc gtgccgcaga tctcgaggag cttggcgaga ttttcaggag ctaaggaagc     600
taaacatgga agatgccaaa aacattaaga agggcccagc gccattctac ccactcgaag     660
acgggaccgc cggcgagcag ctgcacaaag ccatgaagcg ctacgccctg gtgcccggca     720
ccatcgcctt taccgacgca catatcgagg tggacattac ctacgccgag tacttcgaga     780
tgagcgttcg gctggcagaa gctatgaagc gctatgggct gaatacaaac catcggatcg     840
tggtgtgcag cgagaatagc ttgcagttct tcatgcccgt gttgggtgcc ctgttcatcg     900
gtgtggctgt ggccccagct aacgacatct acaacgagcg cgagctgctg aacagcatgg     960
gcatcagcca gcccaccgtc gtattcgtga gcaagaaagg gctgcaaaag atcctcaacg    1020
tgcaaaagaa gctaccgatc atacaaaaga tcatcatcat ggatagcaag accgactacc    1080
agggcttcca aagcatgtac accttcgtga cttcccattt gccacccggc ttcaacgagt    1140
acgacttcgt gcccgagagc ttcgaccggg acaaaaccat cgccctgatc atgaacagta    1200
gtggcagtac cggattgccc aagggcgtag ccctaccgca ccgcaccgct tgtgtccgat    1260
tcagtcatgc ccgcgacccc atcttcggca accagatcat ccccgacacc gctatcctca    1320
gcgtggtgcc atttcaccac ggcttcggca tgttcaccac gctgggctac ttgatctgcg    1380
gctttcgggt cgtgctcatg taccgcttcg aggaggagct attcttgcgc agcttgcaag    1440
actataagat tcaatctgcc ctgctggtgc ccacactatt tagcttcttc gctaagagca    1500
ctctcatcga caagtacgac ctaagcaact tgcacgagat cgccagcggc ggggcgccgc    1560
tcagcaagga ggtaggtgag gccgtggcca aacgcttcca cctaccaggc atccgccagg    1620
gctacgccct gacagaaaca accagcgcca ttctgatcac cccgaagggg acgacaagc     1680 ctggcgcagt aggcaaggtg gtgcccttct tcgaggctaa ggtggtggac ttggacaccg    1740
gtaagacact gggtgtgaac cagcgcggcg agctgtgcgt ccgtggcccc atgatcatga    1800
gcggctacgt taacaacccc gaggctcaaa acgctctcat cgacaaggac ggctggctgc    1860
acagcggcga catcgcctac tgggacgagg acgagcactt cttcatcgtg gaccggctga    1920
```

```
agagcctgat caaatacaag ggctaccagg tagccccagc cgaactggag agcatcctgc    1980
tgcaacaccc caacatcttc gacgccgggg tcgccggcct gcccgacgac gatgccggcg    2040
agctgcccgc cgcagtcgtc gtgctggaac acggtaaaac catgaccgag aaggagatcg    2100
tggactatgt ggccagccag gttacaaccg ccaagaagct cgcgcgtggt gttgtgttcg    2160
tggacgaggt gcctaaagga ctgaccggca agttggacgc ccgcaagatc cgcgagattc    2220
tcattaaggc caagaagggc ggcaagatcg ccgtgtaatc gcgagaattc tctagagtcg    2280
acactagtgc ggatccacgg gtggcatccc tgtgacccct ccccagtgcc tctcctggcc    2340
ctggaagttg ccactccagt gcccaccagc cttgtcctaa taaaattaag ttgcatcatt    2400
ttgtctgact aggtgtcctt ctataatatt atggggtgga ggggggtggt atggagcaag    2460
gggcaagttg gaagacaac ctgtagggcc tgcggggtct attgggaacc aagctggagt     2520
gcagtggcac aatcttggct cactgcaatc tccgcctcct gggttcaagc gattctcctg    2580
cctcagcctc ccgagttgtt gggattccag gcatgcatga ccaggctcag ctaattttg     2640
ttttttttggt agagacgggg tttcaccata ttggccaggc tggtctccaa ctcctaatct    2700
caggtgatct acccaccttg cctcccaaa ttgctgggat tacaggcgtg aaccactgct     2760
cccttccctg tccttatcga tagatctagg aaccccttagt gatggagttg gccactccct   2820
ctctgcgcgc tcgctcgctc actgaggccg ggcgaccaaa ggtcgcccga cgcccgggct    2880
ttgcccgggc ggcctcagtg agcgagcgag cgcgcagctg cctgcaggca gcttggcact    2940
ggccgtcgtt ttacaacgtc gtgactggga aaaccctggc gttacccaac ttaatcgcct    3000
tgcagcacat cccccttttcg ccagctggcg taatagcgaa gaggcccgca ccgatcgccc    3060
ttcccaacag ttgcgcagcc tgaatggcga atggcgcctg atgcggtatt ttctccttac    3120
gcatctgtgc ggtatttcac accgcatacg tcaaagcaac catagtacgc gccctgtagc    3180
ggcgcattaa gcgcggcggg tgtggtggtt acgcgcagcg tgaccgctac acttgccagc    3240
gccctagcgc ccgctccttt cgctttcttc ccttcctttc tcgccacgtt cgccggcttt    3300
ccccgtcaag ctctaaatcg ggggctccct ttagggttcc gatttagtgc tttacggcac    3360
ctcgacccca aaaaacttga tttgggtgat ggttcacgta gtgggccatc gccctgatag    3420
acggtttttc gccctttgac gttggagtcc acgttcttta atagtggact cttgttccaa    3480
actggaacaa cactcaaccc tatctcgggc tattcttttg atttataagg gattttgccg    3540
atttcggcct attggttaaa aaatgagctg atttaacaaa aatttaacgc gaattttaac    3600
aaaatattaa cgtttacaat tttatggtgc actctcagta caatctgctc tgatgccgca    3660
tagttaagcc agccccgaca cccgccaaca cccgctgacg cgccctgacg ggcttgtctg    3720
ctcccggcat ccgcttacag acaagctgtg accgtctccg ggagctgcat gtgtcagagg    3780
ttttcaccgt catcaccgaa acgcgcgaga cgaaagggcc tcgtgatacg cctatttta    3840
taggttaatg tcatgataat aatggtttct tagacgtcag gtggcacttt tcggggaaat    3900
gtgcgcggaa cccctatttg tttatttttc taaatacatt caaatatgta tccgctcatg    3960
agacaataac cctgataaat gcttcaataa tattgaaaaa ggaagagtat gagtattcaa    4020
catttccgtg tcgcccttat tcccttttt gcggcatttt gccttcctgt ttttgctcac     4080
ccagaaacgc tggtgaaagt aaaagatgct gaagatcagt tgggtgcacg agtgggttac    4140
atcgaactgg atctcaacag cggtaagatc cttgagagtt ttcgccccga agaacgtttt    4200
ccaatgatga gcacttttaa agttctgcta tgtggcgcgg tattatcccg tattgacgcc    4260
gggcaagagc aactcggtcg ccgcatacac tattctcaga atgacttggt tgagtactca    4320
```

```
ccagtcacag aaaagcatct tacggatggc atgacagtaa agaaattatg cagtgctgcc    4380
ataaccatga gtgataacac tgcggccaac ttacttctga acaacgatcgg aggaccgaag    4440 gagctaaccg ctttttttgca caacatgggg gatcatgtaa ctcgccttga tcgttgggaa    4500
ccggagctga atgaagccat accaaacgac gagcgtgaca ccacgatgcc tgtagcaatg    4560
gcaacaacgt tgcgcaaact attaactggc gaactactta ctctagcttc ccggcaacaa    4620
ttaatagact ggatggaggc ggataaagtt gcaggaccac ttctgcgctc ggcccttccg    4680
gctggctggt ttattgctga taaatctgga gccggtgagc gtgggtctcg cggtatcatt    4740
gcagcactgg ggccagatgg taagccctcc cgtatcgtag ttatctacac gacggggagt    4800
caggcaacta tggatgaacg aaatagacag atcgctgaga taggtgcctc actgattaag    4860
cattggtaac tgtcagacca agtttactca tatatacttt agattgattt aaaacttcat    4920
ttttaattta aaaggatcta ggtgaagatc ctttttgata atctcatgac caaaatccct    4980
taacgtgagt tttcgttcca ctgagcgtca gaccccgtag aaaagatcaa aggatcttct    5040
tgagatcctt ttttctgcg cgtaatctgc tgcttgcaaa caaaaaaacc accgctacca    5100
gcggtggttt gtttgccgga tcaagagcta ccaactcttt ttccgaaggt aactggcttc    5160
agcagagcgc agataccaaa tactgttctt ctagtgtagc cgtagttagg ccaccacttc    5220
aagaactctg tagcaccgcc tacatacctc gctctgctaa tcctgttacc agtggctgct    5280
gccagtggcg ataagtcgtg tcttaccggg ttggactcaa gacgatagtt accggataag    5340
gcgcagcggt cgggctgaac ggggggttcg tgcacacagc ccagcttgga gcgaacgacc    5400
tacaccgaac tgagatacct acagcgtgag ctatgagaaa gcgccacgct tcccgaaggg    5460
agaaaggcgg acaggtatcc ggtaagcggc agggtcggaa caggagagcg cacgagggag    5520
cttccagggg gaaacgcctg gtatctttat agtcctgtcg ggtttcgcca cctctgactt    5580
gagcgtcgat ttttgtgatg ctcgtcaggg gggcggagcc tatggaaaaa cgccagcaac    5640
gcggcctttt tacggttcct ggccttttgc tggccttttg ctcacatgtt ctttcctgcg    5700
ttatcccctg attctgtgga taaccgtatt accgcctttg agtgagctga taccgctcgc    5760
cgcagccgaa cgaccgagcg cagcgagtca gtgagcgagg aagcggaaga gcgcccaata    5820
cgcaaaccgc ctctccccgc gcgttggccg attcattaat gcagctggca cgacaggttt    5880
cccgactgga aagcgggcag tgagcgcaac gcaattaatg tgagttagct cactcattag    5940
gcaccccagg ctttacactt tatgcttccg gctcgtatgt tgtgtggaat tgtgagcgga    6000
taacaatttc acacaggaaa cagctatgac catgattacg aatt                    6044
```

<210> SEQ ID NO 51
<211> LENGTH: 4242
<212> TYPE: DNA
<213> ORGANISM: Artificial Sequence
<220> FEATURE:
<223> OTHER INFORMATION: pGL4.10 backbone vector

<400> SEQUENCE: 51

```
ggcctaactg gccggtacct gagctcgcta gcctcgagga tatcaagatc tggcctcggc     60
ggccaagctt ggcaatccgg tactgttggt aaagccacca tggaagatgc caaaaacatt    120
aagaagggcc cagcgccatt ctacccactc gaagacggga ccgccggcga gcagctgcac    180
aaagccatga agcgctacgc cctggtgccc ggcaccatcg cctttaccga cgcacatatc    240
gaggtggaca ttacctacgc cgagtacttc gagatgagcg ttcggctggc agaagctatg    300
```

```
aagcgctatg ggctgaatac aaaccatcgg atcgtggtgt gcagcgagaa tagcttgcag    360
ttcttcatgc ccgtgttggg tgccctgttc atcggtgtgg ctgtggcccc agctaacgac    420
atctacaacg agcgcgagct gctgaacagc atgggcatca gccagcccac cgtcgtattc    480
gtgagcaaga aagggctgca aaagatcctc aacgtgcaaa agaagctacc gatcatacaa    540
aagatcatca tcatggatag caagaccgac taccagggct ccaaagcat gtacaccttc    600 gtgacttccc atttgccacc cggcttcaac gagtacgact cgtgcccga gagcttcgac    660 cgggacaaaa ccatcgccct gatcatgaac agtagtggca gtaccggatt gcccaagggc    720
gtagccctac cgcaccgcac cgcttgtgtc cgattcagtc atgcccgcga ccccatcttc    780
ggcaaccaga tcatccccga caccgctatc ctcagcgtgg tgccatttca ccacggcttc    840
ggcatgttca ccacgctggg ctacttgatc tgcggctttc gggtcgtgct catgtaccgc    900
ttcgaggagg agctattctt gcgcagcttg caagactata agattcaatc tgccctgctg    960
gtgcccacac tatttagctt cttcgctaag agcactctca tcgacaagta cgacctaagc   1020
aacttgcacg agatcgccag cggcggggcg ccgctcagca aggaggtagg tgaggccgtg   1080
gccaaacgct tccacctacc aggcatccgc cagggctacg gcctgacaga aacaaccagc   1140
gccattctga tcaccccga aggggacgac aagcctggcg cagtaggcaa ggtggtgccc   1200
ttcttcgagg ctaaggtggt ggacttggac accggtaaga cactgggtgt gaaccagcgc   1260
ggcgagctgt gcgtccgtgg ccccatgatc atgagcggct acgttaacaa ccccgaggct   1320
acaaacgctc tcatcgacaa ggacggctgg ctgcacagcg gcgacatcgc ctactgggac   1380
gaggacgagc acttcttcat cgtggaccgg ctgaagagcc tgatcaaata caagggctac   1440
caggtagccc cagccgaact ggagagcatc ctgctgcaac accccaacat cttcgacgcc   1500
ggggtcgccg gctgcccga cgacgatgcc ggcgagctgc ccgccgcagt cgtcgtgctg   1560
gaacacggta aaaccatgac cgagaaggag atcgtggact atgtggccag ccaggttaca   1620
accgccaaga agctgcgcgg tggtgttgtg ttcgtggacg aggtgcctaa aggactgacc   1680
ggcaagttgg acgcccgcaa gatccgcgag attctcatta aggccaagaa gggcggcaag   1740
atcgccgtgt aataattcta gagtcggggc ggccggccgc ttcgagcaga catgataaga   1800
tacattgatg agtttggaca aaccacaact agaatgcagt gaaaaaaatg ctttatttgt   1860
gaaatttgtg atgctattgc tttatttgta accattataa gctgcaataa acaagttaac   1920
aacaacaatt gcattcattt tatgtttcag gttcaggggg aggtgtggga ggttttttaa   1980
agcaagtaaa acctctacaa atgtggtaaa atcgataagg atccgtcgac cgatgccctt   2040
gagagccttc aacccagtca gctccttccg gtgggcgcgg ggcatgacta tcgtcgccgc   2100
acttatgact gtcttcttta tcatgcaact cgtaggacag gtgccggcag cgctcttccg   2160
cttcctcgct cactgactcg ctgcgctcgg tcgttcggct gcggcgagcg gtatcagctc   2220
actcaaaggc ggtaatacgg ttatccacag aatcagggga taacgcagga agaacatgt   2280 gagcaaaagg ccagcaaaag gccaggaacc gtaaaaaggc cgcgttgctg gcgttttcc   2340 ataggctccg cccccctgac gagcatcaca aaaatcgacg ctcaagtcag aggtggcgaa   2400
acccgacagg actataaaga taccaggcgt ttccccctgg aagctccctc gtgcgctctc   2460
ctgttccgac cctgccgctt accggatacc tgtccgcctt tctcccttcg ggaagcgtgg   2520
cgctttctca tagctcacgc tgtaggtatc tcagttcggt gtaggtcgtt cgctccaagc   2580
tgggctgtgt gcacgaaccc cccgttcagc ccgaccgctg cgccttatcc ggtaactatc   2640
gtcttgagtc aacccggta agacacgact tatcgccact ggcagcagcc actggtaaca   2700
```

```
ggattagcag agcgaggtat gtaggcggtg ctacagagtt cttgaagtgg tggcctaact    2760
acggctacac tagaagaaca gtatttggta tctgcgctct gctgaagcca gttaccttcg    2820
gaaaaagagt tggtagctct tgatccggca acaaaccac cgctggtagc ggtggttttt    2880
ttgtttgcaa gcagcagatt acgcgcagaa aaaaggatc tcaagaagat cctttgatct    2940
tttctacggg gtctgacgct cagtggaacg aaaactcacg ttaagggatt ttggtcatga    3000
gattatcaaa aaggatcttc acctagatcc ttttaaatta aaaatgaagt tttaaatcaa    3060
tctaaagtat atatgagtaa acttggtctg acagcggccg caaatgctaa accactgcag    3120
tggttaccag tgcttgatca gtgaggcacc gatctcagcg atctgcctat ttcgttcgtc    3180
catagtggcc tgactccccg tcgtgtagat cactacgatt cgtgagggct taccatcagg    3240
ccccagcgca gcaatgatgc cgcgagagc gcgttaccg gccccgatt tgtcagcaat     3300 gaaccagcca gcagggaggg ccgagcgaag aagtggtcct gctactttgt ccgcctccat    3360
ccagtctatg agctgctgtc gtgatgctag agtaagaagt tcgccagtga gtagtttccg    3420
aagagttgtg gccattgcta ctggcatcgt ggtatcacgc tcgtcgttcg gtatggcttc    3480
gttcaactct ggttcccagc ggtcaagccg ggtcacatga tcacccatat tatgaagaaa    3540
tgcagtcagc tccttagggc ctccgatcgt tgtcagaagt aagttggccg cggtgttgtc    3600
gctcatggta atggcagcac tacacaattc tcttaccgtc atgccatccg taagatgctt    3660
ttccgtgacc ggcgagtact caaccaagtc gttttgtgag tagtgtatac ggcgaccaag    3720
ctgctcttgc ccggcgtcta tacgggcaa caccgcgcca catagcagta ctttgaaagt     3780
gctcatcatc gggaatcgtt cttcggggcg aaaagactca aggatcttgc cgctattgag    3840
atccagttcg atatagccca ctcttgcacc cagttgatct tcagcatctt ttactttcac    3900
cagcgtttcg gggtgtgcaa aaacaggcaa gcaaaatgcc gcaagaagg gaatgagtgc     3960 gacacgaaaa tgttggatgc tcatactcgt ccttttcaa tattattgaa gcatttatca    4020
gggttactag tacgtctctc aaggataagt aagtaatatt aaggtacggg aggtattgga    4080
caggccgcaa taaaatatct ttatttcat tacatctgtg tgttggtttt ttgtgtgaat    4140
cgatagtact aacatacgct ctccatcaaa acaaaacgaa acaaaacaaa ctagcaaaat    4200
aggctgtccc cagtgcaagt gcaggtgcca gaacatttct ct                      4242
```

<210> SEQ ID NO 52  
<211> LENGTH: 584  
<212> TYPE: DNA  
<213> ORGANISM: Artificial Sequence  
<220> FEATURE:  
<223> OTHER INFORMATION: CMV-IE comparative promoter

<400> SEQUENCE: 52

```
gacattgatt attgactagt tattaatagt aatcaattac ggggtcatta gttcatagcc      60
catatatgga gttccgcgtt acataactta cggtaaatgg cccgcctggc tgaccgccca     120 acgaccccg cccattgacg tcaataatga cgtatgttcc catagtaacg ccaataggga     180
ctttccattg acgtcaatgg gtggagtatt tacggtaaac tgcccacttg gcagtacatc     240
aagtgtatca tatgccaagt acgccccta ttgacgtcaa tgacggtaaa tggcccgcct     300
ggcattatgc ccagtacatg accttatggg actttcctac ttggcagtac atctacgtat    360
tagtcatcgc tattaccatg gtgatgcggt tttggcagta catcaatggg cgtggatagc    420
ggtttgactc acggggattt ccaagtctcc accccattga cgtcaatggg agtttgtttt    480
```

| | |
|---|---|
| ggcaccaaaa tcaacgggac tttccaaaat gtcgtaacaa ctccgcccca ttgacgcaaa | 540 |
| tgggcggtag gcgtgtacgg tgggaggtct atataagcag agct | 584 |

<210> SEQ ID NO 53
<211> LENGTH: 8191
<212> TYPE: DNA
<213> ORGANISM: Artificial Sequence
<220> FEATURE:
<223> OTHER INFORMATION: pcDNA6.0 beta-galactosidase transfection control

<400> SEQUENCE: 53

| | |
|---|---|
| gacggatcgg gagatctccc gatccctat ggtgcactct cagtacaatc tgctctgatg | 60 |
| ccgcatagtt aagccagtat ctgctccctg cttgtgtgtt ggaggtcgct gagtagtgcg | 120 |
| cgagcaaaat ttaagctaca acaaggcaag gcttgaccga caattgcatg aagaatctgc | 180 |
| ttagggttag gcgttttgcg ctgcttcgcg atgtacgggc cagatatacg cgttgacatt | 240 |
| gattattgac tagttattaa tagtaatcaa ttacggggtc attagttcat agcccatata | 300 |
| tggagttccg cgttacataa cttacggtaa atggcccgcc tggctgaccg cccaacgacc | 360 |
| cccgcccatt gacgtcaata atgacgtatg ttcccatagt aacgccaata gggactttcc | 420 |
| attgacgtca atgggtggag tatttacggt aaactgccca cttggcagta catcaagtgt | 480 |
| atcatatgcc aagtacgccc cctattgacg tcaatgacgg taaatggccc gcctggcatt | 540 |
| atgcccagta catgacctta tgggactttc ctacttggca gtacatctac gtattagtca | 600 |
| tcgctattac catggtgatg cggttttggc agtacatcaa tgggcgtgga tagcggtttg | 660 |
| actcacgggg atttccaagt ctccacccca ttgacgtcaa tgggagtttg ttttggcacc | 720 |
| aaaatcaacg ggactttcca aaatgtcgta caactccgc cccattgacg caaatgggcg | 780 |
| gtaggcgtgt acggtgggag gtctatataa gcagagctct ctggctaact agagaaccca | 840 |
| ctgcttactg gcttatcgaa attaatacga ctcactatag ggagacccaa gctggctagc | 900 |
| gtttaaactt aagcttggta ccgagctcgg atccactagt ccagtgtggt ggaattctgc | 960 |
| agatcgaaac gatgatagat cccgtcgttt tacaacgtcg tgactgggaa accctggcg | 1020 |
| ttacccaact taatcgcctt gcagcacatc cccctttcgc cagctggcgt aatagcgaag | 1080 |
| aggcccgcac cgatcgccct tcccaacagt tgcgcagcct gaatggcgaa tggcgctttg | 1140 |
| cctggtttcc ggcaccagaa gcggtgccgg aaagctggct ggagtgcgat cttcctgagg | 1200 |
| ccgatactgt cgtcgtcccc tcaaactggc agatgcacgg ttacgatgcg cccatctaca | 1260 |
| ccaacgtgac ctatcccatt acggtcaatc cgccgtttgt tcccacgag aatccgacgg | 1320 |
| gttgttactc gctcacattt aatgttgatg aaagctggct acaggaaggc cagacgcgaa | 1380 |
| ttatttttga tggcgttaac tcggcgtttc atctgtggtg caacgggcgc tgggtcggtt | 1440 |
| acggccagga cagtcgtttg ccgtctgaat ttgacctgag cgcatttta cgcgccggag | 1500 |
| aaaaccgcct cgcggtgatg gtgctgcgct ggagtgacgg cagttatctg gaagatcagg | 1560 |
| atatgtggcg gatgagcggc attttccgtg acgtctcgtt gctgcataaa ccgactacac | 1620 |
| aaatcagcga tttccatgtt gccactcgct ttaatgatga tttcagccgc gctgtactgg | 1680 |
| aggctgaagt tcagatgtgc ggcgagttgc gtgactacct acgggtaaca gtttctttat | 1740 |
| ggcagggtga acgcaggtc gccagcggca ccgcgccttt cggcggtgaa attatcgatg | 1800 |
| agcgtggtgg ttatgccgat cgcgtcacac tacgtctgaa cgtcgaaaac ccgaaactgt | 1860 |
| ggagcgccga atcccgaat ctctatcgtg cggtggttga actgcacacc gccgacggca | 1920 |

```
cgctgattga agcagaagcc tgcgatgtcg gtttccgcga ggtgcggatt gaaaatggtc   1980
tgctgctgct gaacggcaag ccgttgctga ttcgaggcgt taaccgtcac gagcatcatc   2040
ctctgcatgg tcaggtcatg gatgagcaga cgatggtgca ggatatcctg ctgatgaagc   2100
agaacaactt taacgccgtg cgctgttcgc attatccgaa ccatccgctg tggtacacgc   2160
tgtgcgaccg ctacggcctg tatgtggtgg atgaagccaa tattgaaacc cacggcatgg   2220
tgccaatgaa tcgtctgacc gatgatccgc gctggctacc ggcgatgagc gaacgcgtaa   2280
cgcgaatggt gcagcgcgat cgtaatcacc cgagtgtgat catctggtcg ctggggaatg   2340
aatcaggcca cggcgctaat cacgacgcgc tgtatcgctg gatcaaatct gtcgatcctt   2400
cccgcccggt gcagtatgaa ggcggcggag ccgacaccac ggccaccgat attatttgcc   2460
cgatgtacgc gcgcgtggat gaagaccagc ccttcccggc tgtgccgaaa tggtccatca   2520
aaaaatggct ttcgctacct ggagagacgc gcccgctgat cctttgcgaa tacgcccacg   2580
cgatgggtaa cagtcttggc ggtttcgcta aatactggca ggcgtttcgt cagtatcccc   2640
gtttacaggg cggcttcgtc tgggactggg tggatcagtc gctgattaaa tatgatgaaa   2700
acggcaaccc gtggtcggct tacgcggtg attttggcga tacgccgaac gatcgccagt   2760
tctgtatgaa cggtctggtc tttgccgacc gcacgccgcg tccagcgctg acggaagcaa   2820
aacaccagca gcagttttc cagttccgtt tatccgggca aaccatcgaa gtgaccagcg   2880
aatacctgtt ccgtcatagc gataacgagc tcctgcactg gatggtggcg ctggatggta   2940
agccgctggc aagcggtgaa gtgcctctgg atgtcgctcc acaaggtaaa cagttgattg   3000
aactgcctga actaccgcag ccggagagcg ccgggcaact ctggctcaca gtacgcgtag   3060
tgcaaccgaa cgcgaccgca tggtcagaag ccgggcacat cagcgcctgg cagcagtggc   3120
gtctggcgga aaacctcagt gtgacgctcc ccgccgcgtc ccacgccatc ccgcatctga   3180
ccaccagcga aatggatttt tgcatcgagc tgggtaataa gcgttggcaa tttaaccgcc   3240
agtcaggctc tctttcacag atgtggattg gcgataaaaa ccaactgctg acgccgctgc   3300
gcgatcagtt caccccgtgca ccgctggata cgacattgg cgtaagtgaa gcgacccgca   3360
ttgaccctaa cgcctgggtc gaacgctgga aggcggcggg ccattaccag gccgaagcag   3420
cgttgttgca gtgcacggca gatacacttg ctgatgcggt gctgattacg accgctcacg   3480
cgtggcagca tcaggggaaa accttattta tcagccggaa aacctaccgg attgatggta   3540
gtggtcaaat ggcgattacc gttgatgttg aagtggcgag cgatacaccg catccggcgc   3600
ggattggcct gaactgccag ctggcgcagg tagcagagcg ggtaaactgg ctcggattag   3660
ggccgcaaga aaactatccc gaccgcctta ctgccgcctg ttttgaccgc tgggatctgc   3720
cattgtcaga catgtatacc ccgtacgtct cccgagcga aaacggtctg cgctgcggga   3780
cgcgcgaatt gaattatggc ccacaccagt ggcgcggcga cttccagttc aacatcagcc   3840
gctacagtca acagcaactg atggaaacca gccatcgcca tctgctgcac gcggaagaag   3900
gcacatggct gaatatcgac ggtttccata tggggattgg tggcgacgac tcctggagcc   3960
cgtcagtatc ggcggaattc cagctgagcg ccggtcgcta ccattaccag ttggtctggt   4020
gtcaaaaagc ggccgctcga ggtcacccat tcgaaggtaa gcctatccct aaccctctcc   4080
tcggtctcga ttctacgcgt accggtcatc atcaccatca ccattgagtt taaacccgct   4140
gatcagcctc gactgtgcct tctagttgcc agccatctgt tgtttgcccc tcccccgtgc   4200
cttccttgac cctggaaggt gccactccca ctgtcctttc ctaataaaat gaggaaattg   4260
catcgcattg tctgagtagg tgtcattcta ttctgggggg tggggtgggg caggacagca   4320
```

```
aggggagga ttgggaagac aatagcaggc atgctgggga tgcggtgggc tctatggctt    4380
ctgaggcgga aagaaccagc tggggctcta gggggtatcc ccacgcgccc tgtagcggcg    4440
cattaagcgc ggcgggtgtg gtggttacgc gcagcgtgac cgctacactt gccagcgccc    4500
tagcgcccgc tcctttcgct ttcttccctt cctttctcgc cacgttcgcc ggctttcccc    4560
gtcaagctct aaatcggggg ctcccttag ggttccgatt tagtgcttta cggcacctcg    4620
accccaaaaa acttgattag ggtgatggtt cacgtagtgg gccatcgccc tgatagacgg    4680
ttttttcgccc tttgacgttg gagtccacgt tctttaatag tggactcttg ttccaaactg    4740
gaacaacact caaccctatc tcggtctatt cttttgattt ataagggatt ttgccgattt    4800
cggcctattg gttaaaaaat gagctgattt aacaaaaatt taacgcgaat taattctgtg    4860
gaatgtgtgt cagttagggt gtggaaagtc cccaggctcc ccagcaggca gaagtatgca    4920
aagcatgcat ctcaattagt cagcaaccag gtgtggaaag tccccaggct ccccagcagg    4980
cagaagtatg caaagcatgc atctcaatta gtcagcaacc atagtcccgc ccctaactcc    5040
gcccatcccg cccctaactc cgcccagttc cgcccattct ccgccccatg ctgactaat     5100
ttttttatt tatgcagagg ccgaggccgc ctctgcctct gagctattcc agaagtagtg    5160
aggaggcttt tttggaggcc taggcttttg caaaaagctc ccgggagctt gtatatccat    5220
tttcggatct gatcagcacg tgttgacaat taatcatcgg catagtatat cggcatagta    5280
taatacgaca aggtgaggaa ctaaaccatg gccaagcctt tgtctcaaga agaatccacc    5340
ctcattgaaa gagcaacggc tacaatcaac agcatcccca tctctgaaga ctacagcgtc    5400
gccagcgcag ctctctctag cgacggccgc atcttcactg gtgtcaatgt atatcatttt    5460
actggggac cttgtgcaga actcgtggtg ctgggcactg ctgctgctgc ggcagctggc    5520
aacctgactt gtatcgtcgc gatcggaaat gagaacaggg gcatcttgag cccctgcgga    5580
cggtgccgac aggtgcttct cgatctgcat cctgggatca aagccatagt gaaggacagt    5640
gatggacagc cgacggcagt tgggattcgt gaattgctgc cctctggtta tgtgtgggag    5700
ggctaagcac ttcgtggccg aggagcagga ctgacacgtg ctacgagatt tcgattccac    5760
cgccgccttc tatgaaaggt tgggcttcgg aatcgttttc cgggacgccg gctggatgat    5820
cctccagcgc ggggatctca tgctggagtt cttcgcccac cccaacttgt ttattgcagc    5880
ttataatggt tacaaataaa gcaatagcat cacaaatttc acaaataaag catttttttc    5940
actgcattct agttgtggtt tgtccaaact catcaatgta tcttatcatg tctgtatacc    6000
gtcgacctct agctagagct tggcgtaatc atggtcatag ctgtttcctg tgtgaaattg    6060
ttatccgctc acaattccac acaacatacg agccggaagc ataaagtgta aagcctgggg    6120
tgcctaatga gtgagctaac tcacattaat tgcgttgcgc tcactgcccg ctttccagtc    6180
gggaaacctg tcgtgccagc tgcattaatg aatcggccaa cgcgcgggga gaggcggttt    6240
gcgtattggg cgctcttccg cttcctcgct cactgactcg ctgcgctcgg tcgttcggct    6300
gcggcgagcg gtatcagctc actcaaaggc ggtaatacgg ttatccacag aatcagggga    6360
taacgcagga aagaacatgt gagcaaaagg ccagcaaaag gccaggaacc gtaaaaaggc    6420
cgcgttgctg gcgtttttcc ataggctccg ccccctgac gagcatcaca aaaatcgacg    6480
ctcaagtcag aggtggcgaa acccgacagg actataaaga taccaggcgt ttccccctgg    6540
aagctccctc gtgcgctctc ctgttccgac cctgccgctt accggatacc tgtccgcctt    6600
tctcccttcg ggaagcgtgg cgctttctca tagctcacgc tgtaggtatc tcagttcggt    6660
```

```
gtaggtcgtt cgctccaagc tgggctgtgt gcacgaaccc cccgttcagc ccgaccgctg      6720
cgccttatcc ggtaactatc gtcttgagtc caacccggta agacacgact tatcgccact      6780
ggcagcagcc actggtaaca ggattagcag agcgaggtat gtaggcggtg ctacagagtt      6840
cttgaagtgg tggcctaact acggctacac tagaagaaca gtatttggta tctgcgctct      6900
gctgaagcca gttaccttcg gaaaaagagt tggtagctct tgatccggca acaaaccac       6960 cgctggtagc ggtggttttt ttgtttgcaa gcagcagatt acgcgcagaa aaaaaggatc      7020
tcaagaagat cctttgatct tttctacggg gtctgacgct cagtggaacg aaaactcacg      7080
ttaagggatt ttggtcatga gattatcaaa aaggatcttc acctagatcc ttttaaatta      7140
aaaatgaagt tttaaatcaa tctaaagtat atatgagtaa acttggtctg acagttacca      7200
atgcttaatc agtgaggcac ctatctcagc gatctgtcta tttcgttcat ccatagttgc      7260
ctgactcccc gtcgtgtaga taactacgat acgggagggc ttaccatctg gccccagtgc      7320
tgcaatgata ccgcgagacc cacgctcacc ggctccagat ttatcagcaa taaaccagcc      7380
agccggaagg gccgagcgca gaagtggtcc tgcaacttta tccgcctcca tccagtctat      7440
taattgttgc cgggaagcta gagtaagtag ttcgccagtt aatagtttgc gcaacgttgt      7500
tgccattgct acaggcatcg tggtgtcacg ctcgtcgttt ggtatggctt cattcagctc      7560
cggttcccaa cgatcaaggc gagttacatg atccccatg ttgtgcaaaa aagcggttag      7620
ctccttcggt cctccgatcg ttgtcagaag taagttggcc gcagtgttat cactcatggt      7680
tatggcagca ctgcataatt ctcttactgt catgccatcc gtaagatgct tttctgtgac      7740
tggtgagtac tcaaccaagt cattctgaga atagtgtatg cggcgaccga gttgctcttg      7800
cccggcgtca atacgggata ataccgcgcc acatagcaga actttaaaag tgctcatcat      7860
tggaaaacgt tcttcggggc gaaaactctc aaggatctta ccgctgttga gatccagttc      7920
gatgtaaccc actcgtgcac ccaactgatc ttcagcatct tttactttca ccagcgtttc      7980
tgggtgagca aaaacaggaa ggcaaaatgc cgcaaaaaag gaataaggg cgacacggaa      8040 atgttgaata ctcatactct tcctttttca atattattga agcatttatc agggttattg      8100
tctcatgagc ggatacatat ttgaatgtat ttagaaaaat aaacaaatag gggttccgcg      8160
cacatttccc cgaaaagtgc cacctgacgt c                                     8191
```

<210> SEQ ID NO 54
<211> LENGTH: 3196
<212> TYPE: DNA
<213> ORGANISM: Artificial Sequence
<220> FEATURE:
<223> OTHER INFORMATION: pGL4.10-CMV-MP-EPO

<400> SEQUENCE: 54

```
ggcctaactg gccggtaccg tcgacgatat cggatccagg tctatataag cagagctcgt        60
ttagtgaacc gtcagatcgc ctagatacgc catccacgct gttttgacct ccatagaaga       120
tcgccaccat gggggtgcac gaatgtcctg cctggctgtg gcttctcctg tccctgctgt       180
cgctccctct gggcctccca gtcctgggcg ccccaccacg cctcatctgt gacagccgag       240
tcctggagag gtacctcttg gaggccaagg aggccgagaa tatcacgacg gctgtgctg       300 aacactgcag cttgaatgag aatatcactg tcccagacac caaagttaat ttctatgcct       360
ggaagaggat ggaggtcggg cagcaggcct agaagtctg gcagggcctg gccctgctgt       420
cggaagctgt cctgcggggc caggccctgt tggtcaactc ttcccagccg tgggagcccc      480
tgcagctgca tgtggataaa gccgtcagtg gccttcgcag cctcaccact ctgcttcggg       540
```

-continued

```
ctctgggagc ccagaaggaa gccatctccc ctccagatgc ggcctcagct gctccactcc    600
gaacaatcac tgctgacact ttccgcaaac tcttccgagt ctactccaat ttcctccggg    660
gaaagctgaa gctgtacaca ggggaggcct gcaggacagg ggacagatga tctagagtcg    720
gggcggccgg ccgcttcgag cagacatgat aagatacatt gatgagtttg acaaaccac    780 aactagaatg cagtgaaaaa aatgctttat ttgtgaaatt tgtgatgcta ttgctttatt    840
tgtaaccatt ataagctgca ataaacaagt taacaacaac aattgcattc attttatgtt    900
tcaggttcag ggggaggtgt gggaggtttt ttaaagcaag taaaacctct acaaatgtgg    960
taaaatcgat aaggatccgt cgaccgatgc ccttgagagc cttcaaccca gtcagctcct   1020
tccggtgggc gcggggcatg actatcgtcg ccgcacttat gactgtcttc tttatcatgc   1080
aactcgtagg acaggtgccg gcagcgctct tccgcttcct cgctcactga ctcgctgcgc   1140
tcggtcgttc ggctgcggcg agcggtatca gctcactcaa aggcggtaat acggttatcc   1200
acagaatcag gggataacgc aggaaagaac atgtgagcaa aaggccagca aaaggccagg   1260
aaccgtaaaa aggccgcgtt gctggcgttt ttccataggc tccgcccccc tgacgagcat   1320
cacaaaaatc gacgctcaag tcagaggtgg cgaaacccga caggactata agataccag   1380 gcgtttcccc ctggaagctc cctcgtgcgc tctcctgttc cgaccctgcc gcttaccgga   1440
tacctgtccg cctttctccc ttcgggaagc gtggcgcttt ctcatagctc acgctgtagg   1500
tatctcagtt cggtgtaggt cgttcgctcc aagctgggct gtgtgcacga accccccgtt   1560
cagcccgacc gctgcgcctt atccggtaac tatcgtcttg agtccaaccc ggtaagacac   1620
gacttatcgc cactggcagc agccactggt aacaggatta gcagagcgag gtatgtaggc   1680
ggtgctacag agttcttgaa gtggtggcct aactacggct acactagaag aacagtattt   1740
ggtatctgcg ctctgctgaa gccagttacc ttcggaaaaa gagttggtag ctcttgatcc   1800
ggcaaacaaa ccaccgctgg tagcggtggt ttttttgttt gcaagcagca gattacgcgc   1860
agaaaaaaag gatctcaaga agatcctttg atcttttcta cggggtctga cgctcagtgg   1920
aacgaaaact cacgttaagg gattttggtc atgagattat caaaaaggat cttcacctag   1980
atccttttaa attaaaaatg aagttttaaa tcaatctaaa gtatatatga gtaaacttgg   2040
tctgacagcg gccgcaaatg ctaaaccact gcagtggtta ccagtgcttg atcagtgagg   2100
caccgatctc agcgatctgc ctatttcgtt cgtccatagt ggcctgactc cccgtcgtgt   2160
agatcactac gattcgtgag ggcttaccat caggccccag cgcagcaatg atgccgcgag   2220
agccgcgttc accggccccc gatttgtcag caatgaacca gccagcaggg agggccgagc   2280
gaagaagtgg tcctgctact ttgtccgcct ccatccagtc tatgagctgc tgtcgtgatg   2340
ctagagtaag aagttcgcca gtgagtagtt tccgaagagt gtggccatt gctactggca   2400 tcgtggtatc acgctcgtcg ttcggtatgg cttcgttcaa ctctggttcc cagcggtcaa   2460
gccgggtcac atgatcaccc atattatgaa gaaatgcagt cagctcctta gggcctccga   2520
tcgttgtcag aagtaagttg gccgcggtgt tgtcgctcat ggtaatggca gcactacaca   2580
attctcttac cgtcatgcca tccgtaagat gcttttccgt gaccggcgag tactcaacca   2640
agtcgttttg tgagtagtgt atacggcgac caagctgctc ttgcccggcg tctatacggg   2700
acaacaccgc gccacatagc agtactttga aagtgctcat catcgggaat cgttcttcgg   2760
ggcggaaaga ctcaaggatc ttgccgctat tgagatccag ttcgatatag cccactcttg   2820
cacccagttg atcttcagca tcttttactt tcaccagcgt ttcggggtgt gcaaaaacag   2880
```

```
gcaagcaaaa tgccgcaaag aagggaatga gtgcgacacg aaaatgttgg atgctcatac    2940 tcgtccttt  tcaatattat tgaagcattt atcagggtta ctagtacgtc tctcaaggat    3000
aagtaagtaa tattaaggta cgggaggtat tggacaggcc gcaataaaat atctttattt    3060
tcattacatc tgtgtgttgg tttttgtgt  gaatcgatag tactaacata cgctctccat    3120
caaaacaaaa cgaaacaaaa caaactagca aaataggctg tccccagtgc aagtgcaggt    3180
gccagaacat ttctct                                                    3196

<210> SEQ ID NO 55
<211> LENGTH: 13
<212> TYPE: DNA
<213> ORGANISM: Mus musculus

<400> SEQUENCE: 55
tggcacagtg cca                                                         13

<210> SEQ ID NO 56
<211> LENGTH: 13
<212> TYPE: DNA
<213> ORGANISM: Homo sapiens

<400> SEQUENCE: 56
tgaagaggtg gca                                                         13

<210> SEQ ID NO 57
<211> LENGTH: 16
<212> TYPE: DNA
<213> ORGANISM: Mus musculus

<400> SEQUENCE: 57
tcaacttgcc tgacac                                                      16

<210> SEQ ID NO 58
<211> LENGTH: 16
<212> TYPE: DNA
<213> ORGANISM: Homo sapiens

<400> SEQUENCE: 58
tggactttcc tgaacc                                                      16

<210> SEQ ID NO 59
<211> LENGTH: 273
<212> TYPE: DNA
<213> ORGANISM: Artificial Sequence
<220> FEATURE:
<223> OTHER INFORMATION: Human NR1x3-Min TK

<400> SEQUENCE: 59
actgtacttt cctgaccctg aagagactgt actttcctga ccctgaagag actgtacttt     60
cctgaccctg aagaggatcc ggccccgccc agcgtcttgt cattggcgaa ttcgaacacg    120
cagatgcagt cggggcggcg cggtccgagg tccacttcgc atattaaggt gacgcgtgtg    180
gcctcgaaca ccgagcgacc ctgcagcgac ccgcttaaca gcgtcaacag cgtgccgcag    240
atctcgagga gcttggcgag attttcagga gct                                 273

<210> SEQ ID NO 60
<211> LENGTH: 286
<212> TYPE: DNA
<213> ORGANISM: Artificial Sequence
<220> FEATURE:
<223> OTHER INFORMATION: Human PBREM-MinTK
```

<400> SEQUENCE: 60

```
actgtacttt cctgaccctg aagaggtggc agcatggact ttcctgaacc agatccggcc      60
ccgcccagcg tcttgtcatt ggcgaattcg aacacgcaga tgcagtcggg gcggcgcggt     120
ccgaggtcca cttcgcatat taaggtgacg cgtgtggcct cgaacaccga gcgaccctgc     180
agcgacccgc ttaacagcgt caacagcgtg ccgcagatct cgaggagctt ggcgagattt     240
tcaggagcta aggaagctaa acatggaaga tgccaaaaac attaag                    286
```

<210> SEQ ID NO 61
<211> LENGTH: 286
<212> TYPE: DNA
<213> ORGANISM: Artificial Sequence
<220> FEATURE:
<223> OTHER INFORMATION: hNR1-mNFI-hNR2-Min TK (HMH MinTK)

<400> SEQUENCE: 61

```
actgtacttt cctgaccctg gcacagtgcc accatggact ttcctgaacc agatccggcc      60
ccgcccagcg tcttgtcatt ggcgaattcg aacacgcaga tgcagtcggg gcggcgcggt     120
ccgaggtcca cttcgcatat taaggtgacg cgtgtggcct cgaacaccga gcgaccctgc     180
agcgacccgc ttaacagcgt caacagcgtg ccgcagatct cgaggagctt ggcgagattt     240
tcaggagcta aggaagctaa acatggaaga tgccaaaaac attaag                    286
```

<210> SEQ ID NO 62
<211> LENGTH: 286
<212> TYPE: DNA
<213> ORGANISM: Artificial Sequence
<220> FEATURE:
<223> OTHER INFORMATION: hNR1-mNFI mNR2-Min TK (HMM MinTK)

<400> SEQUENCE: 62

```
actgtacttt cctgaccctg gcacagtgcc accatcaact tgcctgacac cgatccggcc      60
ccgcccagcg tcttgtcatt ggcgaattcg aacacgcaga tgcagtcggg gcggcgcggt     120
ccgaggtcca cttcgcatat taaggtgacg cgtgtggcct cgaacaccga gcgaccctgc     180
agcgacccgc ttaacagcgt caacagcgtg ccgcagatct cgaggagctt ggcgagattt     240
tcaggagcta aggaagctaa acatggaaga tgccaaaaac attaag                    286
```

<210> SEQ ID NO 63
<211> LENGTH: 286
<212> TYPE: DNA
<213> ORGANISM: Artificial Sequence
<220> FEATURE:
<223> OTHER INFORMATION: mNR1-hNFI-mNR2-Min TK (MHM MinTK)

<400> SEQUENCE: 63

```
tctgtacttt cctgaccttg aagaggtggc accatcaact tgcctgacac cgatccggcc      60
ccgcccagcg tcttgtcatt ggcgaattcg aacacgcaga tgcagtcggg gcggcgcggt     120
ccgaggtcca cttcgcatat taaggtgacg cgtgtggcct cgaacaccga gcgaccctgc     180
agcgacccgc ttaacagcgt caacagcgtg ccgcagatct cgaggagctt ggcgagattt     240
tcaggagcta aggaagctaa acatggaaga tgccaaaaac attaag                    286
```

<210> SEQ ID NO 64
<211> LENGTH: 286
<212> TYPE: DNA
<213> ORGANISM: Artificial Sequence
<220> FEATURE:

<223> OTHER INFORMATION: mNR1-hNFI hNR2-Min TK (MHH MinTK)

<400> SEQUENCE: 64

```
tctgtacttt cctgaccttg aagaggtggc agcatggact ttcctgaacc agatccggcc    60
ccgcccagcg tcttgtcatt ggcgaattcg aacacgcaga tgcagtcggg gcggcgcggt   120
ccgaggtcca cttcgcatat taaggtgacg cgtgtggcct cgaacaccga gcgaccctgc   180
agcgacccgc ttaacagcgt caacagcgtg ccgcagatct cgaggagctt ggcgagattt   240
tcaggagcta aggaagctaa acatggaaga tgccaaaaac attaag                  286
```

<210> SEQ ID NO 65
<211> LENGTH: 330
<212> TYPE: DNA
<213> ORGANISM: Artificial Sequence
<220> FEATURE:
<223> OTHER INFORMATION: hPB-SV40

<400> SEQUENCE: 65

```
actgtacttt cctgaccctg aagaggtggc agcatggact ttcctgaacc agctgggagt    60
tcgtagacgg actagcccgg gctcgagatc tgcgatctgc atctcaatta gtcagcaacc   120
atagtcccgc ccctaactcc gcccatcccg ccctaactc cgcccagttc cgcccattct    180
ccgccccatc gctgactaat ttttttatt tatgcagagg ccgaggccgc ctcggcctct    240
gagctattcc agaagtagtg aggaggcttt tttggaggcc taggcttttg caaaaagctt   300
ggcattccgg tactgttggt aaagccaccc                                    330
```

<210> SEQ ID NO 66
<211> LENGTH: 330
<212> TYPE: DNA
<213> ORGANISM: Artificial Sequence
<220> FEATURE:
<223> OTHER INFORMATION: MHM-SV40

<400> SEQUENCE: 66

```
tctgtacttt cctgaccttg aagaggtggc accatcaact tgcctgacac cgctgggagt    60
tcgtagacgg actagcccgg gctcgagatc tgcgatctgc atctcaatta gtcagcaacc   120
atagtcccgc ccctaactcc gcccatcccg ccctaactc cgcccagttc cgcccattct    180
ccgccccatc gctgactaat ttttttatt tatgcagagg ccgaggccgc ctcggcctct    240
gagctattcc agaagtagtg aggaggcttt tttggaggcc taggcttttg caaaaagctt   300
ggcattccgg tactgttggt aaagccaccc                                    330
```

<210> SEQ ID NO 67
<211> LENGTH: 401
<212> TYPE: DNA
<213> ORGANISM: Artificial Sequence
<220> FEATURE:
<223> OTHER INFORMATION: 2xhPB SV40

<400> SEQUENCE: 67

```
actgtacttt cctgaccctg aagaggtggc agcatggact ttcctgaacc acattactcg    60
catccattct cactgtactt tcctgaccct gaagaggtgg cagcatggac tttcctgaac   120
cagctgggag ttcgtagacg gactagcccg ggctcgagat ctgcgatctg catctcaatt   180
agtcagcaac atagtcccgc ccctaactcc gcccatccc gccctaact ccgcccagtt     240
ccgcccattc tccgccccat cgctgactaa ttttttttat ttatgcagag gccgaggccg   300
cctcggcctc tgagctattc cagaagtagt gaggaggctt ttttggaggc ctaggctttt   360
```

```
<210> SEQ ID NO 68
<211> LENGTH: 353
<212> TYPE: DNA
<213> ORGANISM: Artificial Sequence
<220> FEATURE:
<223> OTHER INFORMATION: 2xMHM-MinTK

<400> SEQUENCE: 68
tctgtacttt cctgaccttg aagaggtggc accatcaact tgcctgacac ccattactcg      60
catccattct ctctgtactt tcctgacctt gaagaggtgg caccatcaac ttgcctgaca     120
ccgctgggag ttcgtagacg gagatccggc ccgcccagc gtcttgtcat tggcgaattc     180
gaacacgcag atgcagtcgg ggcggcgcg tccgaggtcc acttcgcata ttaaggtgac     240
gcgtgtggcc tcgaacaccg agcgaccctg cagcgacccg cttaacagcg tcaacagcgt     300
gccgcagatc tcgaggagct tggcgagatt ttcaggagct aaggaagcta aac             353

<210> SEQ ID NO 69
<211> LENGTH: 401
<212> TYPE: DNA
<213> ORGANISM: Artificial Sequence
<220> FEATURE:
<223> OTHER INFORMATION: 2xMHM-SV40

<400> SEQUENCE: 69
tctgtacttt cctgaccttg aagaggtggc accatcaact tgcctgacac ccattactcg      60
catccattct ctctgtactt tcctgacctt gaagaggtgg caccatcaac ttgcctgaca     120
ccgctgggag ttcgtagacg gactagcccg ggctcgagat ctgcgatctg catctcaatt     180
agtcagcaac catagtcccg ccctaactc cgcccatccc gccctaact ccgcccagtt       240 ccgcccattc tccgccccat cgctgactaa ttttttttat ttatgcagag gccgaggccg     300
cctcggcctc tgagctattc cagaagtagt gaggaggctt ttttggaggc ctaggctttt     360
gcaaaaagct tggcattccg gtactgttgg taaagccacc c                         401

<210> SEQ ID NO 70
<211> LENGTH: 424
<212> TYPE: DNA
<213> ORGANISM: Artificial Sequence
<220> FEATURE:
<223> OTHER INFORMATION: 3xhPB-minTK

<400> SEQUENCE: 70
actgtacttt cctgaccctg aagaggtggc agcatggact ttcctgaacc acattactcg      60
catccattct cactgtactt tcctgaccct gaagaggtgg cagcatggac tttcctgaac     120
cagcactgaa ggtcctcaat cgactgtact ttcctgaccc tgaagaggtg gcagcatgga     180
ctttcctgaa ccagctggga gttcgtagac ggagatccgg ccccgcccag cgtcttgtca     240
ttggcgaatt cgaacacgca gatgcagtcg gggcggcgcg gtccgaggtc cacttcgcat     300
attaaggtga cgcgtgtggc ctcgaacacc gagcgaccct gcagcgaccc gcttaacagc     360
gtcaacagcg tgccgcagat ctcgaggagc ttggcgagat tttcaggagc taaggaagct     420
aaac                                                                  424

<210> SEQ ID NO 71
<211> LENGTH: 472
<212> TYPE: DNA
```

<213> ORGANISM: Artificial Sequence
<220> FEATURE:
<223> OTHER INFORMATION: 3xhPB-SV40

<400> SEQUENCE: 71

```
actgtacttt cctgaccctg aagaggtggc agcatggact ttcctgaacc acattactcg      60
catccattct cactgtactt tcctgaccct gaagaggtgg cagcatggac tttcctgaac     120
cagcactgaa ggtcctcaat cgactgtact tcctgacccc tgaagaggtg gcagcatgga     180
ctttcctgaa ccagctggga gttcgtagac ggactagccc gggctcgaga tctgcgatct     240
gcatctcaat tagtcagcaa ccatagtccc gcccctaact ccgcccatcc cgcccctaac     300
tccgcccagt tccgcccatt ctccgcccca tcgctgacta atttttttta tttatgcaga     360
ggccgaggcc gcctcggcct ctgagctatt ccagaagtag tgaggaggct ttttttggagg     420
cctaggcttt tgcaaaaagc ttggcattcc ggtactgttg gtaaagccac cc              472
```

<210> SEQ ID NO 72
<211> LENGTH: 51
<212> TYPE: DNA
<213> ORGANISM: Artificial Sequence
<220> FEATURE:
<223> OTHER INFORMATION: HMH hybrid

<400> SEQUENCE: 72

```
actgtacttt cctgaccctg gcacagtgcc accatggact ttcctgaacc a               51
```

<210> SEQ ID NO 73
<211> LENGTH: 51
<212> TYPE: DNA
<213> ORGANISM: Artificial Sequence
<220> FEATURE:
<223> OTHER INFORMATION: HMM hybrid

<400> SEQUENCE: 73

```
actgtacttt cctgaccctg gcacagtgcc accatcaact tgcctgacac c               51
```

<210> SEQ ID NO 74
<211> LENGTH: 51
<212> TYPE: DNA
<213> ORGANISM: Artificial Sequence
<220> FEATURE:
<223> OTHER INFORMATION: MHM hybrid

<400> SEQUENCE: 74

```
tctgtacttt cctgaccttg aagaggtggc accatcaact tgcctgacac c               51
```

<210> SEQ ID NO 75
<211> LENGTH: 51
<212> TYPE: DNA
<213> ORGANISM: Artificial Sequence
<220> FEATURE:
<223> OTHER INFORMATION: MHH hybrid

<400> SEQUENCE: 75

```
tctgtacttt cctgaccttg aagaggtggc agcatggact ttcctgaacc a               51
```

<210> SEQ ID NO 76
<211> LENGTH: 101
<212> TYPE: DNA
<213> ORGANISM: Artificial Sequence
<220> FEATURE:
<223> OTHER INFORMATION: 2x mouse PBREM CREs
<220> FEATURE:
<221> NAME/KEY: misc_feature

```
<222> LOCATION: (51)..(52)
<223> OTHER INFORMATION: optional spacer

<400> SEQUENCE: 76
tctgtacttt cctgaccttg gcacagtgcc accatcaact tgcctgacac cctgtacttt    60
cctgaccttg gcacagtgcc accatcaact tgcctgacac c                       101

<210> SEQ ID NO 77
<211> LENGTH: 204
<212> TYPE: DNA
<213> ORGANISM: Artificial Sequence
<220> FEATURE:
<223> OTHER INFORMATION: 3x mouse PBREM CREs
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (102)..(103)
<223> OTHER INFORMATION: optional spacer
<220> FEATURE:
<221> NAME/KEY: misc_feature
<222> LOCATION: (153)..(154)
<223> OTHER INFORMATION: optional spacer

<400> SEQUENCE: 77
tctgtacttt cctgaccttg gcacagtgcc accatcaact tgcctgacac ctctgtactt    60
tcctgacctt ggcacagtgc caccatcaac ttgcctgaca cctctgtact tcctgacct   120 tggcacagtg ccaccatcaa cttgcctgac acctctgtac tttcctgacc ttggcacagt   180
gccaccatca acttgcctga cacc                                          204

<210> SEQ ID NO 78
<211> LENGTH: 101
<212> TYPE: DNA
<213> ORGANISM: Artificial Sequence
<220> FEATURE:
<223> OTHER INFORMATION: 2x MHM hybrids CREs
<220> FEATURE:
<221> NAME/KEY: misc_feature
<222> LOCATION: (50)..(51)
<223> OTHER INFORMATION: optional spacer

<400> SEQUENCE: 78
ctgtactttc ctgaccttga agaggtggca ccatcaactt gcctgacacc tctgtacttt    60
cctgaccttg aagaggtggc accatcaact tgcctgacac c                       101

<210> SEQ ID NO 79
<211> LENGTH: 102
<212> TYPE: DNA
<213> ORGANISM: Artificial Sequence
<220> FEATURE:
<223> OTHER INFORMATION: 2x human PBREM CREs
<220> FEATURE:
<221> NAME/KEY: misc_feature
<222> LOCATION: (51)..(52)
<223> OTHER INFORMATION: optional spacer

<400> SEQUENCE: 79
actgtacttt cctgaccctg aagaggtggc agcatggact ttcctgaacc aactgtactt    60
tcctgaccct gaagaggtgg cagcatggac tttcctgaac ca                      102

<210> SEQ ID NO 80
<211> LENGTH: 153
<212> TYPE: DNA
```

<213> ORGANISM: Artificial Sequence
<220> FEATURE:
<223> OTHER INFORMATION: 3x human PBREM CREs
<220> FEATURE:
<221> NAME/KEY: misc_feature
<222> LOCATION: (51)..(52)
<223> OTHER INFORMATION: optional spacer
<220> FEATURE:
<221> NAME/KEY: misc_feature
<222> LOCATION: (102)..(103)
<223> OTHER INFORMATION: optional spacer

<400> SEQUENCE: 80

```
actgtacttt cctgaccctg aagaggtggc agcatggact ttcctgaacc aactgtactt    60
tcctgaccct gaagaggtgg cagcatggac tttcctgaac caactgtact ttcctgaccc   120
tgaagaggtg gcagcatgga ctttcctgaa cca                                153
```

<210> SEQ ID NO 81
<211> LENGTH: 122
<212> TYPE: DNA
<213> ORGANISM: Artificial Sequence
<220> FEATURE:
<223> OTHER INFORMATION: 2x mouse PBREM CREs

<400> SEQUENCE: 81

```
tctgtacttt cctgaccttg gcacagtgcc accatcaact tgcctgacac ccattactcg    60
catccattct ctctgtactt tcctgacctt ggcacagtgc caccatcaac ttgcctgaca   120
cc                                                                  122
```

<210> SEQ ID NO 82
<211> LENGTH: 264
<212> TYPE: DNA
<213> ORGANISM: Artificial Sequence
<220> FEATURE:
<223> OTHER INFORMATION: 3x mouse PBREM

<400> SEQUENCE: 82

```
tctgtacttt cctgaccttg gcacagtgcc accatcaact tgcctgacac ccattactcg    60
catccattct ctctgtactt tcctgacctt ggcacagtgc caccatcaac ttgcctgaca   120
ccgcactgaa ggtcctcaat cgtctgtact ttcctgacct tggcacagtg ccaccatcaa   180
cttgcctgac accctgacct cctgccagca atatctgtac tttcctgacc ttggcacagt   240
gccaccatca acttgcctga cacc                                          264
```

<210> SEQ ID NO 83
<211> LENGTH: 121
<212> TYPE: DNA
<213> ORGANISM: Artificial Sequence
<220> FEATURE:
<223> OTHER INFORMATION: 2x MHM hybrids

<400> SEQUENCE: 83

```
ctgtactttc ctgaccttga agaggtggca ccatcaactt gcctgacacc cattactcgc    60
atccattctc tctgtacttt cctgaccttg aagaggtggc accatcaact tgcctgacac   120
c                                                                   121
```

<210> SEQ ID NO 84
<211> LENGTH: 122
<212> TYPE: DNA
<213> ORGANISM: Artificial Sequence
<220> FEATURE:
<223> OTHER INFORMATION: 2x human PBREM

```
<400> SEQUENCE: 84
actgtacttt cctgaccctg aagaggtggc agcatggact ttcctgaacc acattactcg    60
catccattct cactgtactt tcctgaccct gaagaggtgg cagcatggac tttcctgaac   120
ca                                                                  122

<210> SEQ ID NO 85
<211> LENGTH: 193
<212> TYPE: DNA
<213> ORGANISM: Artificial Sequence
<220> FEATURE:
<223> OTHER INFORMATION: 3x human PBREM

<400> SEQUENCE: 85
actgtacttt cctgaccctg aagaggtggc agcatggact ttcctgaacc acattactcg    60
catccattct cactgtactt tcctgaccct gaagaggtgg cagcatggac tttcctgaac   120
cagcactgaa ggtcctcaat cgactgtact tcctgaccc tgaagaggtg gcagcatgga   180
ctttcctgaa cca                                                      193

<210> SEQ ID NO 86
<211> LENGTH: 18
<212> TYPE: DNA
<213> ORGANISM: Mus musculus

<400> SEQUENCE: 86
tctgtacttt cctgacct                                                  18

<210> SEQ ID NO 87
<211> LENGTH: 18
<212> TYPE: DNA
<213> ORGANISM: Homo sapiens

<400> SEQUENCE: 87
actgtacttt cctgaccc                                                  18

<210> SEQ ID NO 88
<211> LENGTH: 16
<212> TYPE: DNA
<213> ORGANISM: Mus musculus

<400> SEQUENCE: 88
tggcacagtg ccacca                                                    16

<210> SEQ ID NO 89
<211> LENGTH: 16
<212> TYPE: DNA
<213> ORGANISM: Homo sapiens

<400> SEQUENCE: 89
tgaagaggtg gcagca                                                    16

<210> SEQ ID NO 90
<211> LENGTH: 17
<212> TYPE: DNA
<213> ORGANISM: Mus musculus

<400> SEQUENCE: 90
tcaacttgcc tgacacc                                                   17

<210> SEQ ID NO 91
```

```
<211> LENGTH: 17
<212> TYPE: DNA
<213> ORGANISM: Homo sapiens

<400> SEQUENCE: 91
tggactttcc tgaacca                                                    17
```